United States Patent
Ohmori et al.

(10) Patent No.: US 7,426,494 B2
(45) Date of Patent: Sep. 16, 2008

(54) RENTAL SYSTEM

(75) Inventors: Motoji Ohmori, Hirakata (JP); Yuichi Futa, Osaka (JP); Makoto Tatebayashi, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 682 days.

(21) Appl. No.: 10/161,675

(22) Filed: Jun. 5, 2002

(65) Prior Publication Data

US 2002/0198844 A1 Dec. 26, 2002

(30) Foreign Application Priority Data

Jun. 6, 2001 (JP) ............................ 2001-171298

(51) Int. Cl.
*G06Q 99/00* (2006.01)

(52) U.S. Cl. ...................... 705/51; 705/52; 705/53; 705/54

(58) Field of Classification Search ............ 705/57, 705/59, 50–54
See application file for complete search history.

(56) References Cited

U.S. PATENT DOCUMENTS

| | | | | |
|---|---|---|---|---|
| 4,624,578 A | * | 11/1986 | Green | 368/10 |
| 5,311,325 A | * | 5/1994 | Edwards et al. | 725/8 |
| 5,563,946 A | * | 10/1996 | Cooper et al. | 705/56 |
| 5,754,649 A | * | 5/1998 | Ryan et al. | 380/203 |
| 5,892,900 A | * | 4/1999 | Ginter et al. | 726/26 |
| 6,272,636 B1 | * | 8/2001 | Neville et al. | 713/189 |
| 6,697,948 B1 | * | 2/2004 | Rabin et al. | 726/30 |

FOREIGN PATENT DOCUMENTS

| | | |
|---|---|---|
| EP | 1 120 726 A1 | 8/2001 |
| JP | 8-180108 | 7/1996 |
| JP | 11-25110 | 1/1999 |
| JP | 11-296437 | 10/1999 |
| JP | 2000123482 A * | 4/2000 |
| JP | 2000-242699 | 9/2000 |
| JP | 2000-293590 | 10/2000 |
| JP | 2000-348105 | 12/2000 |
| JP | 2001-5877 | 1/2001 |

OTHER PUBLICATIONS

"Nations search for a hidden code", Paul Sweeting, Video Business, Jun. 4, 2001, v21, Iss. 23, p. 4.*
English translation of a Japanese Office Action dated Sep. 25, 2007, issued in JP 2002-164857.

* cited by examiner

*Primary Examiner*—Calvin L. Hewitt, II
(74) *Attorney, Agent, or Firm*—Wenderoth, Lind & Ponack, L.L.P.

(57) ABSTRACT

At the time of manufacturing a DVD to be provided to a rental agent, a provider device writes an agent-rental expiry along with contents onto the DVD. At the time of renting the DVD to a user, a rental agent device writes a user-expiry onto the DVD. A DVD player acquires a current time from a time source device, and compares the current time with each of a prior time, the agent-rental expiry, and the user-rental expiry. The DVD player plays back the content only when playback conditions are met.

17 Claims, 33 Drawing Sheets

RENTAL SYSTEM

This application is based on an application No. 2001-171298 filed in Japan, the contents of which are hereby incorporated by reference.

BACKGROUND OF THE INVENTION (1) Field of the Invention

The present invention relates to a rental system for renting digital works to users.

(2) Description of the Related Art

Rental services of recording mediums, such as DVDs and VHS tapes, storing prerecorded movies or music have been a thriving business, and the market therefore is large and still growing.

In the case of renting VHS tapes, a VHS tape will eventually become unusable in rental services due to wear and tear on the tape that occurs after the tape is rented a certain number of times. On the contrary, in the case of renting digital recording mediums such as DVDs, the prerecorded information is in digital form, so that such a recording medium is usable semi-permanently.

Providers who provide those prerecorded recording mediums storing a digital work, such as a movie or music, demand that usage of a digital recording medium, such as a DVD, be restricted so as to prohibit semi-permanent usage of the digital work recorded thereon.

SUMMARY OF THE INVENTION

To meet the above demand, an object of the present invention is to provide a playback device, a provider device, a rental agent device, a rental system, a playback method, a recording medium, and a playback program each of which is capable of restricting the period during which a user is permitted to use a digital work upon the digital work being rented to the user.

As described above, one aspect of the present invention provides a playback device for acquiring and playing back a rented digital work from a rental agent to a user. The playback device includes: a time acquisition unit operable to acquire time information showing a reliable current time from a time source device; an expiry acquisition unit operable to acquire user-expiry information showing an expiry time of a period during which the user is permitted by the rental agent to play back the digital work; a comparison unit operable to compare the time shown by the acquired time information with the expiry time shown by the acquired user-expiry information; and a prohibition unit operable to prohibit playback of the digital work when the time shown by the time information is later than the expiry time shown by the user-expiry information.

With this construction, when the digital work is rented from the rental agent to the user, a restriction is imposed on the period during which the user is permitted to use the digital work. Further, the playback device acquires the current time from the external time source device, which eliminates the need to provide a time generating circuit within the playback device.

Here, preferably, the digital work is provided from a provider to the rental agent, the expiry acquisition unit further acquires agent-expiry information showing an expiry time of a period during which the rental agent is permitted by the provider to rent the digital work, and the comparison unit further compares the time shown by the acquired time information with the expiry time shown by the acquired agent-expiry information. Furthermore, the prohibition unit prohibits its playback of the digital work when the time shown by the time information is later than at least one of (i) the expiry time shown by the agent-expiry information, and (ii) the expiry time shown by the user-expiry information, instead of when the time shown by the time information is later than the expiry time shown by the user-expiry information.

With this construction, the provider who provides the digital work to the rental agent substantially imposes a restriction on the period during which the rental agent is permitted to use the digital work in rental services.

Here, preferably, a rental recording medium storing the digital work along with the user-expiry information is provided from the rental agent to the user, the playback device acquires the digital work by reading the digital work from the rental recording medium, the expiry acquisition unit acquires the user-expiry information by reading the user-expiry information from the rental recording medium, and the prohibition unit prohibits playback of the digital work recorded on the rental recording medium.

With this construction, when the digital work recorded on the recording medium is rented from the rental agent to the user, a restriction is imposed on the period during which the user is permitted to use the digital work.

Here, preferably, the rental recording medium is a provider recording medium onto which the user-expiry information is additionally recorded by the rental agent, and the provider recording medium being provided from a provider to the rental agent and storing the digital work along with agent-expiry information showing an expiry time of a period during which the rental agent is permitted by the provider to rent the digital work. In addition, the rental recording medium storing the digital work along with the agent-expiry information and the user-expiry information is provided from the rental agent to the user. Moreover, the expiry acquisition unit further acquires the agent expiry information by reading the agent expiry information from the rental recording medium, the comparison unit further compares the time shown by the acquired time information with the expiry time shown by the acquired agent-expiry information, and the prohibition unit prohibits playback of the digital work when the time shown by the time information is later than at least one of (i) the expiry time shown by the agent-expiry information, and (ii) the expiry time shown by the user-expiry information, instead of when the time shown by the time information is later than the expiry time shown by the user-expiry information.

With this construction, the provider who provides the digital work in the form of recording medium to the rental agent substantially imposes a restriction on the period during which the rental agent is permitted to use the digital work in rental services.

Here, preferably, the digital work is provided from the rental agent to the user along with the user-expiry information by being broadcasted in the form of a broadcast wave. In addition, the playback device acquires the digital work by receiving the broadcast wave, extracting the digital work from the received broadcast wave, and storing the extracted digital work. Furthermore, the expiry acquisition unit acquires the user-expiry information by extracting the user-expiry information from the received broadcast wave, and the control unit prohibits playback of the stored digital work.

With this construction, the rental agent who provides the digital work in the form of a carrier wave to the user imposes a restriction on the period within which the user is permitted to use the digital work.

Here, preferably, the digital work is provided from a provider to the rental agent along with agent-expiry information showing an expiry time of a period during which the rental agent is permitted by the provider to rent the digital work, and the digital work is provided from the rental agent to the user by the rental agent broadcasting the digital work along with the user-expiry information and the agent-expiry information. In addition, the expiry acquisition unit further acquires the agent-expiry information by receiving the broadcast wave and extracting the agent-expiry information from the received broadcast wave, and the comparison unit further compares the time shown by the acquired time information with the expiry time shown by the acquired agent-expiry information. Furthermore, the prohibition unit prohibits playback of the digital work when the time shown by the time information is later than at least one of (i) the expiry time shown by the agent-expiry information, and (ii) the expiry time shown by the user-expiry information, instead of when the time shown by the time information is later than the expiry time shown by the user-expiry information.

With this construction, the provider who provides the digital work to the rental agent substantially imposes a restriction on the period during which the rental agent is permitted to use the digital work in rental services.

Alternatively, another aspect of the present invention is a provider device for use by a provider to provide a digital work to a rental agent. The provider device includes an expiry generation unit operable to generate agent-expiry information showing an expiry time of a period during which the rental agent is permitted by the provider to rent the digital work, and an output unit operable to output the digital work along with the generated agent-expiry information.

With this construction, the agent expiry information is generated and outputted together with the digital work, so that the playback device is prohibited to play back the digital work later than the expiry time indicated by the agent expiry information has passed.

Alternatively, another aspect of the present invention provides a rental agent device for use by a rental agent to rent a digital work to a user. The rental agent device includes an expiry generation unit operable to generate user-expiry information showing an expiry time of a period during which the user is permitted by the rental agent to play back the digital work, and an output unit operable to output the digital work along with the generated user-expiry information.

With this construction, the user expiry information is generated and outputted together with the digital work, so that the playback device is prohibited to play back the digital work later than the expiry time indicated by the user expiry information has passed.

BRIEF DESCRIPTION OF THE DRAWINGS

These and the other objects, advantages and features of the present invention will become more apparent from the following description when taken in conjunction with the accompanying drawings which illustrate specific embodiments of the invention.

In the drawings.

DETAILED DESCRIPTION OF THE PREFERRED EMBODIMENTS

1. Rental System 1

Hereinafter, a description is given of a rental system 1 according to a preferred embodiment of the present invention.

Figure 1:
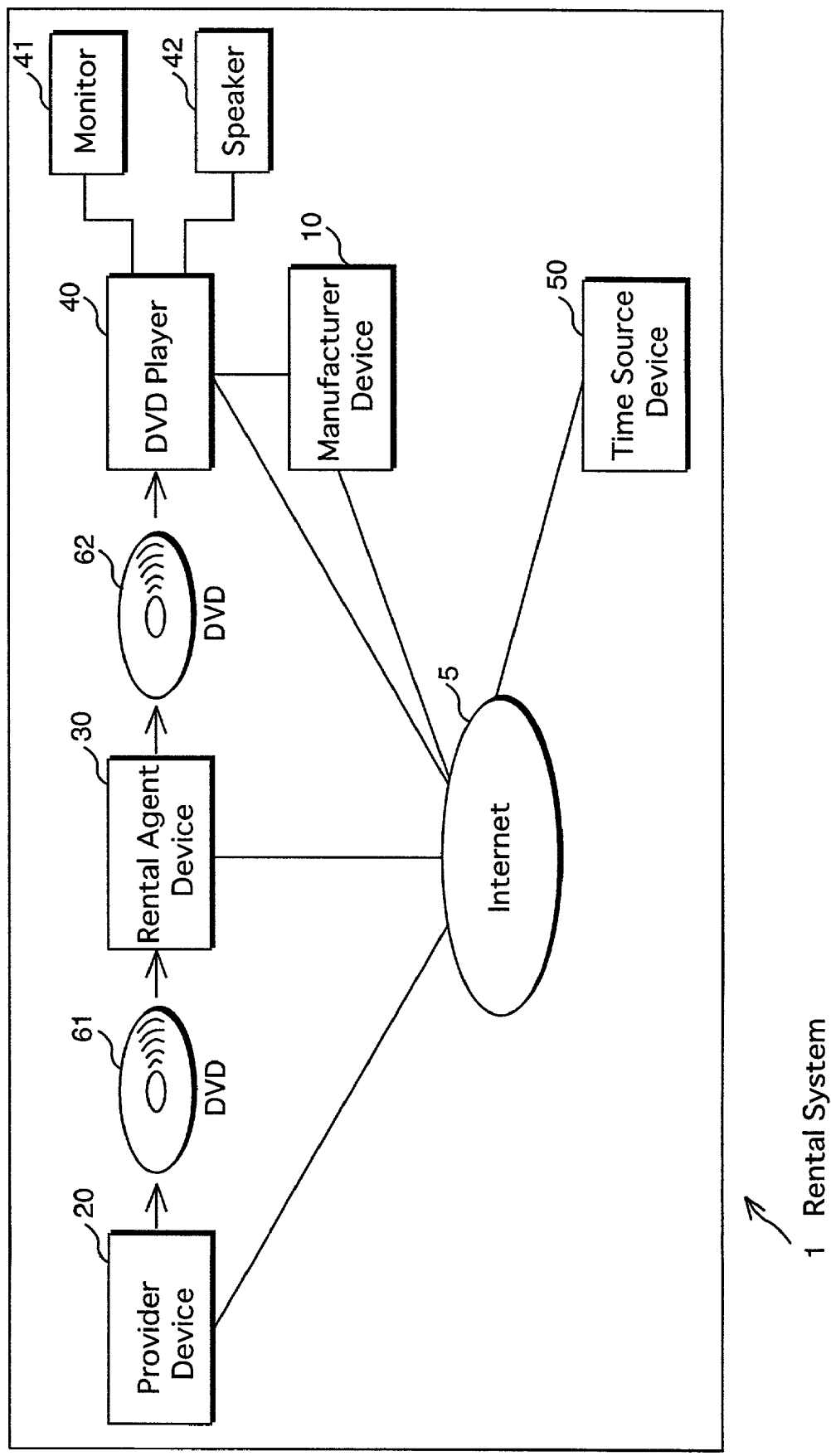
FIG. 1 is a block diagram showing the construction of a rental system 1.

As shown in FIG. 1, the rental system 1 is composed of a manufacturer device 10, a provider device 20, a rental agent device 30, a DVD player 40, a monitor 41, and a speaker 42, as well as a time source device 50.

The manufacturer device 10, provider device 20, rental agent device 30, DVD player 40, and time source device 50 are connected via the Internet 5.

The manufacturer device 10 is owned by the manufacturer of the DVD player 40, and is used by the manufacturer to write various types of information into DVD player 40.

The provider device 20 is owned by the provider who records a digital work such as a movie or music onto DVDs and provides those DVDs, and is used to record such a digital work and other information onto DVDs.

The rental agent device 30 is owned by the rental agent who rents prerecorded DVDs storing a digital work such as a movie or music to an end user, and is used to write information necessary in rental services onto the DVDs.

The DVD player 40 plays back a digital work recoded on a DVD.

The time source device 50 generates and supplies a current time.

1.1 Manufacturer Device 10

In order to write various types of information into the DVD player 40, the manufacturer connects the manufacturer device 10 to the DVD player 40.

The manufacturer device 10 first generates a user identifier IDi that identifies a user i, and a random number. The manufacturer device 10 then performs an exclusive OR by using the generated random number and the user identifier IDi to generate a secret key SKi having 1,024 bits. The secret key SKi is a secret key for the user i. Then, the manufacturer device 10 writes the user identifier IDi and the secret key SKi into a later-described information storage unit 405 included in the DVD player 40.

Next, the manufacturer device 10 generates a public key PKi for the user i from the secret key SKi by using a public key generation algorithm PKEY. Here, one example of the public key generation algorithm PKEY is shown below.

Let p denote a prime number being relatively large (1,024 bits), and then $PKi = g^{\{SK\}} \mod p$ Here, $\alpha^{\{k\}}$ represents the kth power of $\alpha$, and $\alpha \mod p$ represents the remainder of $\alpha$ divided by p.

Next, the manufacturer device 10 transmits the generated public key PKi to the provider device 20 via the Internet 5.

Further, the manufacturer device 10 receives a public key PKP and a signature AUTHi, both of which will be described later, from the provider device 20, and writes the received public key PKP and signature AUTHi into an information storage unit 405 of the DVD player 40.

1.2 Provider Device 20

Figure 2:
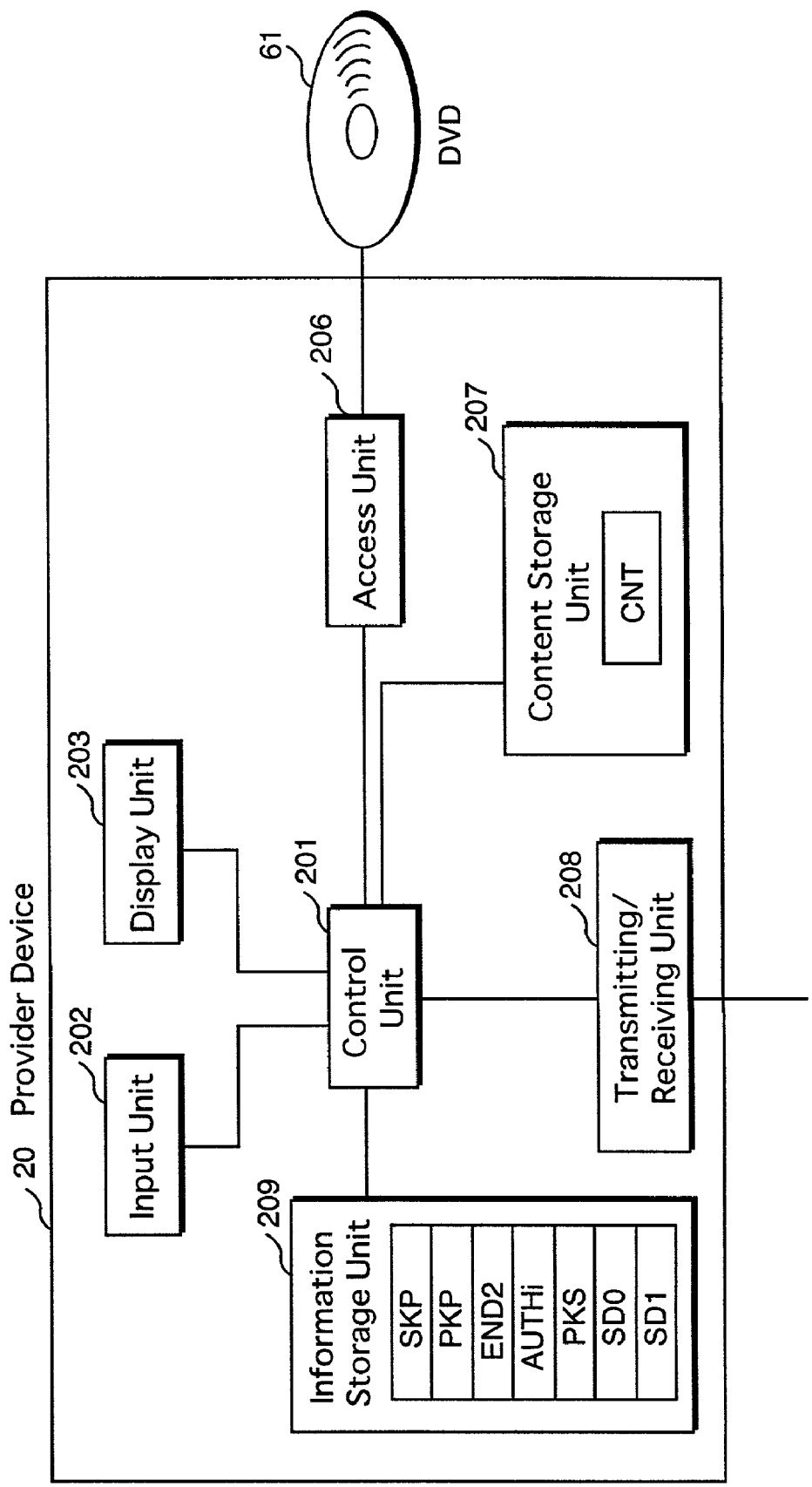
FIG. 2 is a block diagram showing the construction of a provider device 20.

As shown in FIG. 2, the provider device 20 is composed of a control unit 201, an input unit 202, a display unit 203, an access unit 206, a content storage unit 207, a transmitting/receiving unit 208, and an information storage unit 209.

To be more specific, the provider device 20 is a computer system composed of, for example, a microprocessor, ROM, RAM, a hard disc unit, a display unit, a keyboard, a mouse, a LAN unit, and a DVD access unit. The RAM or the hard disc unit used in the computer system stores a computer program and the provider device 20 performs its function by the microprocessor operating in accordance with the computer program.

(1) Content Storage Unit 207

To be more specific, the content storage unit 207 is composed of a hard disc unit, and prestores digital content CNT, such as music or movies.

(2) Information Storage Unit 209

To be more specific, the information storage unit 209 is composed of a hard disc unit, and has memory areas for storing a provider secret key SKP, the provider public key PKP, an agent-rental expiry END 2, the signature AUTHi, a rental agent public key PKS, a signature SD0, and a signature SD1.

(3) Transmitting/Receiving Unit 208

To be more specific, the transmitting/receiving unit 208 is composed of a LAN unit, for example. Further, the transmitting/receiving unit 208 is connected to the Internet 5, and performs data transmission between the control unit 201 and an external device connected to the Internet 5.

(4) Access Unit 206

To be more specific, the access unit 206 is composed of, for example, a DVD access unit that reads and writes information recorded on a DVD being mounted on the provider device 20, and writes information on a DVD 61 in accordance with instructions given from the control unit 201.

(5) Control Unit 201

The control unit 201 generates a random number and performs an exclusive OR by using an internally stored provider identifier that identifies a provider and the generated random number to generate the secret key SKP having 1,024 bits. The secret key SKP is a secret key for the provider. The control unit 201 then writes the generated provider secret key SKP into the information storage unit 209.

Next, the control unit 201 generates the public key PKP from the generated secret key SKP using the public key generation algorithm PKEY. The public key PKP is a public key for the provider. The control unit 201 also writes the generated public key PKP into the information storage unit 209.

Next, the control unit 201 receives a public key PKi from the manufacturer device 10 via the Internet 5 and the transmitting/receiving unit 208, and applies a digital signature generation algorithm SIG to user's public key PKi by using the secret key SKP as represented by expression 1 below to generate the signature AUTHi. The control unit 201 then writes the generated signature AUTHi into the information storage unit 209.

$$AUTHi = SIG(SKP, PKi) \quad \text{(Expression 1)}$$

Here, as shown in expression 1, "A=SIG(B, C)" means that a digital signature generation algorithm SIG is applied to Information C by using Key B so that Signature A is generated, and the same is applied for the following description. One example of the digital signature generation algorithm SIG is the ElGamal signature algorithm. The details of ElGamal signature algorithm are found in "Introduction to Cryptographic Theory (Ango-Riron Nyumon)" (Eiji OKAMOTO, published by Kyoritsu Shuppan CO., LTD.)

Next, the control unit 201 transmits the generated signature AUTHi to the manufacturer device 10 via the transmitting/receiving unit 208 and Internet 5.

Further, the control unit 201 receives the public key PKS from the rental agent device 30 via the Internet 5 and the transmitting/receiving unit 208, and writes the received public key PKS into the information storage unit 209.

The control unit 201 repeats the operations described below every time the provider device 20 manufactures a DVD to be provided to the rental agent.

First, the control unit 201 applies the digital signature generation algorithm SIG to the public key PKS by using secret key SKP as represented by expression 2 below to generate a signature SD1.

$$SD1 = SIG(SKP, PKS) \qquad \text{(Expression 2)}$$

Next, the control unit 201 reads digital content CNT stored in the content storage unit 207, and generates an agent-rental expiry END2 that is an expiry of a period during which the rental agent is allowed to use the DVD in rental services. The rental agent is not allowed to rent the DVD after the agent-rental expiry END2. Here, the agent-rental expiry END2 is information representing a date in terms of a year, month, and day. Next, the control unit 201 applies the digital signature generation algorithm SIG to the agent-rental expiry END2 by using the secret key SKP as represented by expression 3 below to generate signature SD0.

$$SD0 = SIG(SKP, END2) \qquad \text{(Expression 3)}$$

Subsequently, the control unit 201 writes via the access unit 206 the agent-rental expiry END2, the signature SD0, and the signature SD1 into a provider-only area of the DVD that is writable only to the provider, and writes digital content CNT into a free-access area of the DVD.

The provider-only area is a memory area into which only the provider is allowed to write information, and that is not writable to any other party. Here, the provider-only area is provided within a system area of the DVD.

Figure 3:
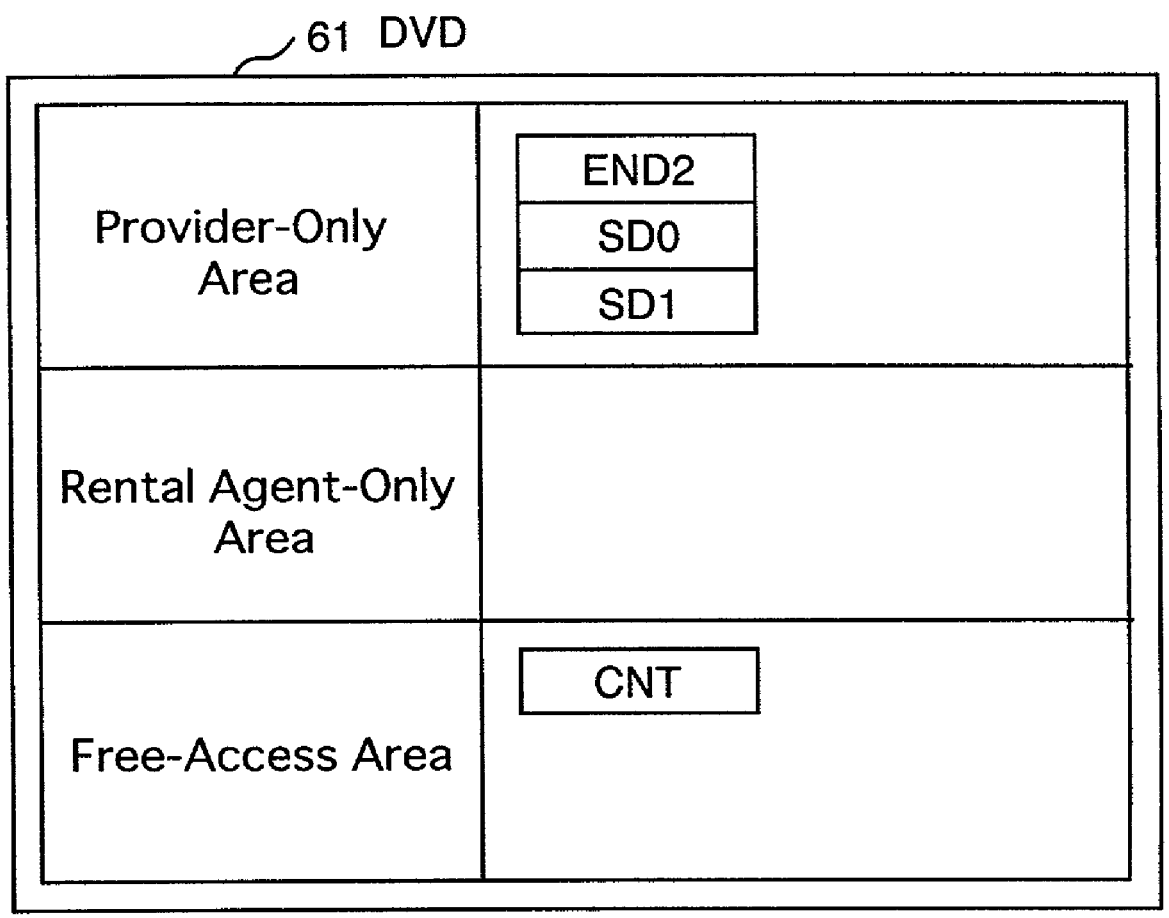
FIG. 3 shows the data structure of the DVD onto which the provider device 20 has written information.

FIG. 3 shows the data structure of the DVD onto which the control unit 201 has written the information as described above.

As shown in FIG. 3, the DVD 61 has the provider-only area, the rental agent-only area, and the free-access area. In the provider-only area, END2, SD0, and SD1 are recorded, and in the free-access area, CNT is recorded.

(6) Input Unit 202 and Display Unit 203

The input unit 202 receives an input from the provider, and the display unit 203 displays information.

1.3 Rental Agent Device 30

Figure 4:
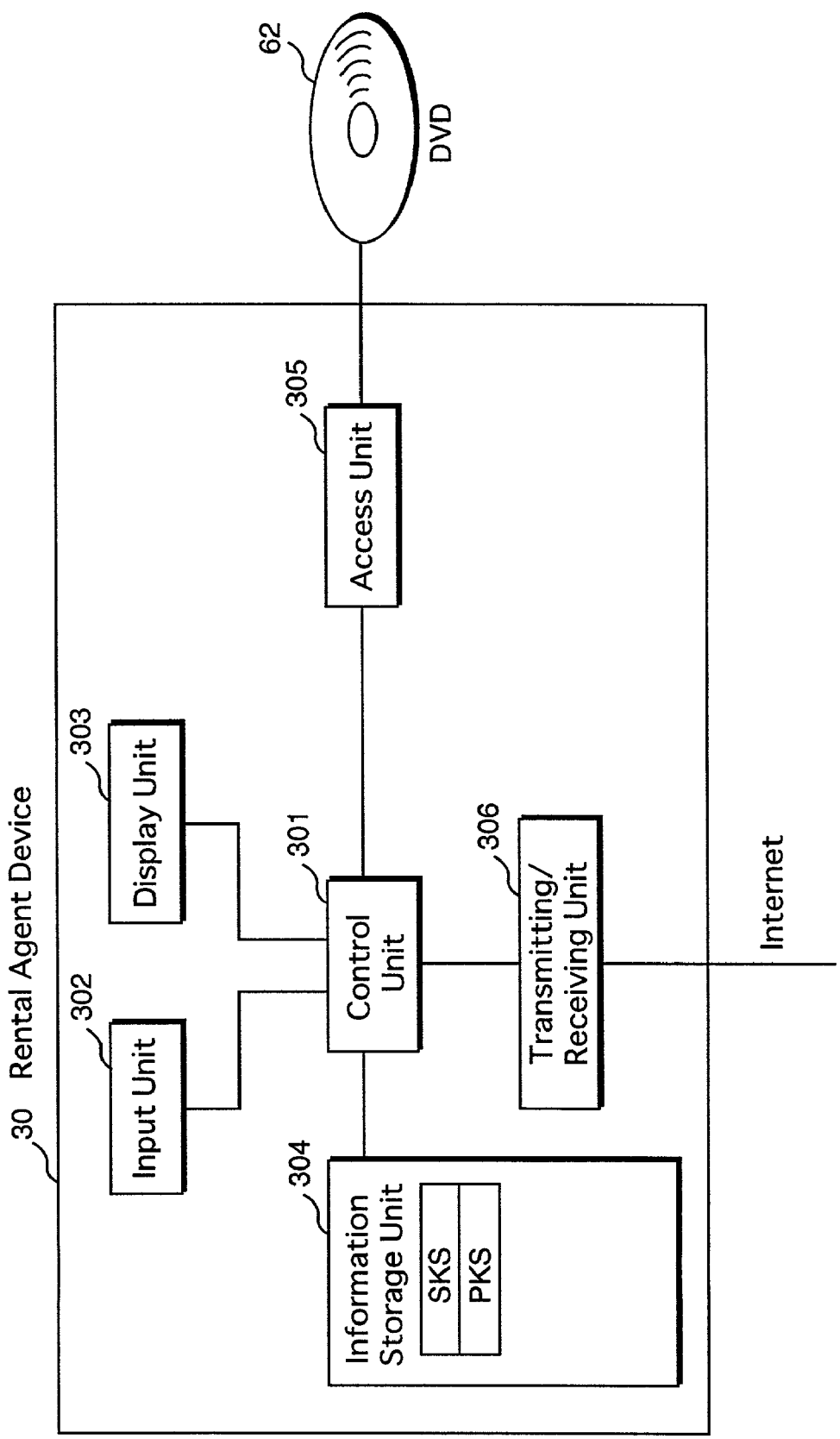
FIG. 4 is a block diagram showing the construction of a rental agent device 30.

As shown in FIG. 4, the rental agent device 30 is composed of a control unit 301, an input unit 302, a display unit 303, an information storage unit 304, an access unit 305, and a transmitting/receiving unit 306.

To be more specific and similar to the provider device 20, the rental agent device 30 is a computer system composed of, for example, a microprocessor, ROM, RAM, a hard disc unit, a display unit, a keyboard, a mouse, a LAN unit, and a DVD access unit. The RAM or the hard disc unit used in the computer system stores a computer program, and the rental agent device 30 performs its function by the microprocessor operating in accordance with the computer program.

(1) Information Storage Unit 304

To be more specific, the information storage unit 304 is a hard disc unit, and has memory areas for storing a rental agent secret key SKS and a rental agent public key PKS.

(2) Transmitting/Receiving Unit 306

To be more specific, the transmitting/receiving unit 306 is composed of a LAN unit, for example. The transmitting/receiving unit 306 is connected to the Internet 5, and performs data transmission between the control unit 301 and an external device connected to the Internet 5.

(3) Access Unit 305

The access unit 305 is composed of, for example, a DVD access unit, and writes information on the DVD 62 in accordance with instructions given from the control unit 301.

(4) Control Unit 301

The control unit 301 generates a random number, and performs an exclusive OR by using an internally stored rental agent identifier that identifies a rental agent and the generated random number to generate the rental agent secret key SKS. The control unit 301 then writes the generated secret key SKS into information storage unit 304. Next, the control unit 301 generates the public key PKS from the generated secret key SKS by using the public key generation algorithm PKEY. The public key PKS is a public key for the rental agent. The control unit 301 also writes the generated public key PKS into the information storage unit 304. Subsequently, the control unit 301 transmits the public key PKS to the provider device 20 via the transmitting/receiving unit 306 and the Internet 5.

Next, the control unit 301 repeats the operations described below every time the DVD is rented to an end user.

First, the control unit 301 generates a user-rental expiry END1. The user-rental expiry END1 is information representing a date in terms of a year, month, and day representing an expiry of a period within which the end user is allowed to use the DVD. The end user is not allowed to use the DVD after the user-rental expiry END1.

Next, the control unit 301 applies the digital signature generation algorithm SIG to the user-rental expiry END1 by using secret the key SKS as represented by expression 4 below to generate a signature SD2.

$$SD2 = SIG(SKS, END1) \qquad \text{(Expression 4)}$$

Next, the control unit 301 writes, via the access unit 305, SD2 and END1 in the rental agent-only area of the DVD 62, and writes the public key PKS in the free-access area.

The rental agent-only area is a memory area into which only the rental agent is allowed to write information, and that is not writable to any other party. Here, the rental agent-only area is provided within a system area of the DVD.

Figure 5:
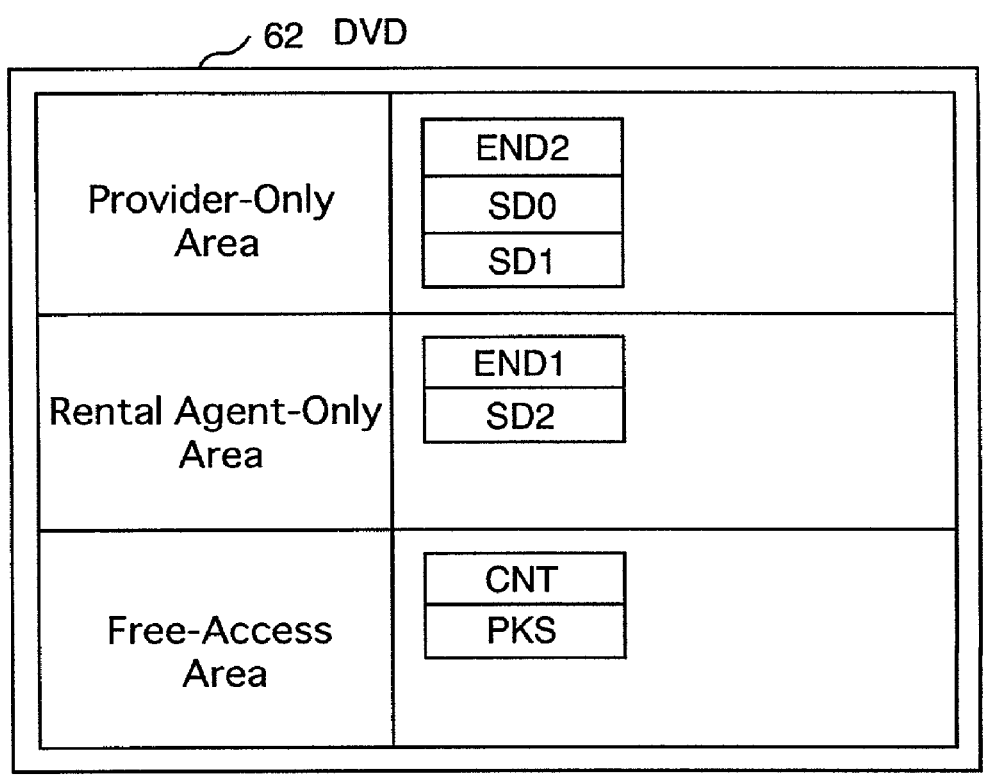
FIG. 5 shows the data structure of the DVD onto which the rental shop device 30 has written information.

FIG. 5 shows the data structure of DVD 62 onto which control unit 301 has written information. As shown in FIG. 5, in the provider-only area, END2, SD0, and SD1 are recorded, in the rental agent-only area, END1 and END2 are recorded, and in the free-access area, CNT and PKS are recorded.

1.4 DVD Player 40

Figure 6:
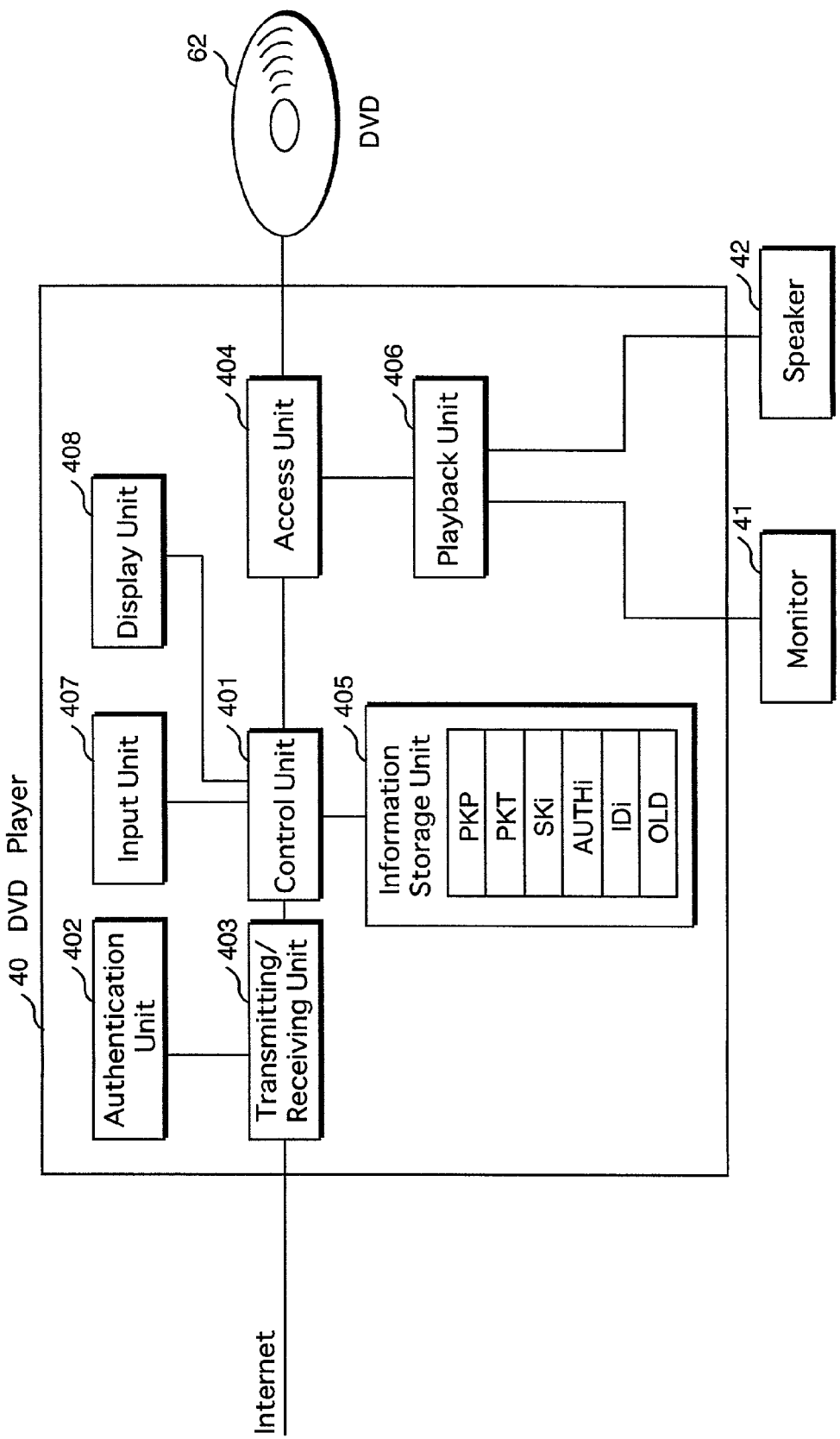
FIG. 6 is a block diagram showing the construction of a DVD player 40.

As shown in FIG. 6, the DVD player 40 is composed of a control unit 401, an authentication unit 402, a transmitting/receiving unit 403, an access unit 404, an information storage unit 405, a playback unit 406, an input unit 407, and a display unit 408.

To be more specific and similar to the provider device 20, the DVD player 40 is a computer system composed of, for example, a microprocessor, ROM, RAM, a playback unit, a LAN unit, a DVD access unit, and a liquid crystal display unit. The RAM used in the computer system stores a computer program. The DVD player 40 performs its function by the microprocessor operating in accordance with the computer program.

(1) Information Storage Unit 405

To be more specific, the information storage unit 405 is composed of RAM, and has memory areas for storing the provider public key PKP, the public key PKT of the time source device 50, the user i's secret key SKi, the signature AUTHi, the user i's identifier IDi, and the prior time OLD.

As will be described later, the public key PKP, secret key SKi, signature AUTHi, and user identifier IDi are written into the DVD player 40 by the manufacturer device 10. Further, the information storage unit 405 receives the public key PKT from the time source device 50.

(2) Transmitting/Receiving Unit 403

To be more specific, the transmitting/receiving unit 403 is composed of, for example, a LAN unit. The transmitting/receiving unit 403 is connected to the Internet 5, and performs data transmission between the control unit 401 and an external device connected to the Internet 5, or between the authentication unit 402 and the external device.

(3) Access Unit 404

The access unit 404 is composed of, for example, a DVD access unit, and reads information from the DVD 62 in accordance with instructions given from the control unit 401.

(4) Control Unit 401

The control unit 401 instructs the authentication unit 402 to perform processing for mutual authentication between the DVD player 40 and the time source device 50, and then receives the result of the authentication. In the event that the authentication fails, the control unit 401 terminates the processing.

In the event that the authentication is successful, the control unit 401 operates as follows.

First, the control unit 401 receives the public key PKT of the time source device 50 from the time source device 50 via the Internet 5 and the transmitting/receiving unit 403, and writes the received PKT into the information storage unit 405.

Next, the control unit 401 receives via the input unit 407 user operations instructing to play back the content recorded onto the DVD, and performs the following playback processing of the content. Upon receipt of user operations instructing to perform processing other than playback processing, the control unit 401 performs the instructed processing.

On the other hand, upon receipt of user operations instructing the content playback, the control unit 401 instructs the authentication unit 402 to perform processing for mutual authentication between the DVD player 40 and the time source device 50 as well as processing for key sharing, followed by reception of the result of the authentication. In the event that the authentication fails, the control unit 401 outputs to the display unit 408*a* message indicating that the authentication has failed, and terminates the processing.

On the other hand, in the event that the authentication is successful, the control unit 401 verifies the signature data as described below. Upon successfully verifying the signature data, the control unit 401 acquires a current time NOW as also described below. When failing to acquire the current time NOW, the control unit 401 outputs to the display unit 408 a message indicating that acquisition of the current time NOW has failed, and terminates the processing.

When the current time NOW is successfully acquired, the control unit 401 reads the prior time OLD from the information storage unit 405, and compares the prior time OLD with the current time NOW. When the prior time OLD is equal to or later than then current time NOW (OLD$\geq$NOW), the control unit 401 outputs to the display unit 408 a message indicating that the prior time OLD and the current time NOW are in an abnormal relation, and terminates the processing.

On the other hand, when the prior time OLD is prior to the current time NOW (OLD<NOW), the control unit 401 reads the user-rental expiry END1 from the DVD 62, and compares the current time NOW with the user-rental expiry END1. When the current time NOW is equal to or later than the user-rental expiry END1, the control unit 401 outputs to the display unit 408 a message indicating that the user-rental period has expired, and terminates the processing.

When the current time NOW is prior to the user-rental expiry END1, the control unit 401 reads the agent-rental expiry END2 from the DVD 62, and compares the current time NOW with the agent-rental expiry END2. When the current time NOW is equal to or later than the agent-rental expiry END2, the control unit 401 outputs to the display unit 408 a message indicating that the agent-rental period has expired, transmits the message to the provider device 20, and then terminates the processing.

When the current time NOW is prior to the agent-rental expiry END2, the control unit 401 overwrites the prior time OLD stored in the information storage unit 405 with the current time NOW.

Next, the control unit 401 reads the content CNT recorded in the free-access area of DVD 62 via the access unit 404, and outputs the read content CNT to the playback unit 406.

Further, the control unit 401 receives the current time NOW from the time source device 50 in the following manner.

Here, a description is given of processing for verification of signature data that control unit 401 performs.

Figure 17:
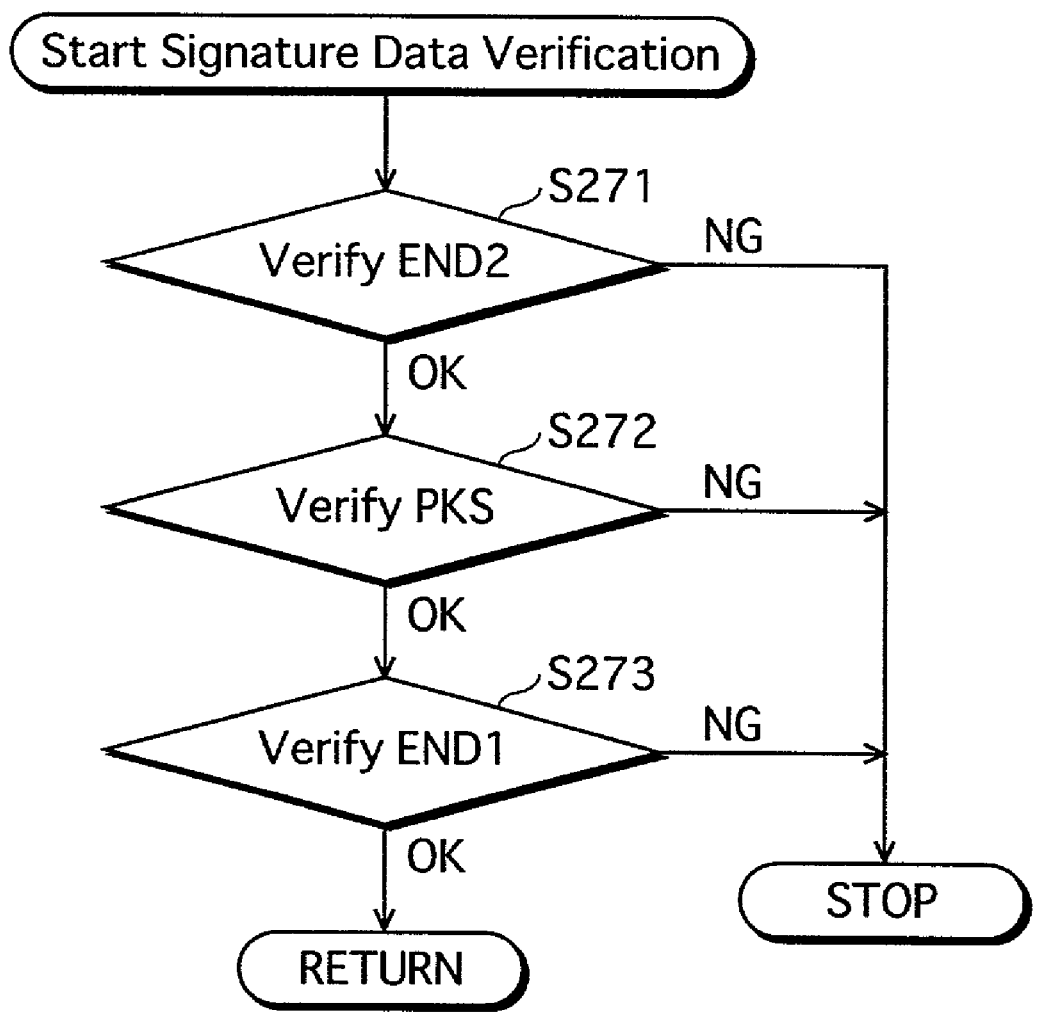
FIG. 17 is a flowchart showing the operations performed by a control unit 403 for verification of three sets of signature data.

As shown in the flowchart in FIG. 17, the control unit 401 verifies the following three sets of signature data.

(Signature Data Verification 1)

The control unit 401 reads the provider public key PKP from the information storage unit 405, and the signature data SD0 from the DVD 62. The control unit 401 then performs verification by using the provider public key PKP to verify whether or not the signature data SD0 is truly generated by the provider from END2.

VERIFY(PKP, SD, END2) (step S271)

(Signature Data Verification 2)

The control unit 401 reads the signature data SD1 from the DVD 62, and performs verification by using the provider public key PKP to verify whether or not the signature data SD1 is truly generated from the PKS by the provider.

VERIFY(PKP, SD1, PKS) (step S272)

(Signature Data Verification 3)

The control unit 401 reads the rental agent public key PKS from the DVD 62, and performs verification by using the rental agent public key PKS to verify whether or not the signature data SD2 is truly generated from END1 by the rental agent.

VERIFY(PKS, SD2, END1) (step S273)

When verification of any of the above three signatures fails (NG in any of the steps S271-S273), the control unit 401 terminates the processing.

When verification of the above three signatures is all successful (OK in all of the steps S271-S273), the control unit 401 continues the processing.

(5) Playback Unit 406

The playback unit 406 receives content CNT from the access unit 404, separates the received content CNT into voice data and image data, and outputs the voice data to the speaker 42 and outputs the image data to the monitor 41.

(6) Input Unit 407 and Display Unit 408

The input unit 407 accepts a user input of information, and outputs the inputted information to the control unit 401.

The display unit 408 receives a message from the control unit 401 and displays the received message.

(6) Authentication Unit 402

Operations of the authentication unit 402 are described later.

1.5 Time Source Device 50

Figure 7:
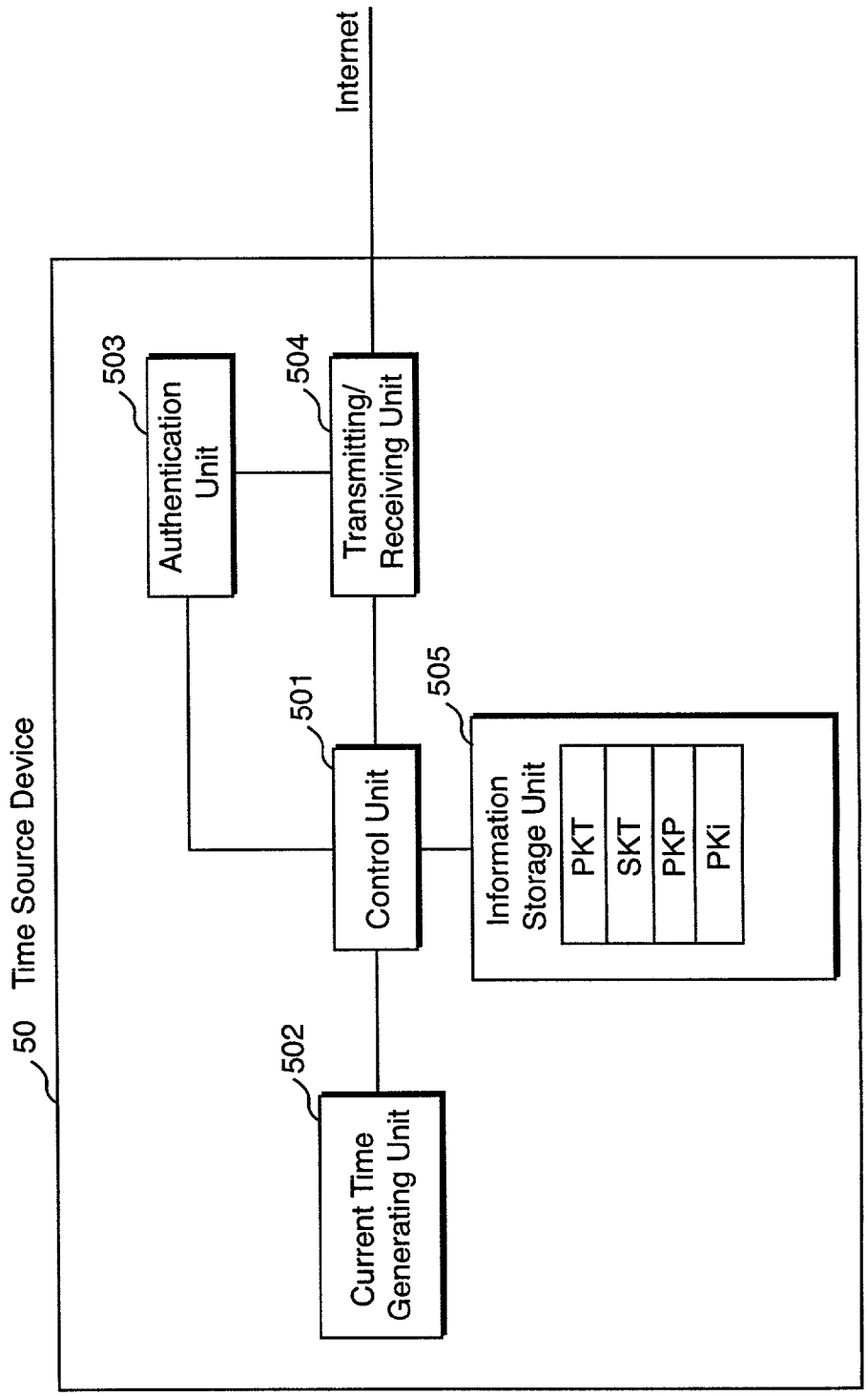
FIG. 7 is a block diagram showing the construction of a time source device 50.

As shown in FIG. 7, the time source device 50 is composed of a control unit 501, a current time generating unit 502, an authentication unit 503, a transmitting/receiving unit 504, and an information storage unit 505.

To be more specific and similar to the provider device 20, the time source unit 50 is a computer system composed of, for example, a microprocessor, ROM, RAM, a LAN unit, and a time generating circuit. The RAM used in the computer system stores a computer program. The time source device 50 performs its function by the microprocessor operating in accordance with the computer program.

(1) Information Storage Unit 505

To be more specific, the information storage unit 505 is composed of RAM, and has memory areas for storing a secret key SKT of the time source device 50, the public key PKT of time source device 50, the provider public key PKP, and the user i public key PKi.

(2) Current Time Generating Unit 502

The current time generating unit 502 generates, whenever requested, a current time NOW that represents the time of the current moment, and outputs the generated current time NOW to the control unit 501. The current time NOW is composed of data representing a year, month, day, hour, minute, and second.

(3) Transmitting/Receiving Unit 504

To be more specific, the transmitting/receiving unit 504 is composed of, for example, a LAN unit. The transmitting/receiving unit 504 is connected to the Internet 5, and performs data transmission between the control unit 501 and an external device connected to the Internet 5 or between the authentication unit 503 and the external device.

(4) Control Unit 501 and Authentication Unit 503

The operations of the control unit 501 and authentication unit 503 are described later.

1.6 Operations of Rental System 1

Now, a description is given of the operations of rental system 1.

(1) Operations of Manufacturer Device 10

Figure 8:
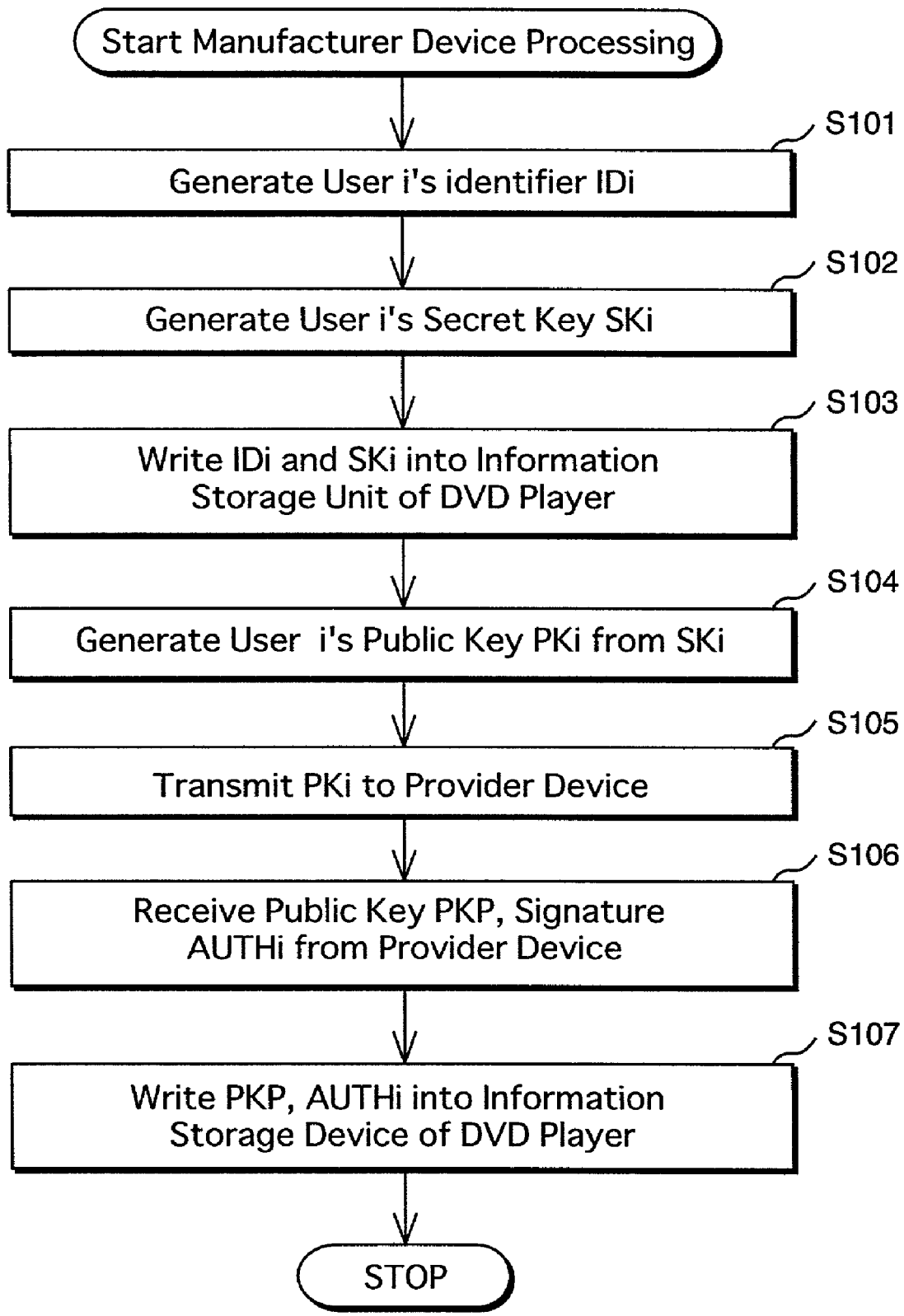
FIG. 8 is a flowchart showing the operations of a manufacturer device 10.

First, a description is given of the operations of the manufacturer device 10 with reference to the flowchart shown in FIG. 8.

At the time when the manufacturer writes various types of information into the DVD player 40, the manufacturer device 10 generates a user identifier IDi identifying the user i (step S101). Next, the manufacturer device 10 generates a random number, and performs an exclusive OR by using the generated random number and the user identifier IDi to generate the secret key SKi (step S102). The manufacturer device 10 then writes the user identifier IDi and the secret key SKi into the information storage unit 405 of the DVD player 40, which will be described later (step S103). Next, the manufacturer device 10 generates the user i public key PKi from the secret key SKi by using the public key generation algorithm PKEY (step S104), and transmits the generated public key PKi to the provider device 20 via the Internet 5 (step S105).

Further, the manufacturer device 10 receives from the provider device 20 a public key PKP and signature AUTHi both of which will be described later (step S106), and writes the received public key PKP and signature AUTHi into the information storage unit 405 of the DVD player 40 (step S107).

(2) Operations of Provider Device 20

Figure 9:
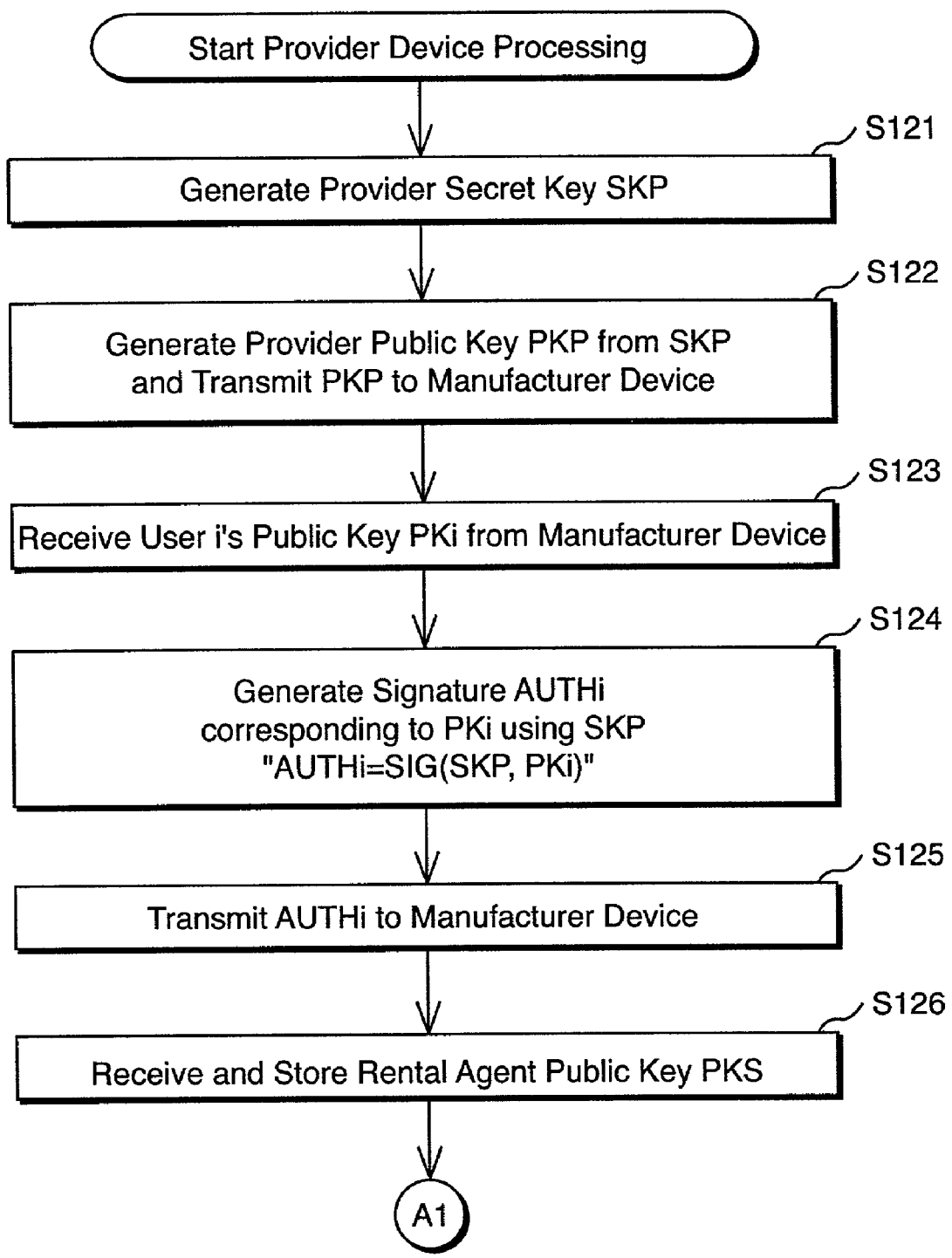
FIG. 9 is a flowchart showing the operations of the provider device 20, and the operations are continued to FIG. 10.
Figure 10:
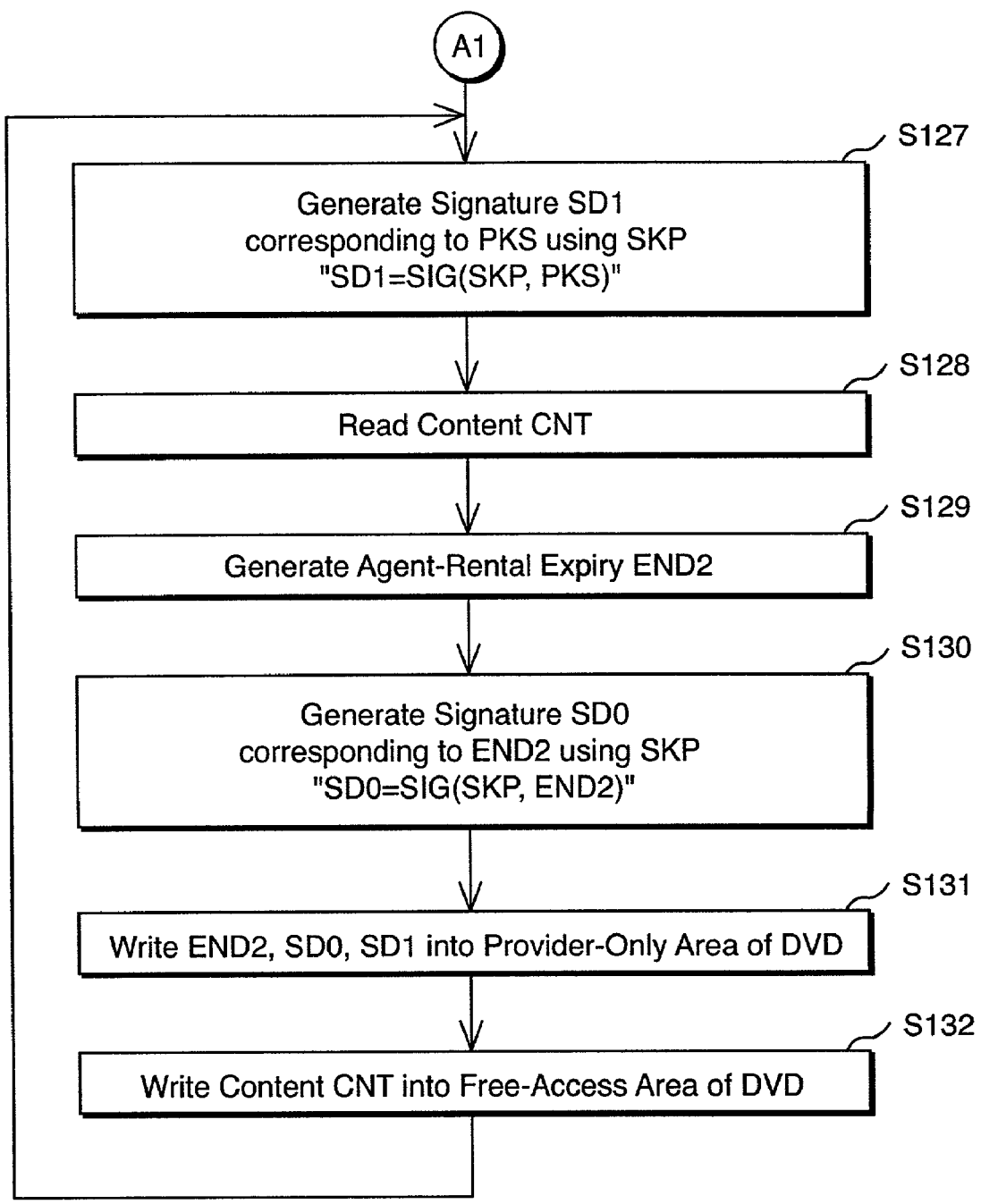
FIG. 10 is a flowchart showing the operations of provider device, where the operations in FIG. 10 are continued from FIG. 9.

A description is given of the operations of the provider device 20 with reference to the flowchart shown in FIGS. 9 and 10.

The control unit 201 of the provider device 20 generates a random number, and performs an exclusive OR by using the provider identifier and the generated random number to generate a secret key SKP (step S121). Next, the control unit 201 applies the public key generation algorithm PKEY to the generated secret key SKP to generate a public key PKP, and then transmits the generated public key PKP to the manufacturer device 10 (step S122).

Further, the control unit 201 receives the public key PKi from the manufacturer device 10 (step S123), and applies a digital signature generation algorithm SIG to the user i public key PKi as represented by expression 1 to generate the signature AUTHi. The control unit 201 then writes the generated signature AUTHi into the information storage unit 209 (step S124), and transmits the generated signature AUTHi to the manufacturer device 10 (step S125).

Next, the control unit 201 receives the public key PKS from the rental agent device 30, and writes the received public key PKS into the information storage unit 209 (step S126).

The control unit 201 repeats steps S127-S132 described below every time the provider device 20 manufactures a DVD to be provided to the rental agent.

The control unit 201 applies the digital signature generation algorithm SIG to the public key PKS by using the secret key SKP as represented by expression 2 to generate the signature SD1 (step S127).

Next, the control unit 201 reads digital content CNT stored in the content storage unit 207 (step S128), and generates an agent-rental expiry END2 that is an expiry of a period during which the rental agent is permitted to use the DVD in rental services (step S129). The control unit 201 then applies the digital signature generation algorithm SIG to the agent-rental expiry END2 as represented by expression 3 to generate a signature SD0 (step S130).

Next, the control unit 201 writes via the access unit 206 the agent-rental expiry END2, signature SD0, and signature SD1 into a provider-only area (i.e., of the DVD) that is writable only to the provider (step S131), as well as digital content CNT into the free-access area (step S132).

(3) Operations of Rental Agent Device 30

Figure 11:
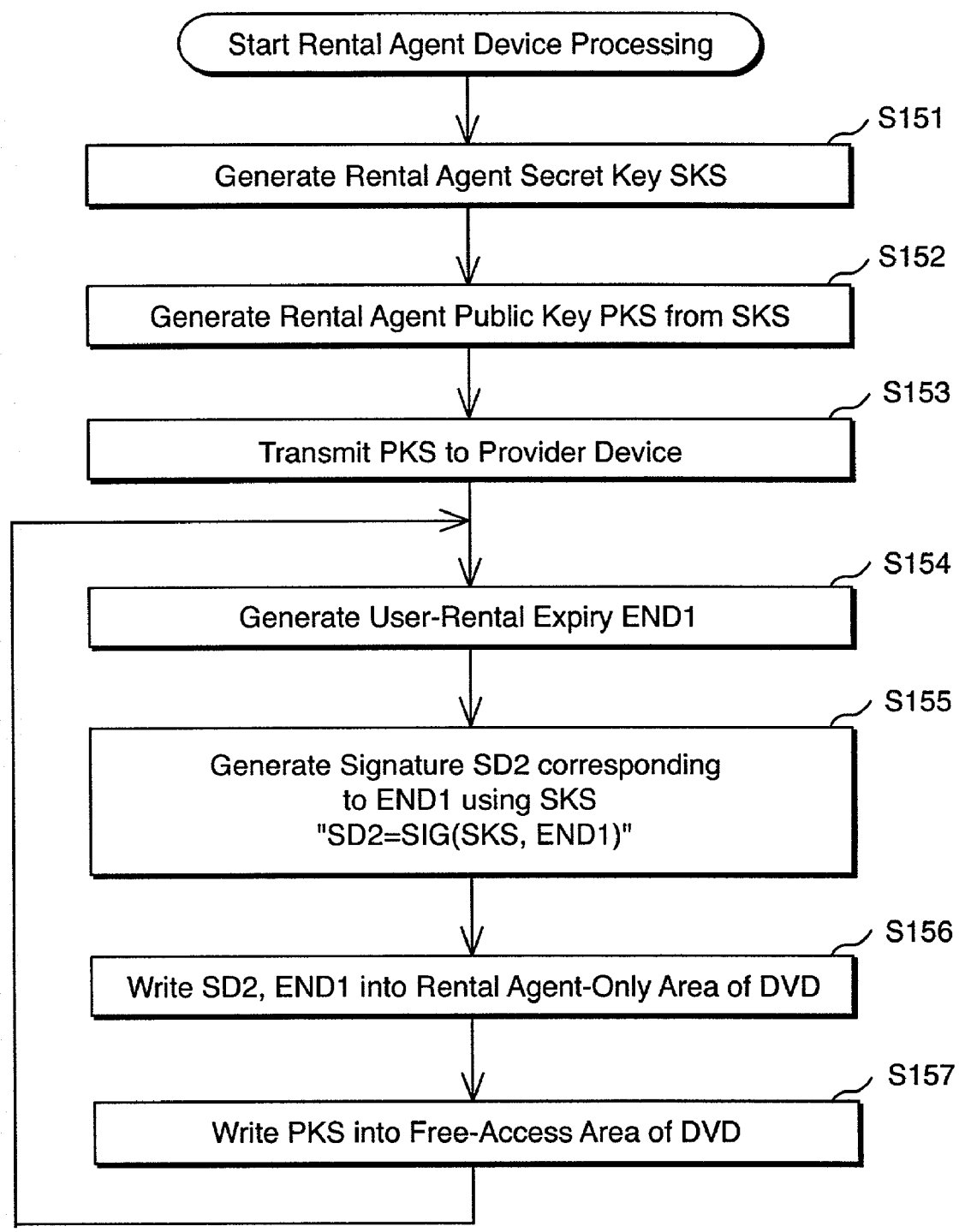
FIG. 11 is a flowchart showing the operations of the rental agent device 30.

Now, a description is given of the operations of the rental agent device 30 with reference to the flowchart shown in FIG. 11.

The control unit 301 of the rental agent device 30 generates a random number, performs an exclusive OR by using the rental agent identifier and the generated random number to generate a secret key SKS of the rental agent, and writes the generated secret key SKS into the information storage unit 304 (step S151). Next, the control unit 301 applies the public key generation algorithm PKEY to the generated secret key SKS to generate the public key PKS, and writes the generated public key PKS into the information storage unit 304 (step S152). Further, the control unit 301 transmits the generated public key PKS to the provider device 20 (step S153).

Thereafter, the control unit 301 repeats steps S154-S157 described below every time the DVD is rented to an end user.

The control unit 301 generates a user-rental expiry END1 representing an expiry of a period during which the end user is permitted to use the DVD (step S154), and applies the digital signature generation algorithm SIG to the user-rental expiry END1 as represented by expression 4 to generate the signature SD2 (step S155). The control unit 301 then writes via the access unit 305 SD2 and END1 into the rental agent-only area provided on the DVD 62 (step S156), while writing PKS into the free-access area (step S157).

(4) Operations of DVD Player 40

Figure 12:
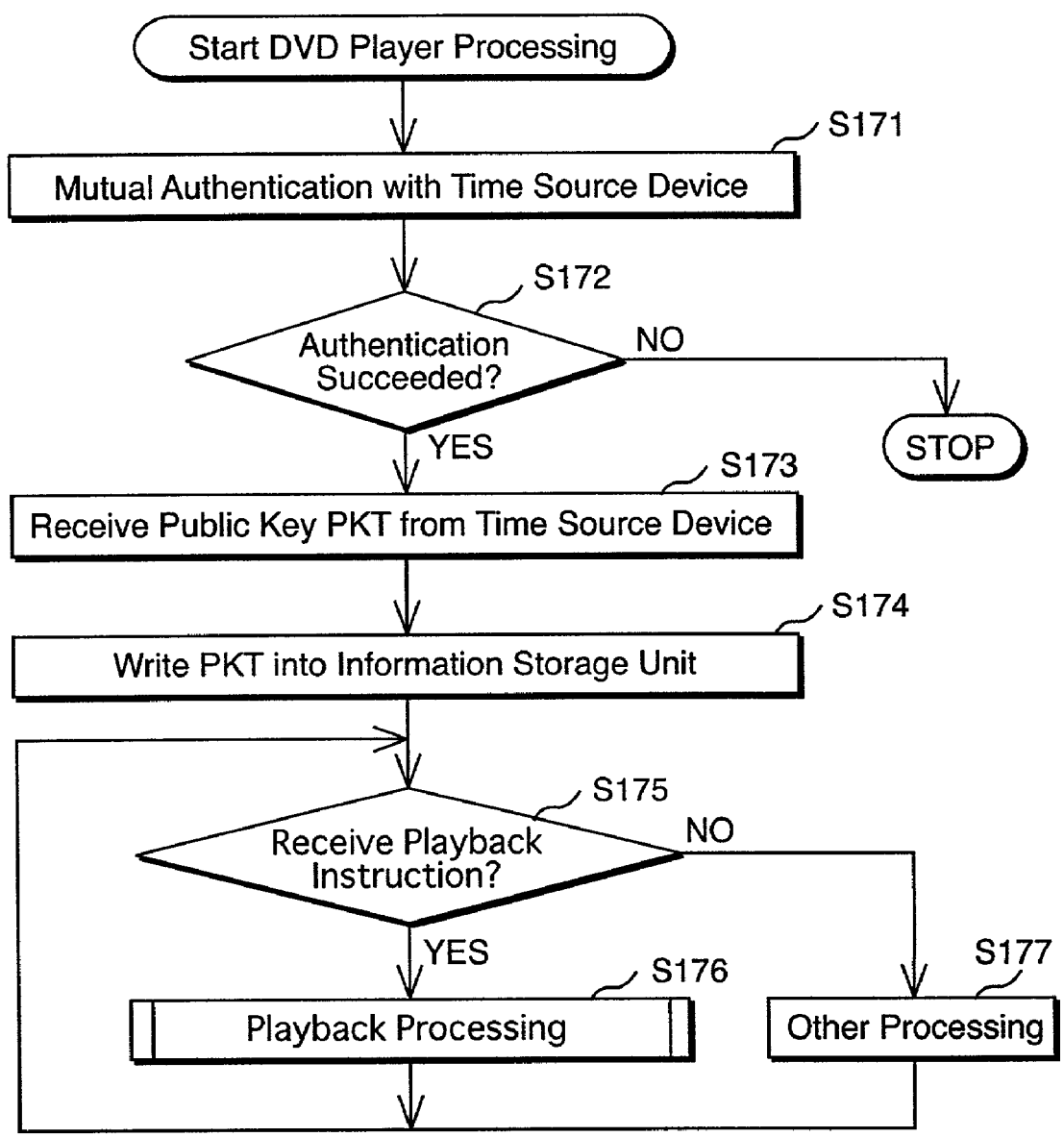
FIG. 12 is a flowchart showing the operations of the DVD player 40.

Now, a description is given of the operations of the DVD player 40 with reference to the flowchart shown in FIG. 12.

In response to the instruction given from the control unit 401, the authentication unit 402 performs processing for mutual authentication between the DVD player 40 and the time source device 50 (step S171). The control unit 401 receives the result of the authentication and terminates the processing in the event that the authentication fails (step S172, NO).

On the other hand, in the event that the authentication is successful (step S172, YES), the control unit 401 receives the public key PKT of the time source unit 50 from the time source unit 50 (step S173), and then writes the received public key PKT into the information storage unit 405 (step S174).

Upon receipt of a user input that instructs processing other than playback processing of the content (step S175), the control unit 401 performs the instructed processing (step S177) and goes back to step S175 to repeat the processing.

Upon receipt of a user input instructing to play back the content recorded on the DVD (step S175), the control unit 401 performs processing to play back the content (step S176), and then goes back to step S175 to repeat the processing.

Figure 13:
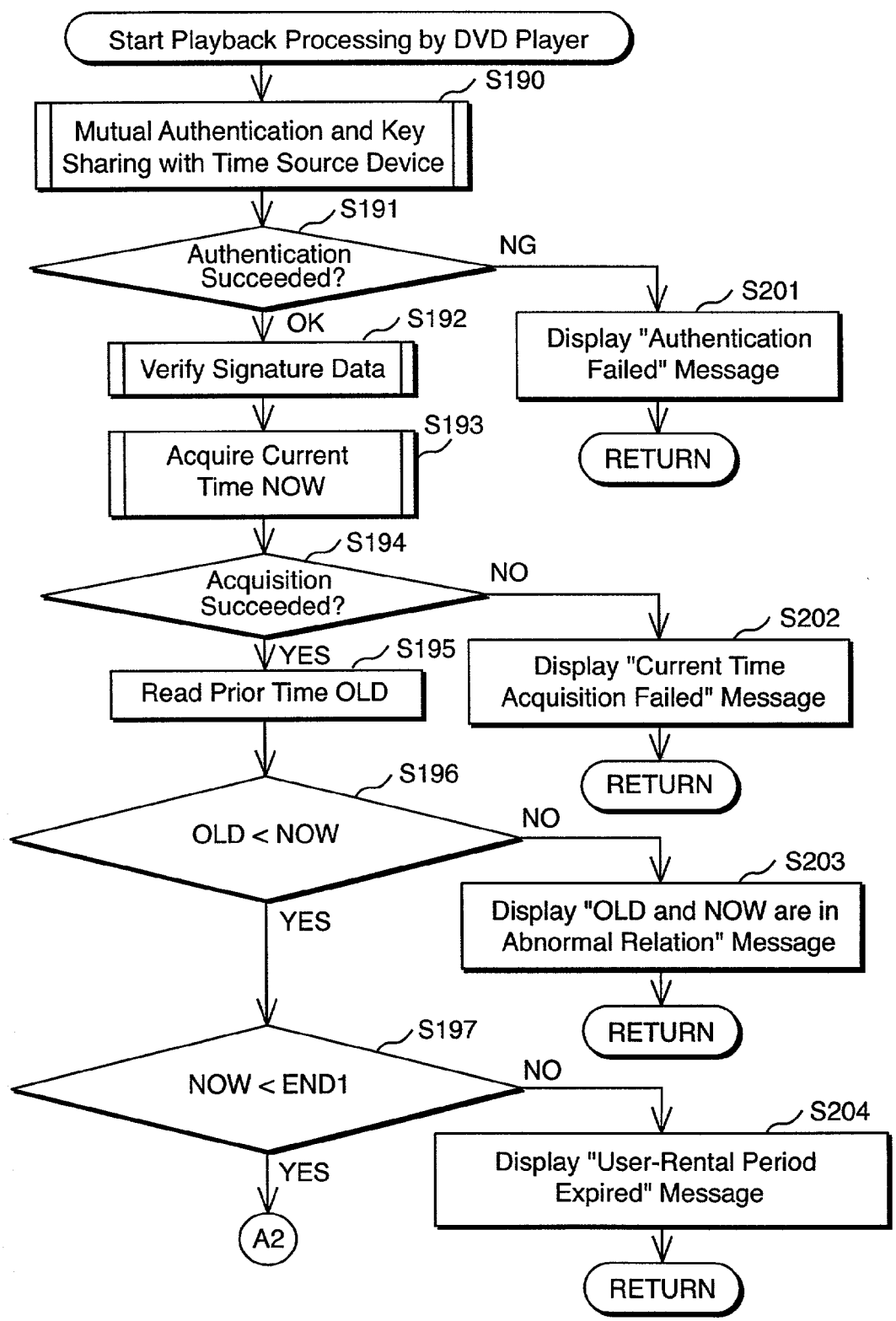
FIG. 13 is a flowchart showing, in detail, the operations of the DVD player 40 for the playback processing of the content, and the operations are continued to FIG. 14.
Figure 14:
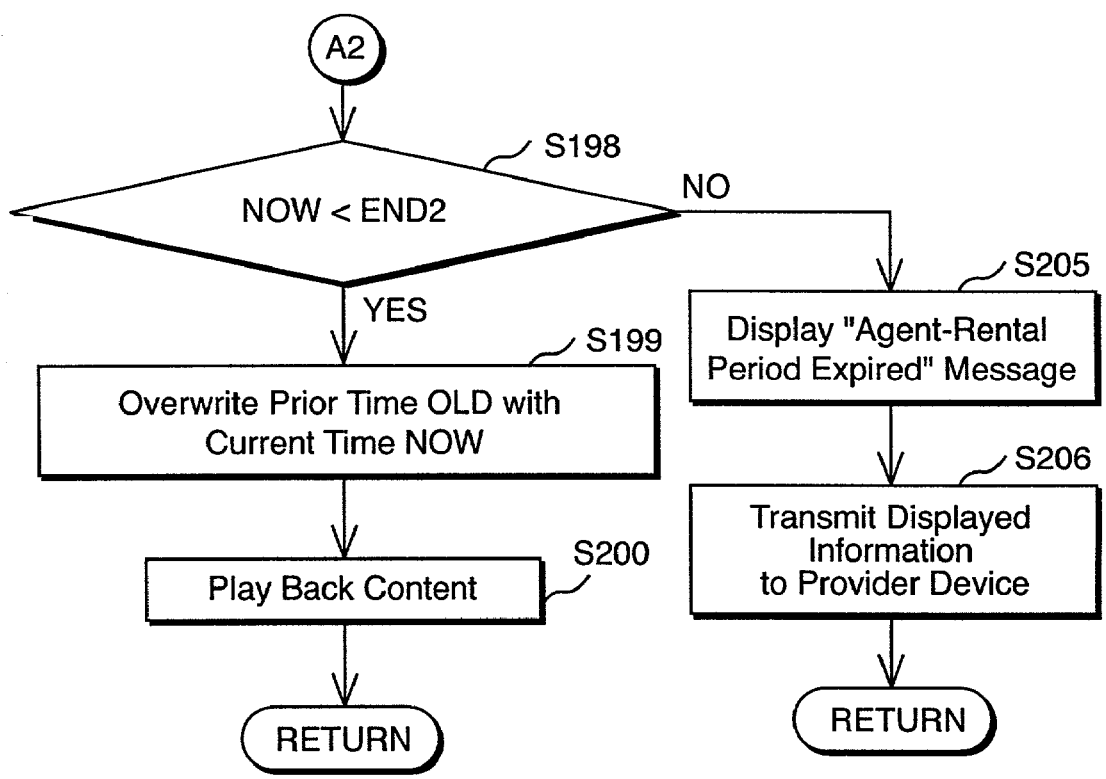
FIG. 14 is a flowchart showing, in detail, the operations of the DVD player 40 for the playback processing of the content, where the operations in FIG. 14 are continued from FIG. 13.

Now, a detailed description is given of the playback processing performed in step S176 with reference to the flowchart shown in FIGS. 13 and 14.

In response to the instructions given from the control unit 401, the authentication unit 402 performs processing for mutual authentication between DVD as well as for key sharing between the DVD player 40 and the time source device 50 (step S190).

The control unit 401 then receives the result of the authentication from the authentication unit 402. Upon receiving a result that the authentication has failed (step S191, NG), the control unit 401 outputs a message indicating that the authentication has failed (step S201), and terminates the processing.

On the other hand, in the event that the authentication is successful (step S191, OK), the control unit 401 verifies the signature data (step S192), and performs later-described processing for acquiring the current time NOW from the time source device 50 (step S193) provided that the signature data has been successfully verified. In the event that the current time NOW is not acquired successfully (step S194, NO), the control unit 401 outputs to the display unit 408 a message indicating that the acquisition of the current time NOW has failed (step S202), and terminates the processing.

On the other hand, in the even that the acquisition of the current time NOW is performed successfully (step S194, YES), the control unit 401 reads the prior time OLD from the information storage unit 405 (step S195), and compares the prior time OLD with the current time NOW (step S196). In the event that the prior time OLD is equal to or later than the current time NOW (step S196, NO), the control unit 401 outputs a message indicating that the prior time OLD and the current time NOW are in an abnormal relation (step S203), and terminates the processing.

On the other hand, in the event that the prior time OLD is prior to the current time NOW (step 196, YES), the control unit 401 reads the user-rental expiry END1 from the information storage unit 405, and compares the current time NOW with the user-rental expiry END1 (step S197). In the event that the current time NOW is equal to or later than the user-rental expiry END1 (step S197, NO), the control unit 401 outputs to the display unit 408 a message indicating that the user-rental period has expired (step S204), and terminates the processing.

On the other hand, in the event that the current time NOW is prior to the user-rental expiry END1 (step S197, YES), the control unit 401 reads the agent-rental expiry END2 from the information storage unit 405, and compares the current time NOW with the agent-rental expiry END2 (step S198). In the event that the current time NOW is equal to or later than the agent-rental expiry END2 (step S198, NO), the control unit 401 outputs to the display unit 408 a message indicating that the agent-rental period has expired (step S205), transmits that message to the provider device 20 (step S206), and terminates the processing.

On the other hand, in the event that the current time NOW is prior to the agent-rental expiry END2 (step S198, YES), the control unit 401 overwrites the prior time OLD stored in the information storage unit 405 with the current time NOW (step S199), reads the content CNT from the free-access area of DVD 62 via the access unit 404, and outputs the read content to the playback unit 406 (step S200).

Figure 15:
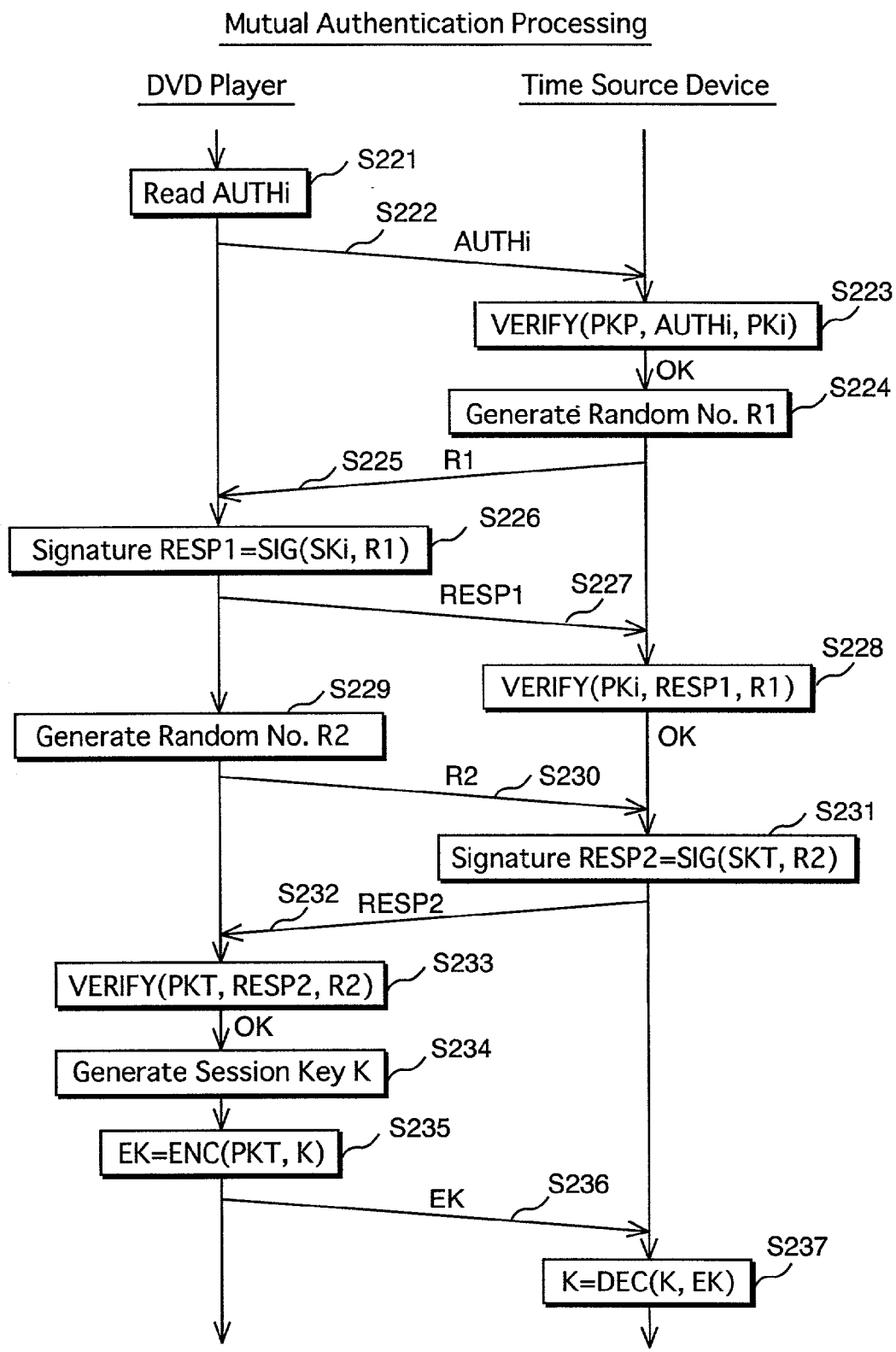
FIG. 15 is a flowchart showing the operations of the DVD player 40 and the time source device 50 for mutual authentication processing as well as key sharing processing.

(5) Operations of DVD Player 40 and Time Source Device 50 for Mutual Authentication Processing and Key Sharing Processing Now, a description is given of the operations of the DVD player 40 and the time source device 50 that are performed for the mutual authentication processing and the key sharing processing with reference to the flowchart shown in FIG. 15.

The authentication unit 402 of the DVD player 40 reads signature AUTHi from the information storage unit 405 via the control unit 401 (step S221), and transmits to the authentication unit 503 of the time source device 50 the read signature AUTHi together with user's public key PKi via the transmitting/receiving unit 403 and the Internet 5 (step S222). Upon receipt of the signature AUTHi and the public key PKi, the authentication unit 503 applies signature verification algorithm VERIFY to the signature AUTHi by using the provider public key PKP to verify whether or not the signature AUTHi is truly generated from PKi. Here, the verification operation is represented as VERIFY(PKP, AUTHi, PKi) (step S223).

In the event that the verification is successful, the authentication unit 503 generates a random number R1 (step S224), and transmits the generated random number R1 to the authentication unit 402 via the transmitting/receiving unit 504 and the Internet 5 (step S225). Upon receipt of the random number R1, the authentication unit 402 applies the digital signature generation algorithm SIG to the received random number R1 by using the secret key SKi to generate a user i signature RESP1 (step S226), and transmits the generated signature RESP1 to the authentication unit 503 via the transmitting/receiving unit 403, the Internet 5, and the transmitting/receiving unit 504 (step S227).

Next, the authentication unit 503 applies a signature verification algorithm VERIFY to the signature RESP1 by using user's public key PKi to verify whether or not the signature RESP1 is truly generated from the random number R1. Here, the verification operation is represented as VERIFY(PKi, RESP1, R1) (step S228).

In the event that the verification is successful, the authentication unit 402 generates a random number R2 (step S229), and transmits the generated random number R2 to the authentication unit 503 via the transmitting/receiving unit 403, the Internet 5, and the transmitting/receiving unit 504 (step S230). Upon receipt of the random number R2, the authentication unit 503 applies the digital signature generation algorithm SIG to the received random number R2 by using the secret key SKT of the time source device 50 to generate a signature RESP2 of the time source device 50 (step S231), and then transmits the generated RESP2 to the authentication unit 402 via the transmitting/receiving unit 504, the Internet 5, and the transmitting/receiving unit 403 (step S232).

Next, the authentication unit 402 applies the signature verification algorithm VERIFY by using the public key PKT of the time source device 50 to verify whether or not the signature RESP2 is truly generated from the random number R2. Here, the verification operation is represented as VERIFY (PKT, RESP2, R2) (step S233).

Operations described up to this point are for mutual verification between the DVD player 40 and the time source device 50.

In the event that the mutual verification is successful, the processing then goes onto the operations for key sharing.

In the key sharing processing, the authentication unit 402 generates a random number, performs an exclusive OR by using the generated random number and the user identifier IDi to newly generate a session key K (step S234), and applies an encryption algorithm ENC to the session key K by using the public key PKT of the time source device 50 to generate ciphertext EK=ENC(PKT, K) (step S235). Next, the authentication unit 402 transmits the generated ciphertext EK to the authentication unit 503 via the transmitting/receiving unit 403, the Internet 5, and the transmitting/receiving unit 504 (step S236). Upon receipt of the ciphertext EK, the authentication unit 503 applies a decryption algorithm DEC to the ciphertext EK by using the secret key SKT to decrypt the session key K=DEC(SKT, EK) (step S237) Here, the decryption algorithm DEC is an inversion of the above-described encryption algorithm ENC.

(6) Operations of DVD player 40 for Acquisition of Current Time from Time Source Device 50

Figure 16:
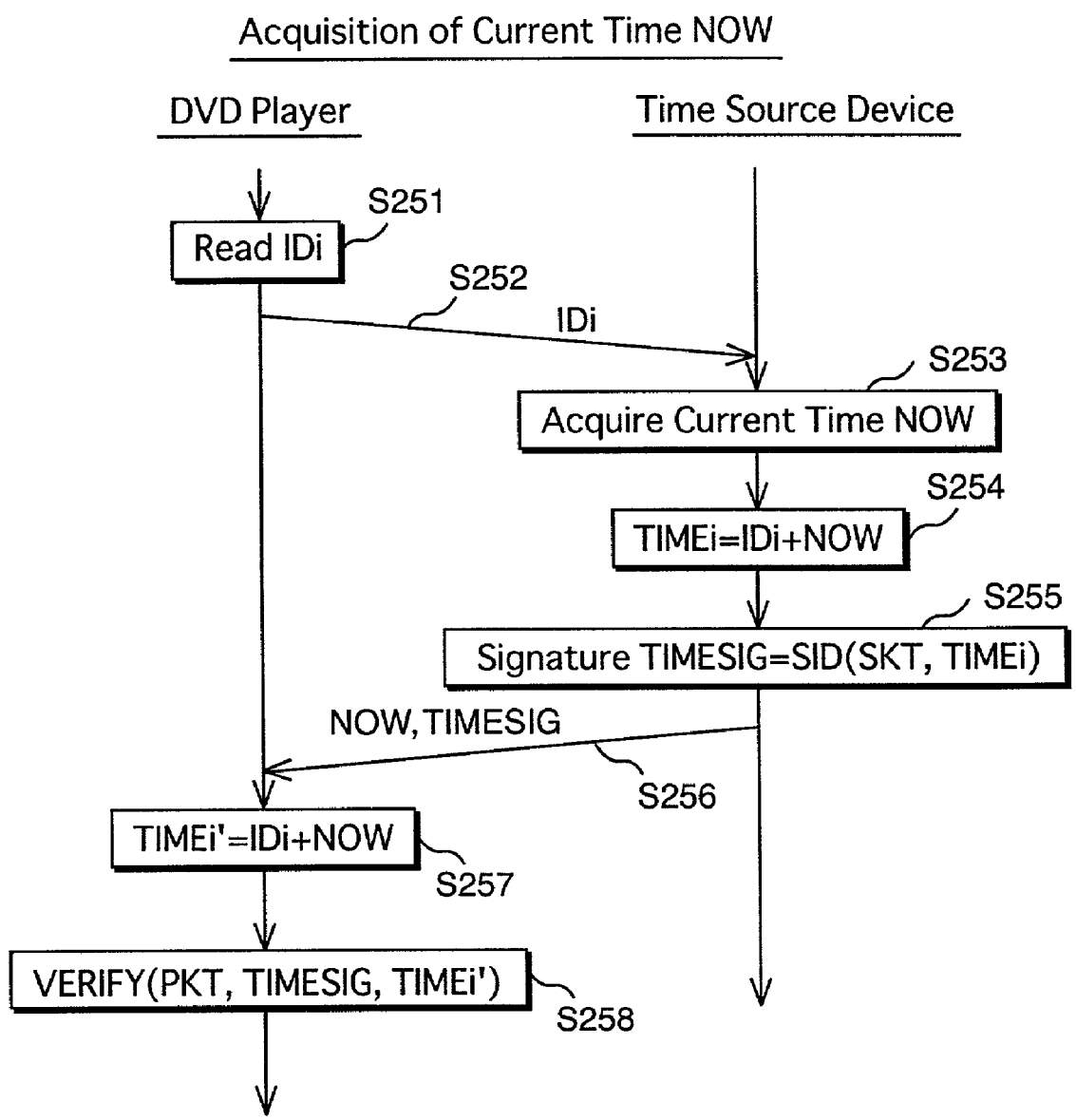
FIG. 16 is a flowchart showing the operations of the DVD player 40 for acquiring a current time from the time source device 50.

Now, a description is given of the operations that are performed by the DVD player 40 for acquiring a current time from the time source device 50 with reference to the flowchart shown in FIG. 16.

The control unit 401 reads the user identifier IDi from the information storage unit 405 (step S251), and outputs the read user identifier IDi to the control unit 501 via the transmitting/receiving unit 403, the Internet 5, and the transmitting/receiving unit 504 (step S252).

The current time generating unit 502 generates and outputs the current time NOW, and the control unit 501 acquires the current time NOW generated and outputted by the current time generating unit 502 (step S253). Next, the control unit 501 joins user identifier IDi and current time NOW in the stated order to generate user time TIMEi (step S254). The control unit 501 then applies the digital signature generation algorithm SIG to the user time TIMEi as represented by expression 5 below to generate a signature TIMESIG (step S255).

$$TIMESIG = SIG(SKT, TIMEi) \quad \text{(Expression 5)}$$

Next, the control unit 501 transmits the current time NOW and the signature TIMESIG to the control unit 401 via the transmitting/receiving unit 504, the Internet 5, and the transmitting/receiving unit 403, and the control unit 401 receives the transmitted current time NOW and signature TIMESIG (step S256).

Here, the control unit 401 joins the user identifier IDi stored in information storage unit 405 and the received current time NOW in the stated order to generate user time TIMEi' (step S257). The control unit 401 then applies the signature verification algorithm VERIFY to the signature TIMESIG by using the public key PKT of the time source device 50 as represented by expression 6 to verify whether or not signature TIMESIG is truly generated from the user time TIMEi by the time source device 50 (step S258), and outputs the result of whether or not the verification is successful.

1.7 Overview

As has been described above, upon manufacturing a DVD to be supplied to the rental agent, the provider device 20 writes an agent-rental expiry END2 together with the content onto the DVD. In addition, upon renting the DVD to an end user, the rental agent device 30 additionally writes a user-rental expiry END1 onto the DVD. The user installs the DVD into the DVD player 40 to play back the content. At this time, the DVD player 40 acquires a current time NOW from the time source device 50, and compares the acquired current time NOW with a prior time OLD, the agent-rental expiry END2 and also with the user-rental expiry END1 to determine whether or not to play back the content. The DVD player 40 plays back the content only when conditions for playback are met.

2. Rental System 2

Now, a description is given of a rental system 2 according to another preferred embodiment of the present invention.

BS digital broadcasters and 110-degree CS broadcasters have already started (1) data broadcasting related to broadcast programs, as well as (2) data broadcasting independent of broadcast programs. A set-top box for receiving such data broadcasting is composed of a large-capacity hard disc drive installed therein. Such a set-top box is referred to as an eSTB and is provided with two tuners.

The first tuner is similar to a conventional TV tuner, and receives, in response to user operations, broadcast programs on a channel that an end user desires to watch.

The second tuner is preset so as to receive only broadcast programs which are transmitted over one or more specific channels that are designated beforehand and are not allowed to be altered by end users. Specific data is broadcasted via those specific channels, and the second tuner receives the specific data and is forced to store the received data into the hard disc.

Figure 18:
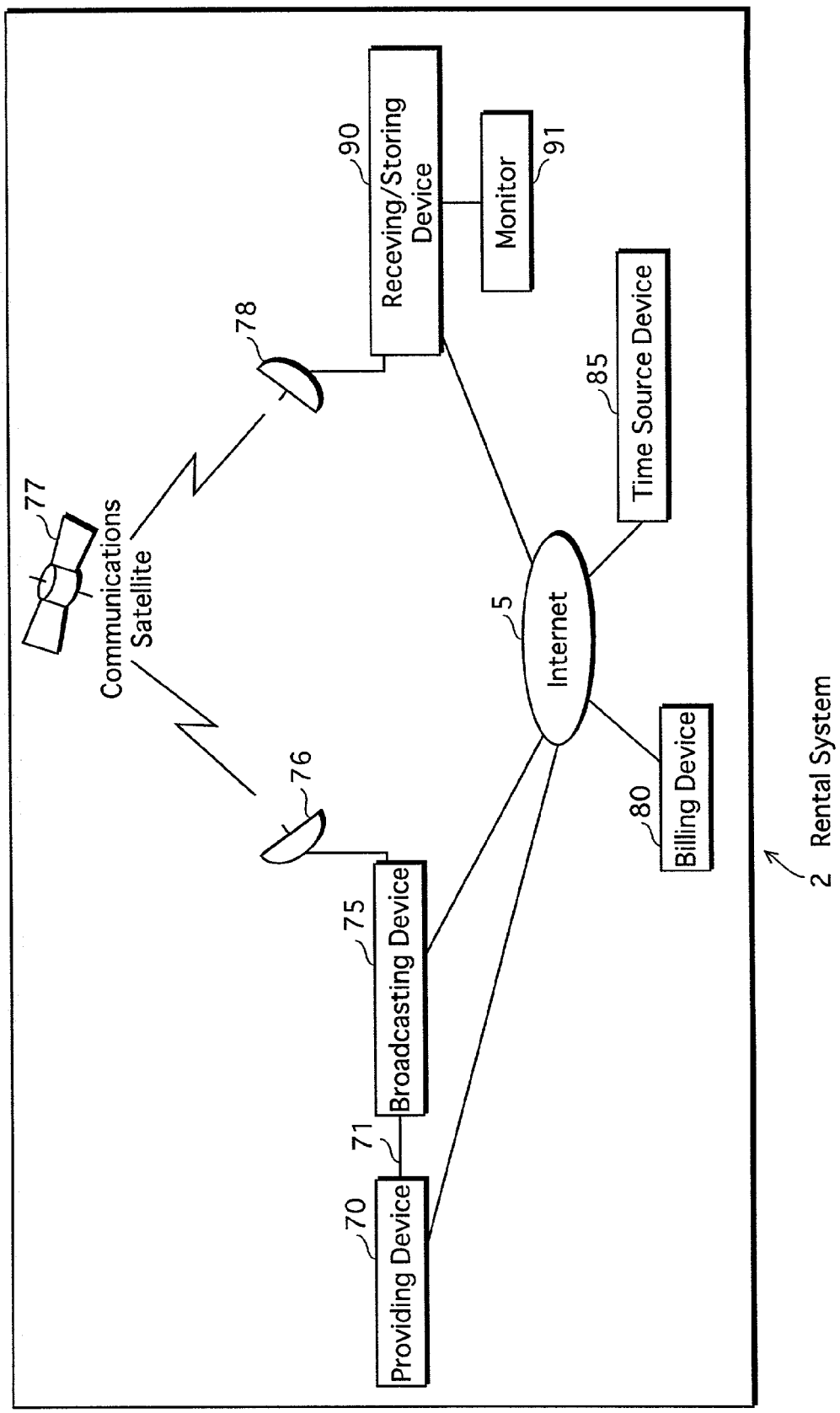
FIG. 18 is a block diagram showing the construction of a rental system 2.

As shown in FIG. 18, the rental system 2 is composed of a providing device 70, a broadcasting device 75, a communications satellite 77, a receiving/storing device 90, a monitor 91, a billing device 80, and a time source device 85. Here, the receiving/storing device 90 is an eSTB.

The providing device 70, broadcasting device 75, billing device 80, and time source device 85 are operated under the administration of a provider, a broadcaster, a billing agent, and a time source agent, respectively. The receiving/storing device 90 is for an end user to use.

The providing device 70 and broadcasting device 75 are connected with each other via a communications line 71. In addition, the providing device 70, broadcasting device 75, receiving/storing device 90, billing device 80, and time source device 85 are interconnected via the Internet 5.

The providing device 70 provides a content to the broadcasting device 75. The broadcasting device 75 broadcasts the content in the form of a broadcast wave via the communications satellite 77. The receiving/storing device 90 receives the broadcast wave, extracts the content from the received broadcast wave, and stores the extracted content. Thereafter, the receiving/storing device 90 is permitted to output a digital work constituting the stored content to the monitor 91 only during the rental period.

2.1 Providing Device 70

Figure 19:
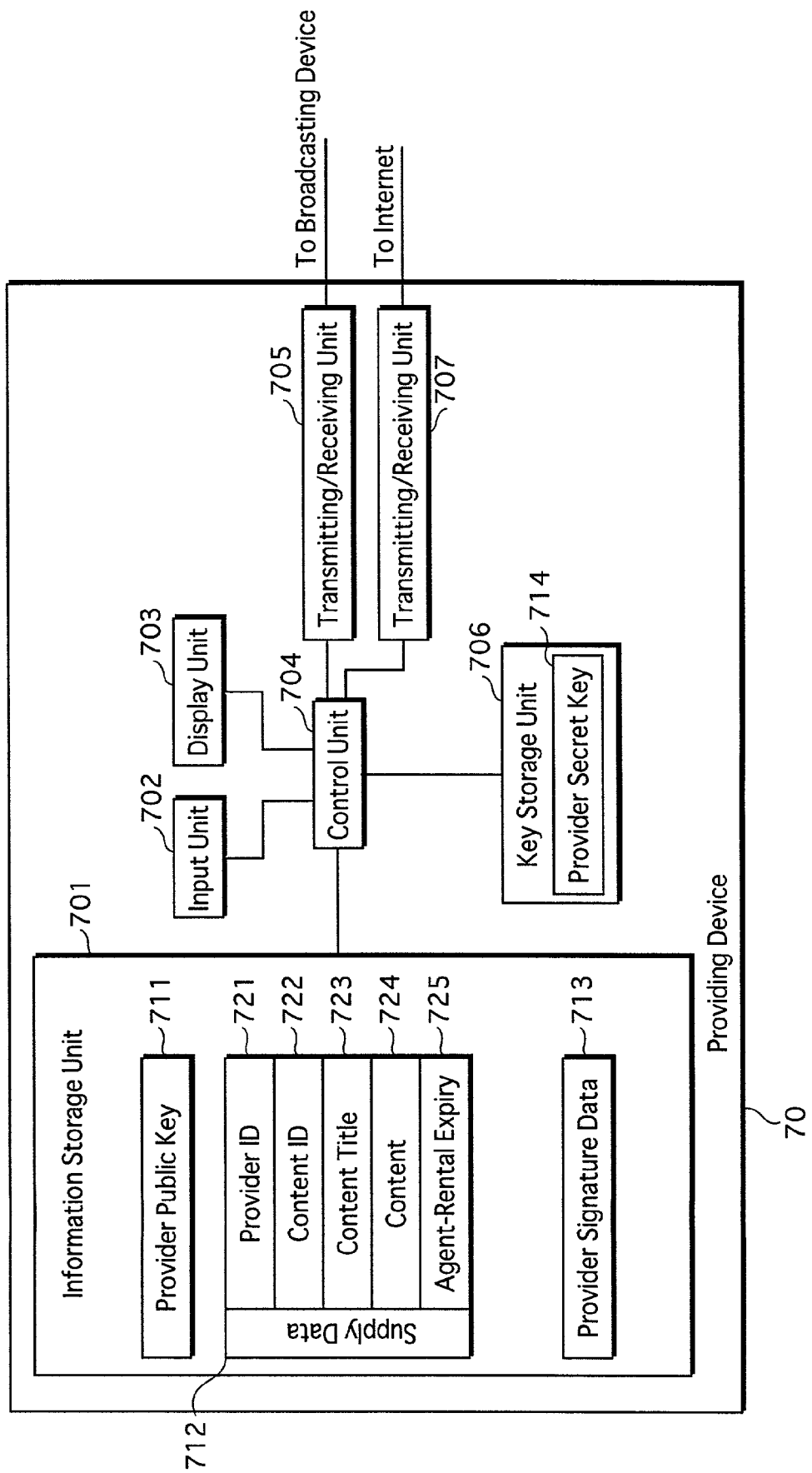
FIG. 19 is a block diagram showing the construction of a providing device 70.

As shown in FIG. 19, the providing device 70 is composed of an information storage unit 701, an input unit 702, a display unit 703, a control unit 704, a transmitting/receiving unit 705, a key storage unit 706, and a transmitting/receiving unit 707.

To be more specific, the providing device 70 is a computer system composed of, for example, a microprocessor, ROM, RAM, a hard disc unit, a display unit, a keyboard, a mouse, a LAN unit. The RAM or the hard disc unit used in the computer system stores a computer program. The providing device 70 performs its function by the microprocessor operating in accordance with the computer program.

(1) Key Storage Unit 706

The key storage unit 706 is a memory unit that is accessible only to the control unit 704 having the read and write permission. Further, the key storage unit 706 prestores a provider secret key 714. Note that the provider secret key 714 is a secret key which is known only to the provider who administrates the providing device 70.

(2) Information Storage Unit 701

To be more specific, the information storage unit 701 is composed of a hard disc unit, and has memory areas for storing a provider public key 711, supply data 712, and provider signature data 713, as shown in FIG. 19 by way of example.

The provider public key 711 is a public key generated from the provider secret key 714, and is passed to and used by other devices.

The supply data 712 is composed of a provider ID 721, a content ID 722, a content title 723, and an agent-rental expiry 725. The memory areas for storing the provider ID 721, content ID 722, content title 723, and content 724 prestore corresponding information.

The provider ID 721 is an identifier for identifying the provider.

The content 724 include a digital work, such as music or a movie that has been encrypted by using a content key.

The content ID 722 is an identifier for identifying the content 724.

The content title 723 is a name for identifying the content 724.

The agent-rental expiry 725 is information composed of data of a year, month, and day representing an expiry date of a period during which the broadcasting device 75 is allowed to use the content 724 in rental services. The broadcasting device 75 is allowed to rent the content 724 to end users until the date of the agent-rental expiry 725 has passed. One example of agent-rental expiry 725 is "May 31, 2005."

The provider signature data 713 is signature data for verifying whether the agent-rental expiry included in supply data 712 is unaltered. The provider signature data 713 is generated by applying a digital signature algorithm to the supply data 712 by using the provider secret key 714.

(3) Control Unit 704

(Generation of Provider Public Key)

The control unit 704 reads the provider secret key 714 from the key storage unit 706, and generates a provider public key by applying a public key generation algorithm to the read provider secret key 714. Next, the control unit 704 writes the generated provider public key as provider public key 711 into the information storage unit 701.

Further, the control unit 704 transmits the generated provider public key to the broadcasting device 75 via the transmitting/receiving unit 705 and the communications line 71. In addition, the control unit 704 transmits the generated provider public key to the receiving/storing device 90 via the transmitting/receiving unit 707 and the Internet 5.

(Generation and Transmission of Supply Data and Provider Signature Data)

The control unit 704 reads, from the information storage unit 701, the provider ID 721, content ID 722, content title 723, and content 724.

Next, the control unit 704 generates an agent-rental expiry. Here, the control unit 704 designates, as the agent-rental expiry, the date (year, month, and day) five years from the current date. Note that the agent-rental expiry may be determined in any other manner. For example, absolute expiry dates may be set depending on each type of content. Now, the control unit 704 writes into information storage unit 701 the generated agent-rental expiry as the agent-rental expiry 725 constituting the supply data 712.

Next, the control unit 704 reads the provider secret key 714 from the key storage unit 706, and the supply data 712 including the thus written agent-rental expiry 725 from the information storage unit 701. The control unit 704 then applies a digital signature generation algorithm SIG to the read supply date 712 by using the read provider key 714 to generate provider signature data.

Provider Signature Data=SIG(Provider Secret Key, Supply Data)

Subsequently, the control unit 704 writes the generated provider signature data as the provider signature data 713 into the information storage unit 701, and then transmits the read supply data and the generated provider signature data to the broadcasting device 75 via the transmitting/receiving unit 705 and the communications line 71.

(4) Transmitting/Receiving Units 705 and 707

The transmitting/receiving unit 705 is connected to the broadcasting device 75 via the communications line 71, and performs data transmission between the control unit 704 and the broadcasting device 75.

The transmitting/receiving device 707 is connected to the other devices via the Internet 5, and performs transmission of information between the control unit 704 and the other devices.

(5) Input Unit 702 and Display Unit 703

The input unit 702 accepts user operations, and outputs corresponding operational information to the control unit 704.

The display unit 703 receives information from the control unit 704 and displays the received information.

2.2 Broadcasting Device 75

Figure 20:
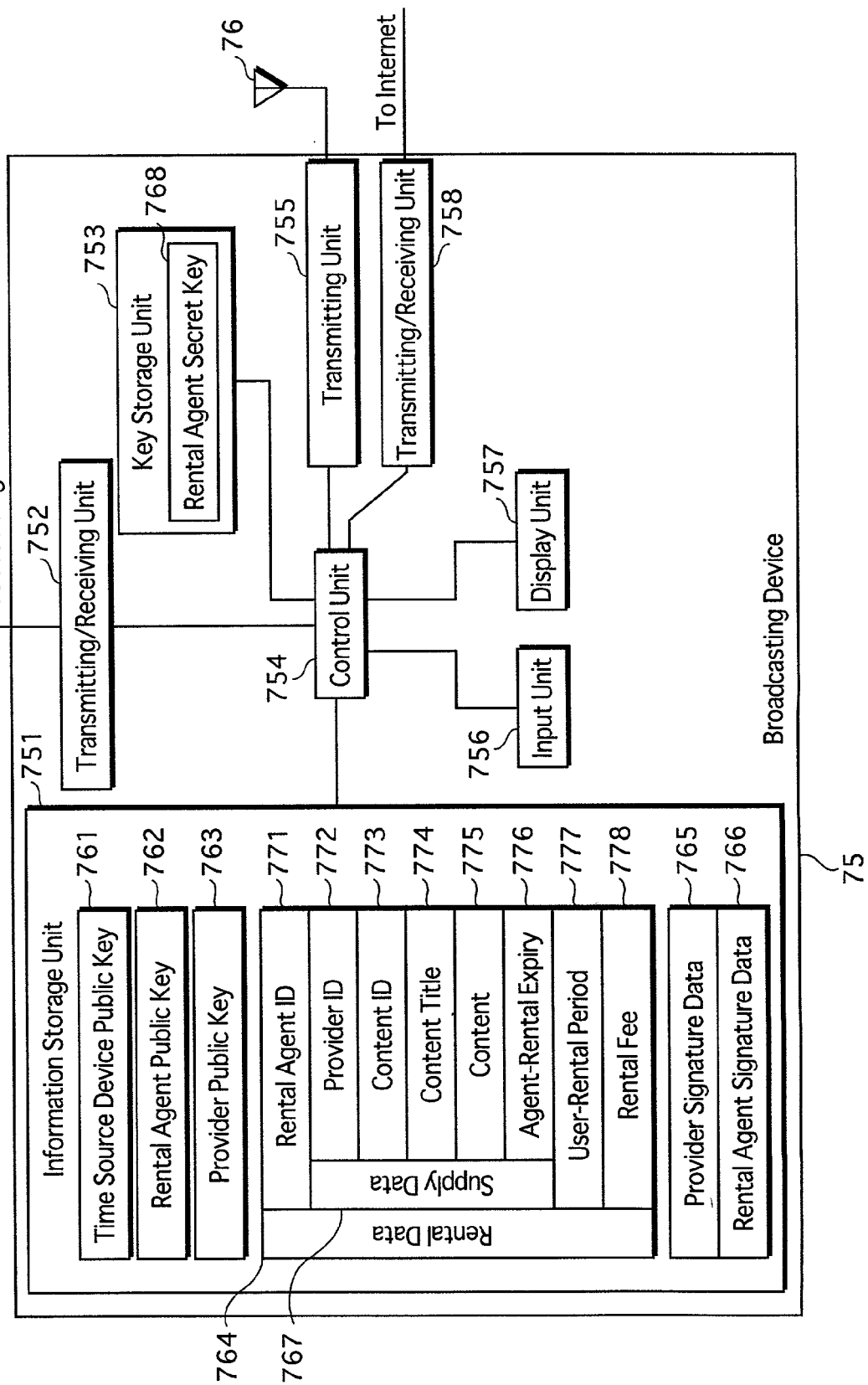
FIG. 20 is a block diagram showing the construction of a broadcasting device 75.

As shown in FIG. 20, the broadcasting device 75 is composed of an information storage unit 751, a transmitting/receiving unit 752, a key storage unit 753, a control unit 754, a transmitting unit 755, an input unit 756, a display unit 757, and a transmitting/receiving unit 758.

Similar to the providing device 70, the broadcasting device 75 is a computer system storing a computer program and including a microprocessor. The broadcasting device 75 performs its function by the microprocessor operating in accordance with the computer program.

The broadcasting device 75 broadcasts a broadcast program composed of image data and voice data via the antenna 76 and the communications satellite 77. The broadcasting device 75 also broadcasts, as will be described later, content including digital works in cipher.

(1) Key Storage Unit 753

The key storage unit 753 is a memory unit that is accessible only to the control unit 754 having the read and write permission.

The key storage unit 753 prestores a rental agent secret key 768. Here, the rental agent secret key 768 is a secret key which is known only to the broadcaster who administrates the broadcasting device 75.

(2) Information Storage Unit 751

To be more specific, the information storage unit 751 is composed of, for example, a hard disc unit, and has memory areas for storing a time source device public key 761, a rental agent public key 762, a provider public key 763, rental data 764, provider signature data 765, and rental agent signature data 766, as shown in FIG. 20 by way of example.

The time source device public key 761 is a public key which is generated from a secret key of the time source device 85 that is known only to the time source device 85.

The rental agent public key 762 is a public key which is generated from a rental agent secret key that is known only to the broadcasting device 75.

The provider public key 763 is a public key which is generated from a provider secret key that is known only to the providing device 70.

The rental data 764 is composed of a rental agent ID 771, supply data 767, a user-rental period 777, and a rental fee 778.

The rental agent ID 771 is an identifier for identifying the broadcaster who administrates the broadcasting device 75. The rental agent ID 771 is prestored in a corresponding memory area of the rental data 764.

The supply data 767 is the same as the supply data transmitted from the providing device 70.

The user-rental period 777 is a period determined in days, such as "7 days", representing the period within which the receiving/storing device 90 is permitted to output content 775 included in the supply data 767. In other words, the receiving/storing device 90 is permitted to rent the content 775 to end users for the duration of the user-rental period 777 starting from the day the content 775 are played back for the first time.

The rental fee 778 is a value to be paid by an end user for renting the content 775 included in the supply data 767.

The provider signature data 765 is the same as the provider signature data 713, and thus the description thereof is omitted.

The rental agent signature data 766 is signature data which is generated for verifying whether the user-rental period 777 is unaltered. The rental agent signature data 766 is generated by applying a digital signature algorithm to the rental data 764 by using the rental agent secret key 768.

(3) Control Unit 754

(Reception and Storage of Provider Public Key)

The control unit 754 receives the provider public key from the providing device 70 via the communications line 71 and the transmitting/receiving unit 752, and writes the received provider public key as the provider public key 763 into the information storage unit 751.

(Reception and Storage of Supply Data and Provider Signature Data)

The control unit 754 receives the supply data and provider signature data from the providing device 70 via the communications line 71 and the transmitting/receiving unit 752, and writes, into the information storage unit 751, the received supply data and provider signature data as the supply data 767 and provider signature data 765, respectively.

(Generation and Broadcast of Rental Data and Other Data)

The control unit 754 reads from the information storage unit 751 the provider signature data 765, provider public key 763, and supply data 767. The control unit 754 then applies a digital signature verification algorithm to the read supply data and provider signature data by using the read provider public key 763 to verify whether or not the agent-rental expiry included in the read supply data is altered.

VERIFY(Provider Public Key, Provider Signature Data, Supply Data)

Having verified that the agent-rental expiry is unaltered, the control unit 754 acquires the current time from the time source device 85. On the other hand, having detected an alteration, the control unit 754 outputs to the display unit 757 a message indicating that no data is permitted to be supplied.

Upon verifying that the agent-rental expiry is unaltered, the control unit 754 compares the acquired current time and the agent-rental expiry included in the supply data. In the event that the current time is equal or prior to the agent-rental expiry, the control unit 754 generates a user-rental period. Here, as one example, the user-rental period is uniformly set to be "7 days." Note that the length of the user-rental period may be varied depending on the content or in accordance with an end user request. The control unit 754 then writes the generated user-rental period as the user-rental period 777 into the information storage unit 751. Next, the control unit 754 generates a rental fee that is required for the content, and writes the generated rental fee as the rental fee 778 into the information storage unit 751.

Thereafter, the control unit 754 reads the rental data 764 composed of the rental agent ID 771, supply data 767, user-rental period 777, and rental fee 778 from the information storage unit 751.

Further, the control unit 754 reads the rental agent secret key 768 from the key storage unit 753, and applies a digital signature algorithm to the read rental data 764 by using the read rental agent secret key 768 to generate rental agent signature data.

Rental Agent Signature Data=SIG(Rental Agent Secret Key, Rental Data)

Next, the control unit 754 writes the generated rental agent signature data as the rental agent signature data 766 into the information storage unit 751.

The control unit 754 then performs reading of the rental data 764, provider signature data 765, and rental agent signature data 766 from information storage unit 751, followed by transmission of the read data to the receiving/storing device 90 via the transmitting unit 755, the antenna 76, and the communications satellite 77.

Further, the control unit 754 compares the acquired current time with the agent-rental expiry included in the supply data. In the event that the current time is later than the agent-rental expiry, the control unit 754 outputs to the display unit 757 a message indicating that no data is permitted to be supplied.

(Acquisition of Current Time from Time Source Device 85)

At an earlier stage, the control unit 754 receives the public key of the time source device 85 from the time source device 85 via the Internet 5 and the transmitting/receiving unit 758, and writes the received time source device public key as the time source device public key 761 into the information storage unit 751.

In order for the broadcasting device 75 to acquire the current time, the control unit 754 issues an acquisition request for the current time to time source device 85 via the transmitting/receiving unit 758 and the Internet 5.

Subsequently, the control unit 754 receives the current time along with current time signature data from the time source device 85 via the Internet 5 and the transmitting/receiving unit 758.

Next, the control unit 754 reads the time source device public key 761 from the information storage unit 751, applies a digital signature verification algorithm to the received current time and current time signature data by using the read public key of time source device to verify whether or not the current time has been altered.

VERIFY(Public Key of Time Source Device, Current Time Signature Data, Current Time)

Having judged that the current time is altered, the control unit 754 terminates the processing. Having verified that there is no alteration, on the other hand, the control unit 754 continues the processing.

(4) Transmitting/Receiving Unit 752, Transmitting Unit 755, and Transmitting/Receiving Unit 758

The transmitting/receiving unit 752 is connected to the broadcasting device 75 via the communications line 71, and performs data transmission between the control unit 754 and the broadcasting device 75.

The transmitting unit 755 is connected to the antenna 76, receives information from the control unit 754, and broadcasts the received information in the form of a broadcast wave via the antenna 76 and the communications satellite 77.

The transmitting/receiving unit 758 is connected to the time source device 85 via the Internet 5, and performs data transmission between the control unit 754 and the time source device 85.

(5) Input Unit 756 and Display Unit 757

The input unit 756 accepts user operations, and outputs corresponding operational information to the control unit 754.

The display unit 757 receives information from the control unit 754, and displays the received information.

2.3 Billing Device 80

Figure 21:
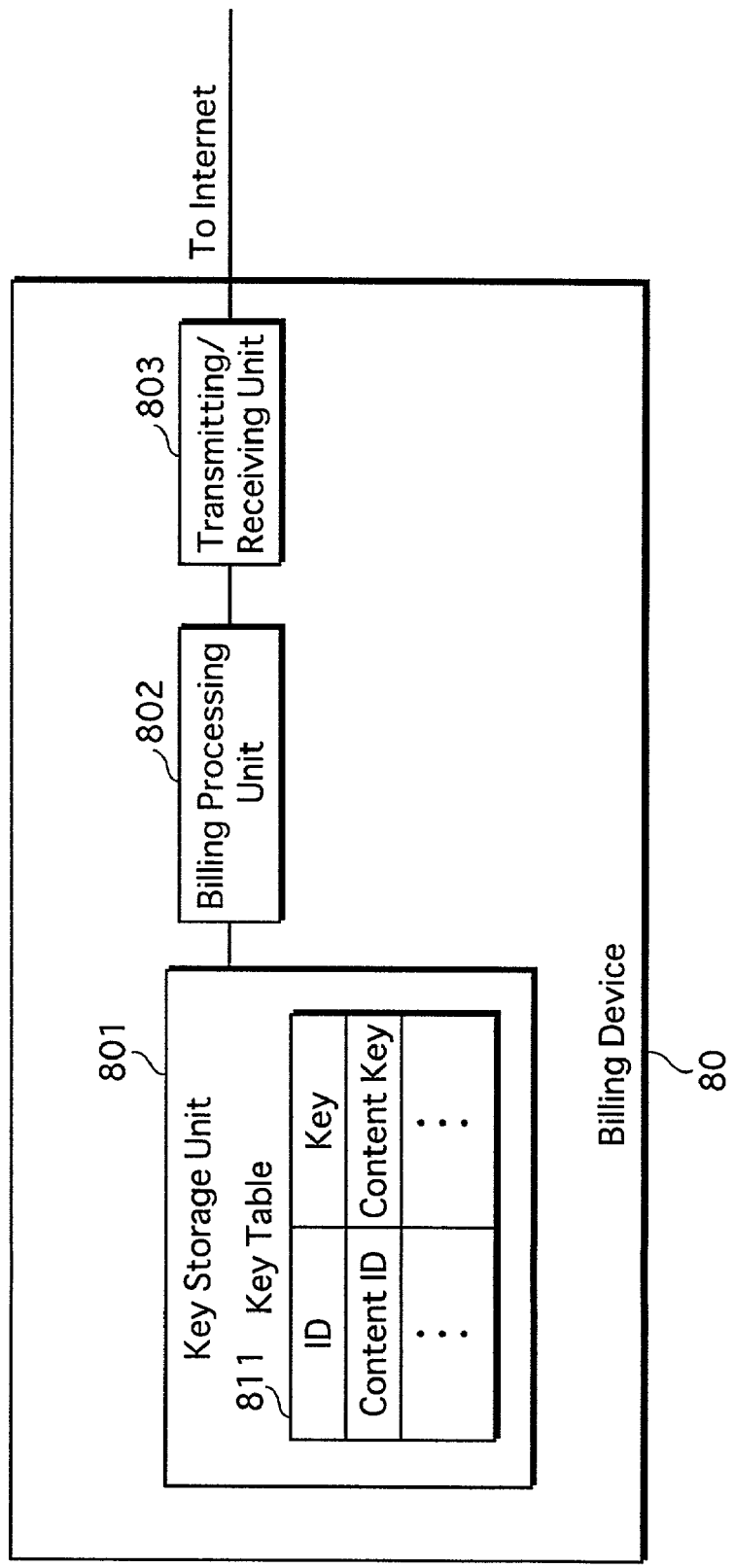
FIG. 21 is a block diagram showing the construction of a billing device 80.

As shown in FIG. 21, the billing device 80 is composed of an information storage unit 801, a billing processing unit 802, and a transmitting/receiving unit 803.

Similar to the providing device 70, the billing device 80 is a computer system storing a computer program and including a microprocessor. The billing device 80 performs its function by the microprocessor operating in accordance with the computer program.

(1) Information Storage Unit 801

As shown in FIG. 21, an exemplary information storage unit 801 prestores a key table 811.

The key table 811 includes memory areas which each store an ID and a corresponding Key.

At least one of the memory areas prestores a content ID and a corresponding content key.

Here, the content ID is the same as the content ID 722 included in the supply data 712 stored in the information storage unit 701 of providing device 70.

Further, the content key is a key which is used to decrypt the cipher corresponding to a digital work included in the content 724 that constitutes the supply data 712.

(2) Billing Processing Unit 802

The billing processing unit 802 first receives payment information and a content ID from the receiving/storing device 90 via the Internet 5 and the transmitting/receiving unit 803, and performs billing processing based on the received payment information and content ID.

Subsequently, the billing processing unit 802 reads a content key that corresponds to the received content ID from the key table 811 stored in the information storage unit 801, and transmits the read content key to the receiving/storing device 90 via the transmitting/receiving unit 803 and the Internet 5.

(3) Transmitting/Receiving Unit 803

The transmitting/receiving unit 803 is connected to the receiving/storing device 90 via the Internet 5, and performs data transmission between the receiving/storing device 90 and the billing processing unit 802.

2.4 Time Source Device 85

Figure 22:
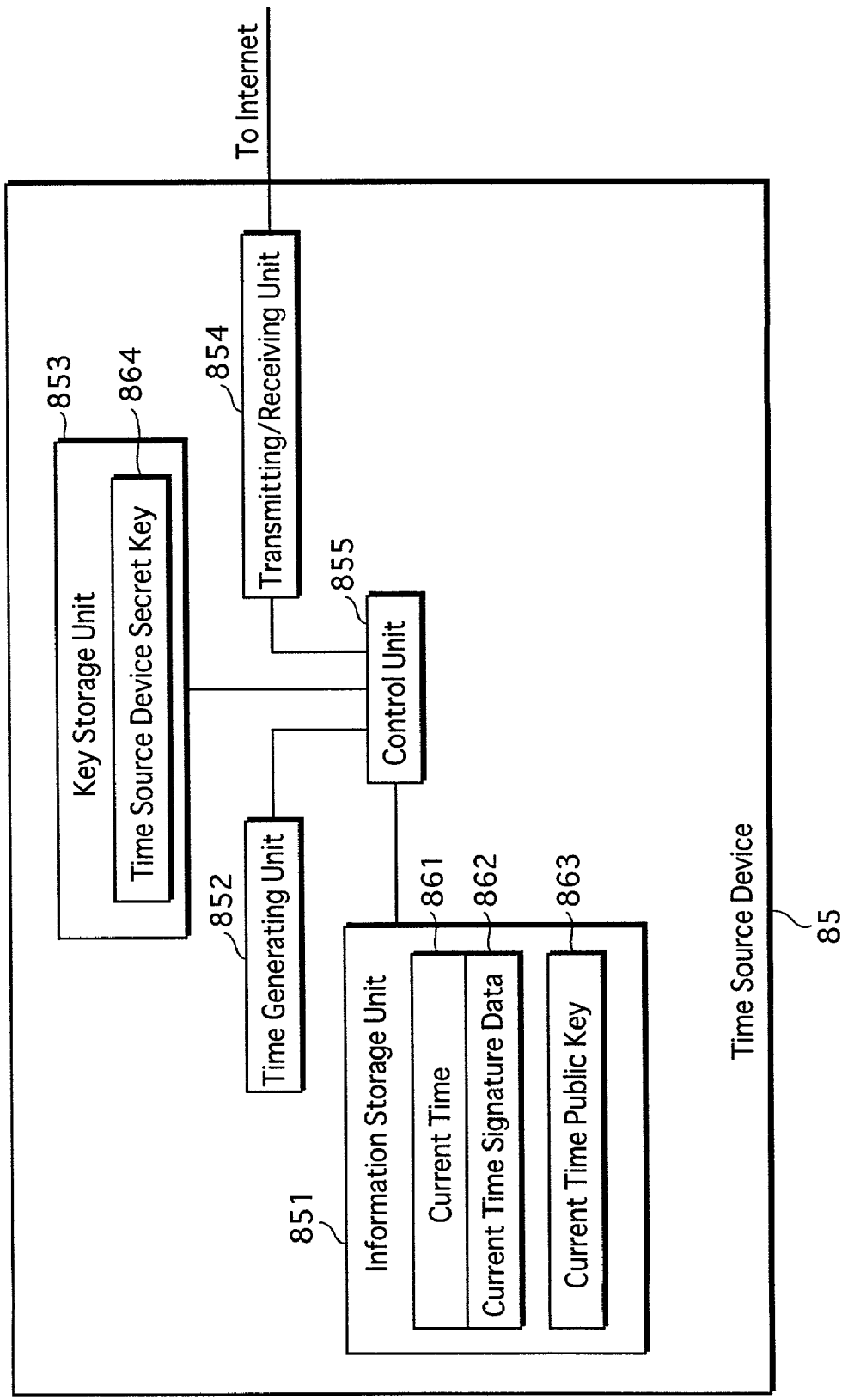
FIG. 22 is a block diagram showing the construction of a time source device 85.

As shown in FIG. 22, the time source device 85 is composed of an information storage unit 851, a time generating unit 852, a key storage unit 853, a transmitting/receiving unit 854, and a control unit 855.

Similar to the providing device 70, the time source device 85 is a computer system storing a computer program and including a microprocessor. The time source device 85 performs its function by the microprocessor operating in accordance with the computer program.

In response to a request from the broadcasting device 75 or the receiving/storing device 90, the time source device 85 generates a current time and transmits the generated current time to the request broadcasting device 75 or the receiving/storing device 90, whichever device that has issued the request.

(1) Key Storage Unit 853

The key storage unit 853 is a memory unit that is accessible only to the control unit 855 having the read and write permission.

The key storage unit 853 prestores a secret key 864 of the time source device which is a secret key known only to the time source agent who administrates the time source device 85.

(2) Information Storage Unit 851

The information storage unit 851 has memory areas for storing a current time 861, current time signature data 862, and a time source device public key 863.

The current time 861 is the time which is generated by the time generating unit 852.

The current time signature data is signature data for verifying whether or not the current time 861 has been altered. The current time signature data is generated by applying a digital signature algorithm to the current time 861 by using the time source device secret key.

The time source device public key 863 is a public key which is generated by applying a public key generation algorithm to the time source device secret key 864.

(3) Time Generating Unit 852

The time generating unit 852 is provided with a timer installed therein, acquires a current time, and outputs the acquired current time to the control unit 855. Note that the current time is composed of data indicating a date in terms of a year, month, and date.

(4) Control Unit 855

Hereinafter, a description is given of the operations of the control unit 855 that are performed at the time of transmitting the current time to the broadcasting device 75 as one example. Note that substantially the same operations are performed at the time of transmitting the current time to the receiving/storing device 90, and thus a description thereof is omitted.

(Transmission of Time Source Device Public Key)

The control unit 855 transmits the time source device public key to the broadcasting device 75 in advance in the following manner.

First, the control unit 855 reads the time source device secret key 684 from the key storage unit 853, generates a time source device public key by applying a public key generation algorithm to the read time source device secret key, and writes the generated time source device public key as the time source device public key 863 into the information storage unit 851.

Next, the control unit 855 transmits the generated time source device public key to broadcasting device 75 via the transmitting/receiving unit 854 and the Internet 5.

(Transmission of Current Time)

The control unit 855 transmits the current time in the following manner.

First, the control unit 855 receives an acquisition request for the current time from the broadcasting device 75 via the Internet 5 and the transmitting/receiving unit 854.

Upon receipt of the acquisition request, the control unit 855 acquires the current time from the time generating unit 852, and reads the time source device secret key 864 from the key storage unit 853.

Subsequently, the control unit 855 applies a digital signature algorithm to the acquired current time by using the read time source device secret key to generate current time signature data.

Current Time Signature Date=SIG(Time Source Device Secret Key, Current Time)

Next, the control unit 855 writes the generated current time signature data as the current time signature data 862 into the information unit 851, and transmits the acquired current time together with the generated current time signature data to the broadcasting device 75 via the transmitting/receiving unit 854 and the Internet 5.

(5) Transmitting/Receiving Unit 854

The transmitting/receiving unit 854 is connected to both the broadcasting device 75 and the receiving/storing device 90, and performs data transmission between the control unit 855 and the broadcasting device 75, or between the control unit 855 and the receiving/storing device 90.

2.5 Receiving/Storing Device 90

Figure 23:
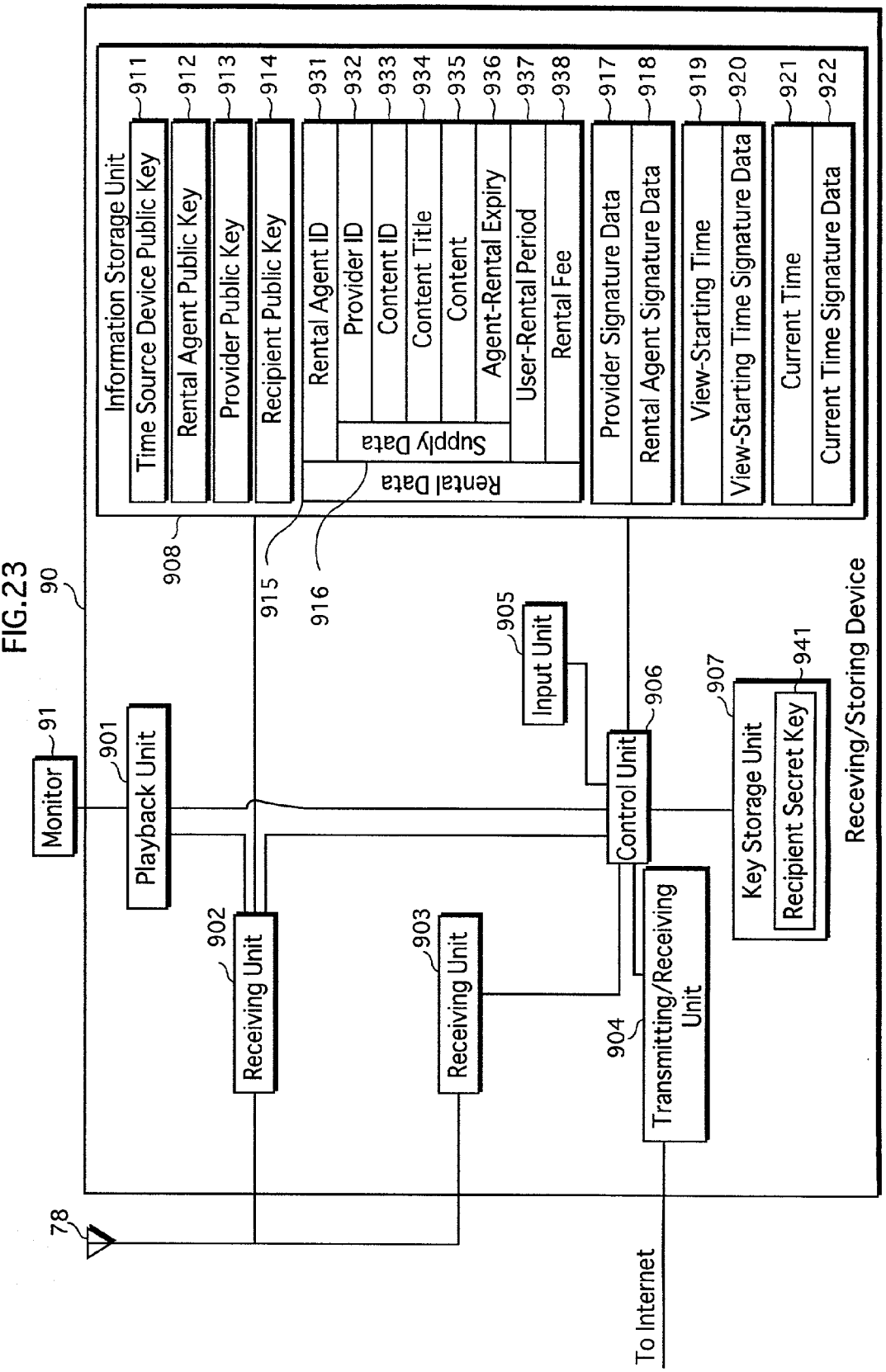
FIG. 23 is a block diagram showing the construction of a receiving/storing device 90.

As shown in FIG. 23, the receiving/storing device 90 is composed of a playback unit 901, a receiving unit 902, a receiving unit 903, a transmitting/receiving unit 904, an input unit 905, a control unit 906, a key storage unit 907, and an information storage unit 908.

Similar to the providing device 70, the receiving/storing device 90 is a computer system storing a computer program and including a microprocessor. The receiving/storing device 90 performs its function by the microprocessor operating in accordance with the computer program.

(1) Key Storage Unit 907

The key storage unit 907 is a memory unit that is accessible only to the control unit 906 having the read and write permission.

Further, the key storage unit 907 prestores a recipient secret key 941. Note that the recipient secret key 941 is a secret key which is known only to the end user who uses the receiving/storing device 90.

(2) Information Storage Unit 908

As shown in FIG. 23 by way of an example, the information storage unit 908 has memory areas for storing a time source device public key 911, a rental agent public key 912, a provider public key 913, a recipient public key 914, rental data 915, provider signature data 917, rental agent signature data 918, view-starting time 919, a view-starting time signature data 920, a current time 921, and current time signature data 922.

The time source device public key 911 is a public key which is generated by applying a public key generation algorithm to the time source device secret key that is known only to time source device 85.

The rental agent public key 912 is a public key which is generated from the rental agent secret key that is known only to the broadcasting device 75.

The provider public key 913 is a public key which is generated from the provider secret key that is known only to the providing device 70.

The recipient public key 914 is a public key which is generated from the recipient secret key that is know only to the receiving/storing device 90.

The rental data 915 is the same as the rental data broadcasted from the broadcasting device 75, and thus a description thereof is omitted.

The provider signature data 917 is the same as the provider signature data 713 described above, and thus a description thereof is omitted.

The rental agent signature data 918 is the same as the rental agent signature data 766, and thus a description thereof is omitted.

The view-starting time 919 is the data representing the date in terms of a year, month and day at which the content included in the rental data 915 is played back for the first time.

The view-string time signature data 920 is signature data which is used for verifying whether or not the view-starting time 919 has been altered, and which is generated by applying a digital signature algorithm to the view-staring time 919 by using a recipient secret key 941.

The current time 921 is the current time transmitted from the time source device 85, and composed of data representing a date in terms of a year, month, and day.

The current time signature data 922 is signature data that is used to verify whether or not the current time 921 has been altered, and is generated by applying a digital signature algorithm to the current time by using the time source device secret key that is known only to time source device 85.

(3) Control Unit 906

(Reception and Storage of Rental Data and Other Data)

The control unit 906 receives the rental data, provider signature data, and rental agent signature data via the antenna 78 and receiving unit 903, and then writes the received rental data, provider signature data, and rental agent signature data into the information storage unit 908 as the rental data 915, provider signature data 917 and rental agent signature data 918, respectively.

(Selection of Content and Payment for the Content)

The control unit 906 reads from the information storage unit 908 a content title 934 and content ID 933 which are both included in rental data 915, and outputs the read content title and content ID to monitor 91 via playback unit 901.

Upon receipt of the content ID via the input unit 905, the control unit 906 generates payment information indicating a rental fee for the content corresponding to the inputted content ID, and transmits the generated payment information along with the inputted content ID to the billing device 80 via the transmitting/receiving unit 904 and the Internet 5.

Further, the control unit 906 receives and stores the content key via the Internet 5 and the transmitting/receiving unit 904.

(Playback of Content)

The control unit 906 receives a playback instruction via the input unit 905.

Upon receipt of a playback instruction, the control unit 906 issues an acquisition request for the current time to the time source device 85. As a consequence, the control unit 906 receives the current time from the time source device 85 via the Internet 5 and the transmitting/receiving unit 904.

Next, the control unit 906 sequentially reads from the information storage unit 908 the provider signature data 917, provider public key 913, and supply data 916. The control unit 906 then applies a signature data verification algorithm to the read supply data and supply data signature data by using the read provider public key to verify whether or not the agent-rental expiry included in the supply data has been altered.

VERIFY(Provider Public Key, Provider Signature Data, Supply Data)

Upon verifying the authenticity of the agent-rental expiry, the control unit 906 compares the acquired current time and the agent-rental expiry included in the supply data. In the event the current time is equal or prior to the agent-rental expiry, the control unit 906 further judges whether the stored content 935 have ever been played back before, i.e., whether the content 935 will be played back for the first time.

Having judged that the content 935 will be played back for the first time, the control unit 906 writes the acquired current time as the view-starting time 919 into the information storage unit 908. Next, the control unit 906 reads the recipient secret key from the key storage unit 907 and the view-starting time 919 from the information storage unit 908, and then applies a digital signature algorithm to the read view-starting time by using the read recipient secret key to generate view-starting time signature data.

View-starting Time Signature Data=SIG(Recipient Secret Key, View-starting Time)

Here, the control unit 906 writes the generated view staring time signature data as view-staring time signature data 920 into the information storage unit 908.

Further, the control unit 906 reads the content 935 from the information storage unit 908, and decrypts a digital work included in the read content 935 in cipher, and outputs the encrypted digital work to the monitor 91 via the playback unit 901.

On the other hand, having judged that content 935 has been played back before, the control unit 906 reads the recipient secret key 941 from the key storage unit 907, and the view-starting time 919 along with the view-starting time signature data 920 from information storage unit 908. Then, the control unit 906 applies a digital signature verification algorithm to the read view-starting time and view-starting time signature data by using the read recipient secret key to verify whether or not the view-starting time has been altered.

VERIFY(Recipient Secret Key, View-starting Time Signature Data, View-starting Time)

Having verified the authenticity of the view-starting time, the control unit 906 reads the rental agent public key 912, rental data 915, and rental agent signature data 918 from the information storage unit 908. Subsequently, the control unit 906 applies a digital signature verification algorithm to the read rental data and the read rental agent signature data by using the read rental agent public key to verify whether or not the user-rental period has been altered.

VERIFY(Rental Agent Public Key, Rental Agent Signature Data, Rental Data)

Having verified that there is no alteration, the control unit 906 compares the acquired current time with the expiry date of the user-rental period starting from the view-starting time. In the event that the current time is equal or prior to the expiry date, the control unit 906 reads the content 935 from the information storage unit 908, and decrypts a digital works included in the read content 935 in cipher, and outputs the encrypted digital work to the monitor 91 via the playback unit 901.

In the event that the current time is later than the expiry date of the user-rental period starting from the view-starting time, the control unit 906 generates a message indicating that the content is not permitted to be played back, and outputs the generated message to the monitor 91 via the playback unit 901. Here, such a setting may be made so as to delete the rental data 915 from the information storage unit 908 in the event the current time is later than the expiry of the user-rental period.

Next, the control unit 906 receives an instruction regarding whether or not to extend the user-rental period. When receiving the instruction not to extend the user-rental period, the control unit 906 does not play back the content.

Further, in the event that (1) the agent-rental period included in the read supply data is confirmed to have been altered, or (2) the acquired current time is later than the agent-rental expiry include in the supply data, the control unit 906 generates a message indicating that the content is not permitted to be played back, and outputs the generated message to the monitor 91 via the playback unit 901. As a consequence, the content is not played back. Here, such a setting may be made that the control unit 906 deletes the rental data 915 from the information storage unit 908 in the event the current time is later than the rental agent expiry.

Still further, having judged that the view-starting time and/or the user-rental period has been tampered with, the control unit 906 generates a message indicating that the content is not permitted to be played back, and outputs the generated message to the monitor 91 via the playback unit 901. As a consequence, the content is not played back.

On the other hand, when receiving the instruction to extend the user-rental period, the control unit 906 performs processing in conjunction with the billing device 80 so that the fee which is necessary for extending the user-rental period is paid.

Subsequently, the control unit 906 overwrites the view-starting time 919 stored in the information storage unit 908 with the acquired current time, and then generates view-starting time signature data in a manner similar to the above. Further, the control unit 906 overwrites the view-starting time signature data 920 stored in the information storage unit 908 with the newly generated view-starting time signature data. As a result, the content is permitted to be decrypted and played back in a manner similar to the above.

(4) Playback Unit 901

The playback unit 901 (1) receives, from the control unit 906, information, such as the content title, the content ID, the digital work, and various messages, (2) converts the received information into a format that is displayable by the monitor 91, and (3) outputs the converted information to the monitor 91.

(5) Receiving Unit 902

The receiving unit 902 receives the broadcast program composed of image data and voice data in the form of a broadcast wave, and outputs the received program to the monitor 91 via the playback unit 901 under a user control inputted through the input unit 905.

(6) Receiving Unit 903

The receiving unit 903 receives the rental data, provider signature data, and rental agent signature data that are broadcasted in the form of a broadcast wave via the antenna 78, and outputs the received data to control unit 906.

(7) Transmitting/Receiving Unit 904

The transmitting/receiving unit 904 is connected to the billing device 80 as well as to the time source device 85 via the Internet 5, and performs data transmission between the control unit 906 and the billing device 80 as well as between the control unit 906 and the time source device 85.

(8) Input Unit 905

The input unit 905 receives a user selected content ID from an end user, and outputs the received content ID to the control unit 906.

Further, the input unit 905 receives an instruction for playback of content from an end user, and outputs the received instruction to the control unit 906.

2.6 Operations of Rental System 2

Hereinafter, a description is given of the operations of the rental system 2.

(1) Operations of Providing Device 70

Figure 24:
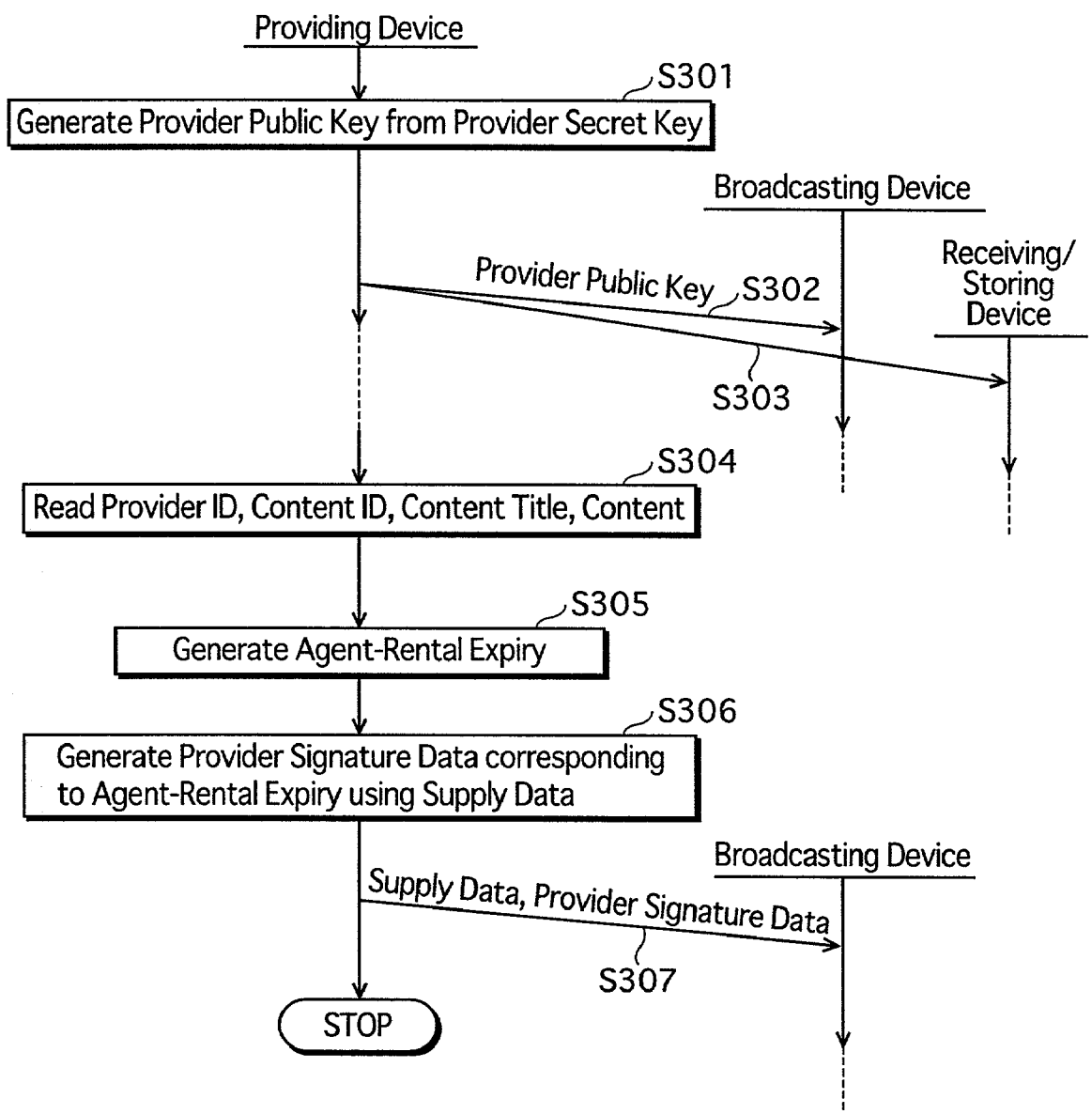
FIG. 24 is a flowchart showing the operations of the providing device 70.

First, a description is given of the operations of the providing device 70 with reference to the flowchart shown in FIG. 24.

The providing device 70 transmits the provider public key to the broadcasting device 75 and the receiving/storing device 90 in advance in the following manner.

The control unit 704 reads the provider secret key 714 from the key storage unit 706, applies a public key generation algorithm to the read provider secret key to generate a provider public key, and then writes the generated provider public key as the provider public key 711 into the information storage unit 701 (step S301). Further, the control unit 704 transmits the generated provider public key via the transmitting/receiving unit 705 and the communications line 71 to the broadcasting device 75 (step S302) as well as to the receiving/storing device 90 (step S303).

Next, the providing device 70 transmits the supply data and the provider signature data to the broadcasting device 75 in the following manner.

First, the control unit 704 reads a provider ID 721, content ID 722, content title 723, and content 724 from the information storage unit 701 (step S304), generates a agent-rental expiry, and writes the generated agent-rental expiry into the information storage unit 701 as the agent-rental expiry 725 included in the supply data 712 (step S305).

Next, the control unit 704 reads the provider secret key 714 from the key storage unit 706, and supply data 712 containing the agent-rental expiry 725 from the information storage unit 701. Subsequently, the control unit 704 applies a digital signature algorithm to the read supply data 712 by using the read provider secret key 714 to generate provider signature data, which is then written as provider signature data 713 into the information storage unit 701 (step S306). Thereafter, the control unit 704 transmits the read supply data and the generated provider signature data to the broadcasting device 75 via the transmitting/receiving unit 705 and the communications line 71 (step S307).

(2) Operations of Broadcasting Device 75

Figure 25:
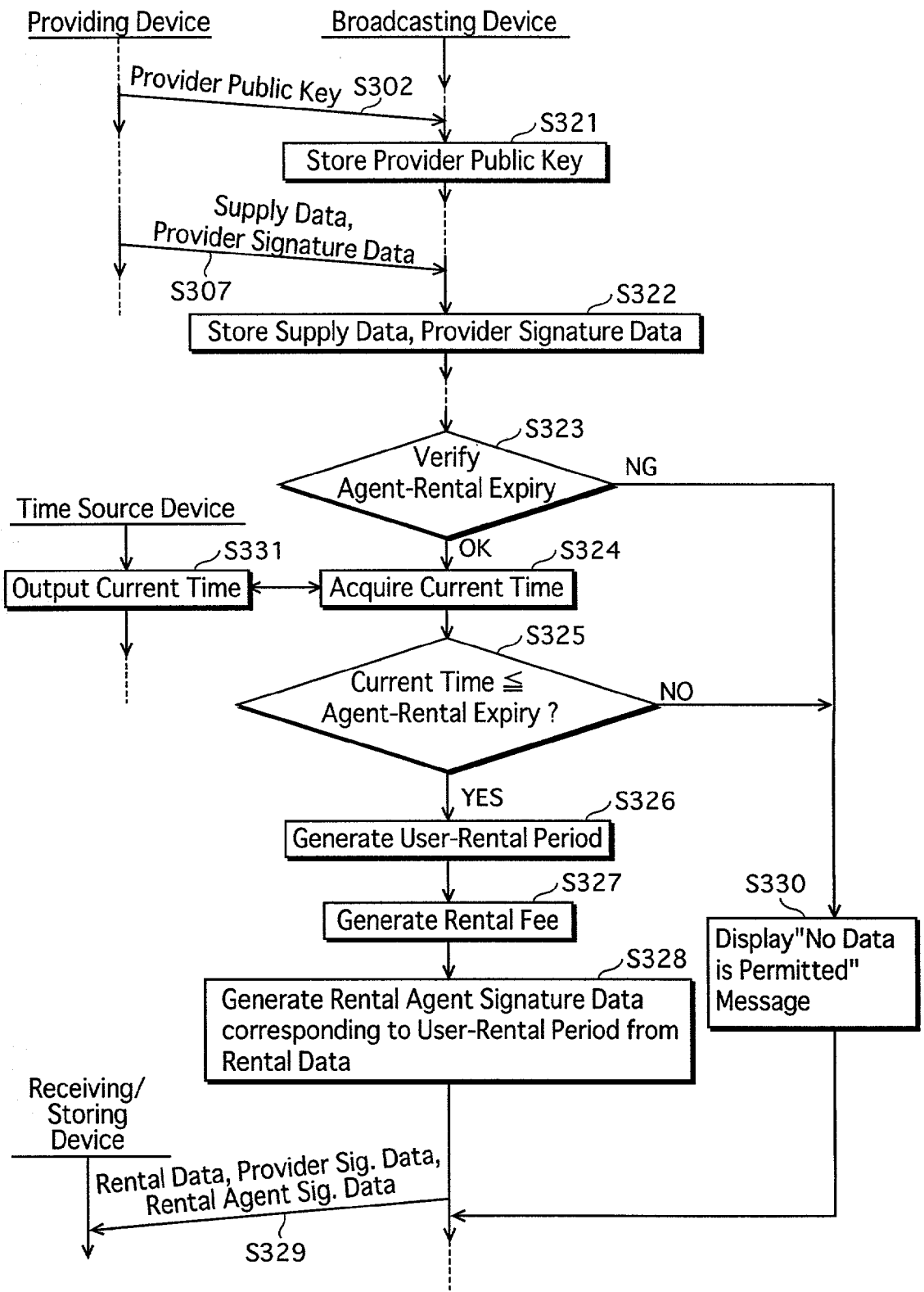
FIG. 25 is a flowchart showing the operations of the broadcasting device 75.
Figure 26:
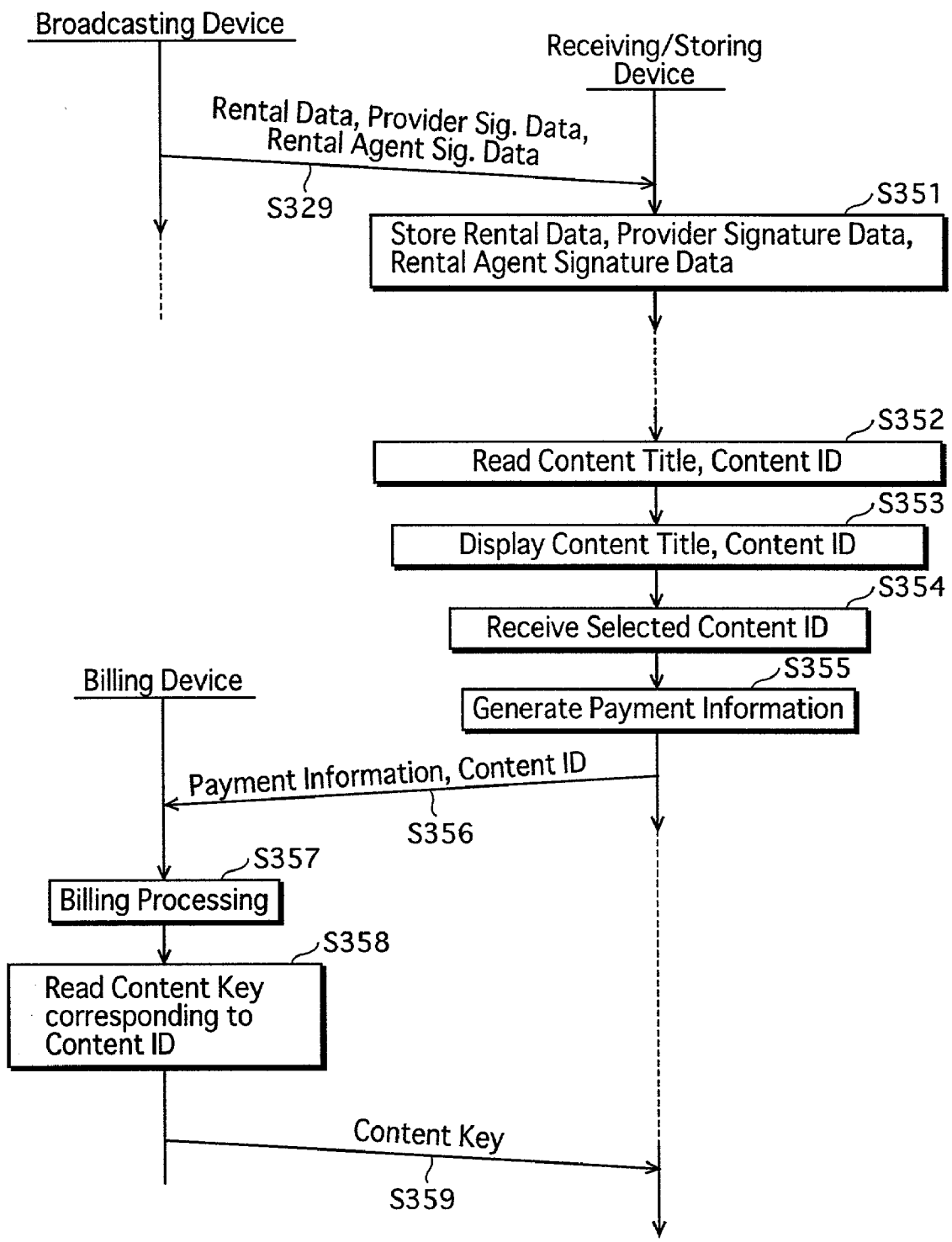
FIG. 26 is a flowchart showing the operations of the receiving/storing device 90, and the operations are continued to FIG. 27.
Figure 27:
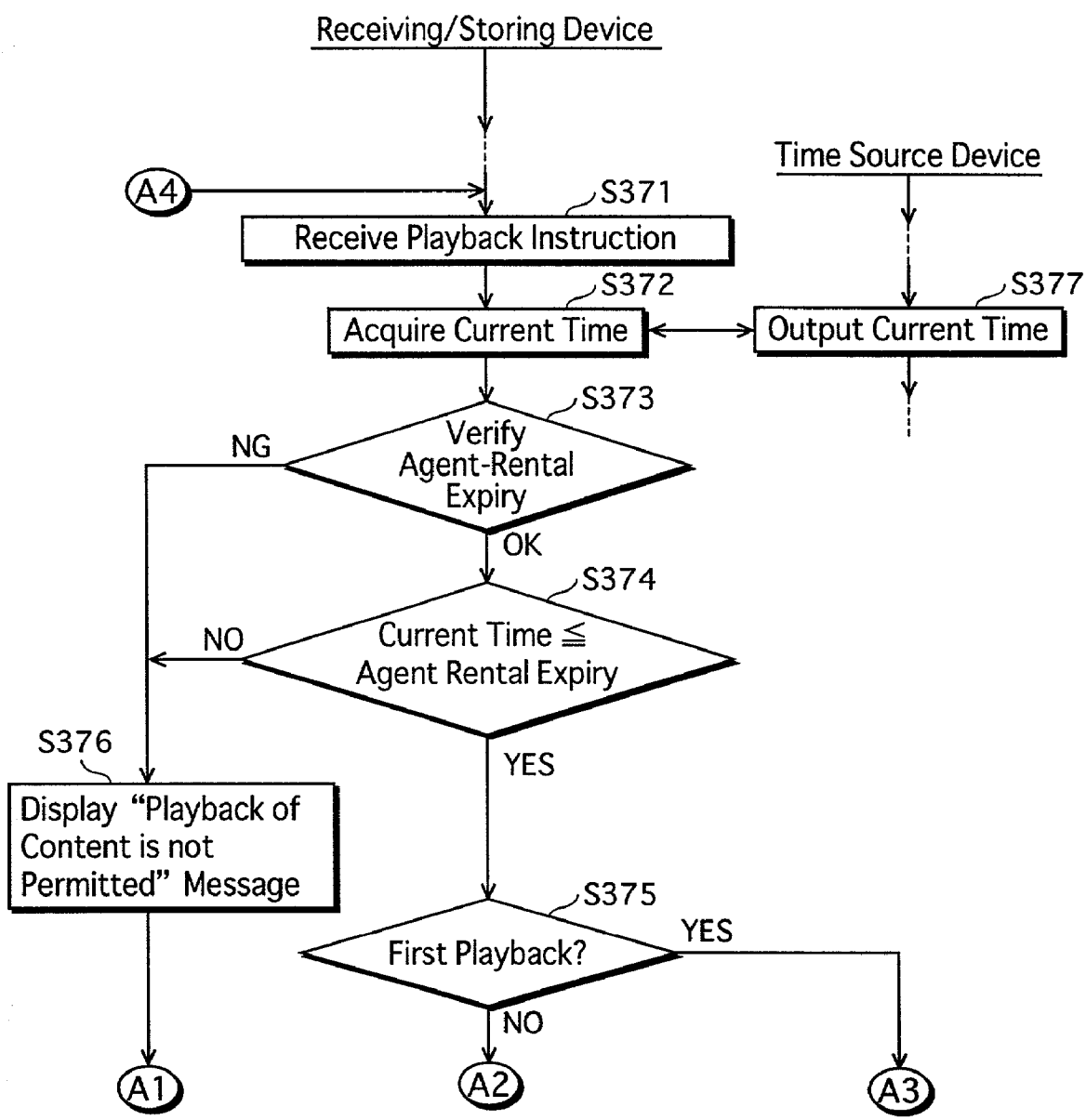
FIG. 27 is a flowchart showing the operations of the receiving/storing device 90, and the operations are continued to FIG. 28.
Figure 28:
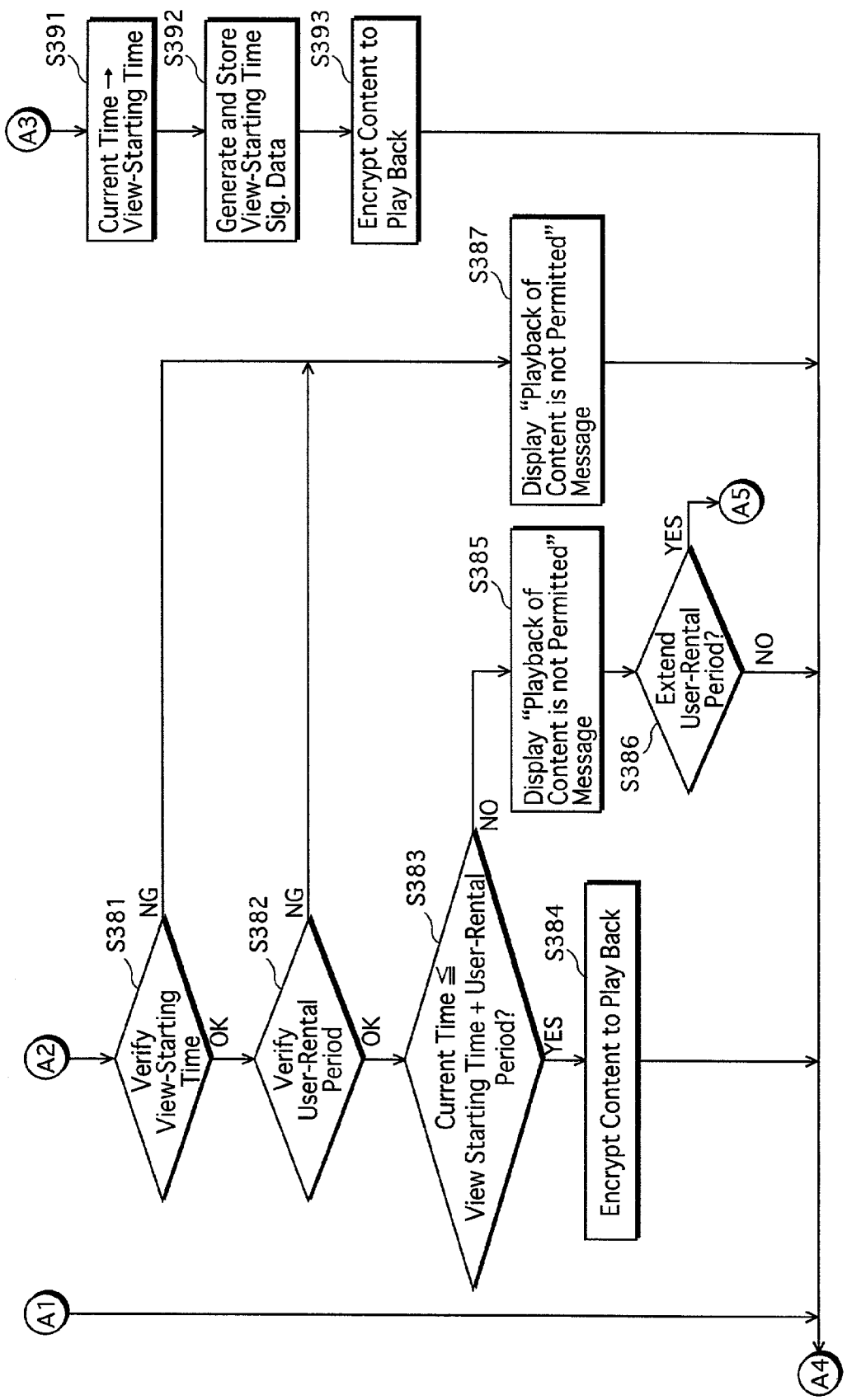
FIG. 28 is a flowchart showing the operations of the receiving/storing device 90, and the operations are continued to FIG. 29.
Figure 29:
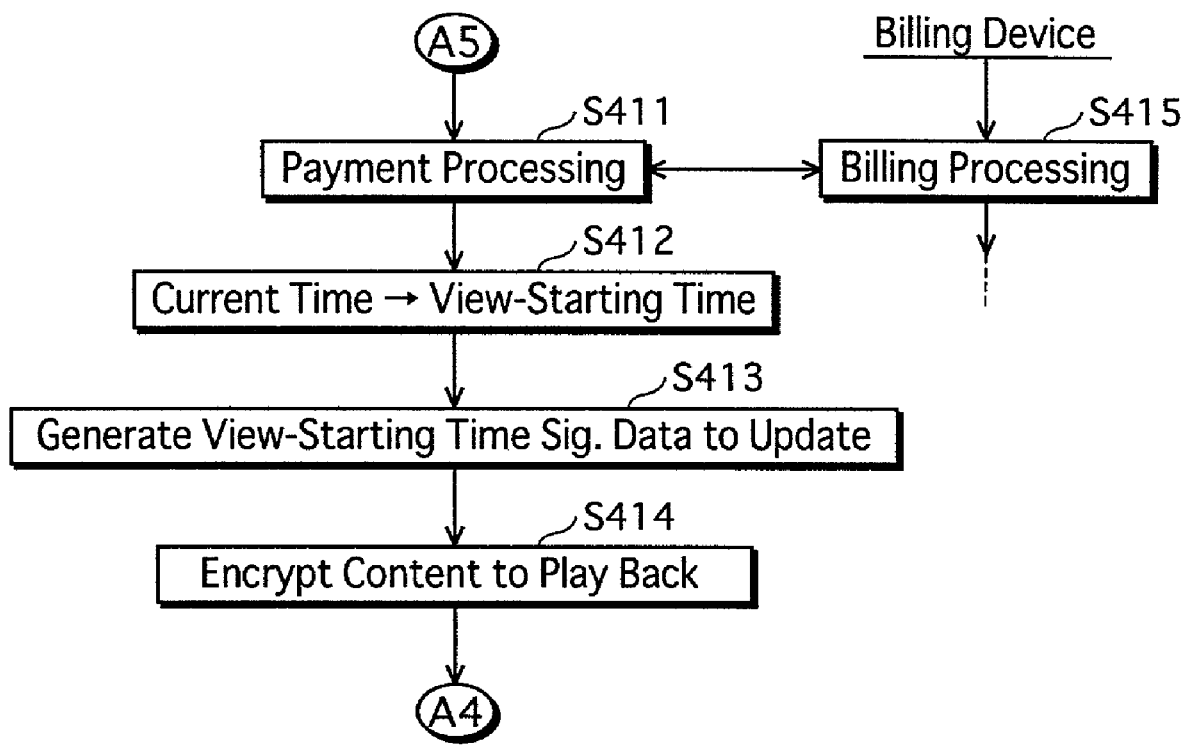
FIG. 29 is a flowchart showing the operations of the receiving/storing device 90, and the operations are continued from FIG. 28.

Now, a description is given of the operations of the broadcasting device 75 with reference to the flowchart shown in FIG. 25.

The broadcasting device 75 receives the provider public key from the providing device 70 and stores the received provider public key in advance in the following manner.

First, the control unit 754 receives the provider public key from the providing device 70 via the communications line 71 and the transmitting/receiving unit 752 (step S302), and writes the received provider public key as the provider public key 763 into the information storage unit 751 (step S321).

Further, the broadcasting device 75 receives supply data along with provider signature data from the providing device 70, and stores the received data in the following manner.

First, the control unit 754 receives the supply data along with the provider signature data from the providing device 70 via communications line 71 and the transmitting/receiving unit 752 (step S307), and writes the received supply data and provider signature data as the supply data 767 and provider signature data 765, respectively, into the information storage unit 751 (step S322).

Still further, the broadcasting device 75 generates rental data and other data in the following manner, and broadcasts the generated rental data and other data in the form of a broadcast wave.

First, the control unit 754 reads the provider signature data 765, provider public key 763 and supply data 767 from the information storage unit 751, and applies a digital signature verification algorithm to the read supply data and provider signature data to verify whether or not the agent-rental expiry contained in the read supply data has been altered (step S323). Having verified the authenticity of the agent-rental expiry (step S323, OK), the time source device 85 outputs the current time (step S331), and the control unit 754 acquires the current time from the time source device 85 (step S324).

Next, the control unit 754 compares the acquired current time and the agent-rental expiry contained in the supply data (step S325). In the event that the current time is equal or prior to the agent-rental expiry (step S325, YES), the control unit 754 generates a user-rental period, writes the generated user-rental period as a user-rental period 777 into the information storage unit 751 (step S326), and generates rental fee data which is then written as a rental fee 778 into the information storage unit 751 (step S327).

Subsequently, the control unit 754 reads the rental data 764 composed of the rental agent ID 771, supply data 767, user-rental period 777 and rental fee 778 from the information store storage unit 751, and reads the rental agent secret key 768 from the key storage unit 753. The control unit 754 then applies a digital signature algorithm to the read rental data to generate rental agent signature data which is then written as rental agent signature data 766 into the information storage unit 751 (step S328).

Next, the control unit 754 reads rental data 764, provider signature data 765 and rental agent signature data 766 from the information storage unit 751, and transmits the read rental data, provider signature data and rental agent signature data to the receiving/storing device 90 via transmitting unit 755, antenna 76, and communications satellite 77 (step S329).

Alternatively, upon detecting in step S323 that the agent-rental expiry has been altered (step S323, NG), the control unit 754 outputs to the display unit 757 a message indicating that no data is permitted to be supplied, so that the display unit 757 displays the outputted message (step S330). As a consequence, neither the rental data nor the provider signature data is broadcasted.

Further, in the event that the current time is judged in step S325 to be later than the agent-rental expiry (step S325, NO), the control unit 754 goes on to step S330, so that the display unit 757 displays a message indicating that no data is permitted to be supplied. As a consequence, none of the rental data, the provider signature data, or the rental agent signature data is broadcasted.

(3) Operation of Receiving/Storing Device 90

Hereinafter, a description is given of the operations of the receiving/storing device 90 with reference to the flowcharts shown in FIGS. 26-29.

The receiving/storing device 90 receives and stores the rental data and other data from the broadcasting device 75 in the following manner.

First, the control unit 906 receives the rental data, the provider signature data, and rental agent signature data (step S329), and writes the received rental data, provider signature data, and rental agent data as rental data 915, provider signature data 917, and rental agent signature data 918, respectively, into the information storage unit 908 (step S351).

Further, the receiving/storing device 90 selects a content and pays the renal fee for the selected content in the following manner.

First, the control unit 906 reads from the information storage unit 908 the content title 934 together with the content ID 933 which are both included in the rental data (step S352), and outputs the read content title and content ID to the monitor 91 via the playback unit 901, whereby the monitor 91 displays the content title and content ID (step S353). Next, the input unit 905 receives a user-selected content ID from an end user, and outputs the received content ID to the control unit 906 (step S354).

Next, the control unit 906 generates payment information representing the rental fee for the content that is identified by the received content ID (step S355), and transmits the generated payment information together with the received content ID to the billing device 80 via the transmitting/receiving unit 904 and the Internet 5 (step S356).

The billing processing unit 802 of the billing device 80 receives, via the Internet 5 and the transmitting/receiving unit 803, the payment information and the content ID that are transmitted from the receiving/storing device 90 (step S356)

The billing processing unit 802 performs billing processing based on the received payment information and content ID (step S357), reads the content key corresponding to the received content ID from the key table 811 stored in the key information storage unit 801 (step S358), and transmits the read content key to the receiving/storing device 90 via the transmitting/receiving unit 803 and the Internet 5. In response, the control unit 906 of the transmitting/receiving device 90 receives the content key via the Internet 5 and the transmitting/receiving unit 904, and stores the received content key (step S359).

Further, the receiving/storing device 90 plays back the stored content in the following manner.

The input unit 905 of the receiving/storing device 90 receives a playback instruction for the content from an end user, and outputs the received playback instruction to the control unit 906 (step S371). Upon receipt of the playback instruction, the control unit 906 issues a request for the acquisition of the current time to the time source device 85. In response, the time source device 85 outputs the current time to the receiving/storing device 90 (step S377), so that the control unit 906 receives the current time from the time source device 85 via the Internet 5 and the transmitting/receiving unit 904 (step S372).

Next, the control unit 906 reads the provider signature data 917, provider public key 913 and supply data 916 from the information storage unit 908, and applies a digital signature verification algorithm to the read supply data and provider signature data by using the read provider public key to verify whether or not the agent-rental period included in the read supply data has been altered (step S373). Having verified the authenticity of the agent-rental period (step S373, OK), the control unit 906 compares the acquired current time and the agent-rental period included in the supply data (step S374). In the event that the current time is equal or prior to the agent-rental period (step S374, YES), and that the content stored therein is judged to be played back for the first time (step S375, YES), the control unit 906 writes the acquired current time as the view-starting time 919 into the information storage unit 908 (step S391). Subsequently, the control unit 906 reads a recipient secret key from the key storage unit 907 as well as the view-starting time 919 from the information storage unit 908, and then applies a digital signature algorithm to the read view-starting time to generate view-starting time signature data, which is then written as the view-starting time signature data 920 into the information storage unit 908 (step S392). Next, the control unit 906 reads the content 935 from the information storage unit 908 to decrypt a digital work included in the read content in cipher by using the content key that has been received and stored therein, and outputs the encrypted digital work via the playback unit 901 to the monitor 91 where the digital work is displayed (step S393). Thereafter, the control unit S371 goes back to step S371 to repeat the processing.

On the other hand, having judged that the content 935 stored therein has been played back before (step S375, NO), the control unit 906 reads a recipient secret key from the key storage unit 907, and view-starting time 919 along with view-starting time signature data 920 from information storage unit 908. Thereafter, the control unit 906 applies a digital signature verification algorithm to the read view-starting time and view-starting time signature data by using the read recipient secret key to verify whether or not the view-starting time has been altered (step S381). Having verified that the view-starting time is unaltered (step S381, OK), the control unit 906 reads the rental agent public key 912, rental data 915, and rental agent signature data from the information storage unit 908. Subsequently, the control unit 906 applies a digital signature verification algorithm to the read rental data and rental agent signature data by using the read rental agent public key to verify whether or not the user-rental period has been altered (step S382). Having judged that the user-rental period is unaltered (step S382, YES), the control unit 906 compares the acquired current time with the expiry of the user-rental period starting from the view-starting time (step S383). In the event that the current time is equal or prior to the expiry of the user-rental period (current time≦view starting time+user-rental period) (step S383, YES), the control unit 906 reads the content 935 from the information storage unit 908, encrypts a digital work included in the read content 935 in cipher, and outputs the encrypted digital work to the monitor 91 via the playback unit 901. Consequently, the monitor 91 displays the digital work (step S384). Thereafter, the control unit 906 goes back to step S371 to repeat the processing.

Alternatively, in the event that the acquired current time is later than the expiry of the user-rental period starting from the view-starting time (step S383, NO), the control unit 906 generates a message indicating that the content is not permitted to be played back, and outputs the generated message to the monitor 91 via the playback unit 901, so that monitor 91 displays the generated message (step S385). Next, the control unit 906 receives a user instruction via the input unit 905 as to whether the user-rental period is to be extended (step S386). When instructed not to extend the user-rental period (step S386, NO), the control unit 906 goes back to step S371 without playback of the content to repeat the processing.

Further, in the event that the agent-rental period included in the read supply data is confirmed to have been altered (step S373, NG), or that the acquired current time is later than the agent-rental expiry included in the read supply data (step S374, NO), the control unit 906 generates a message indicating that the content is not permitted to be played back, and outputs the generated message to the monitor 91 via the playback unit 901, so that the monitor 91 displays the message (step S376). Thereafter, the control unit 906 goes back to step S371 without playback of the content to repeat the processing.

Further, having judged that the view-starting time has been altered (step S381, NG) or that the user-rental period has been altered (step S382, NG), the control unit 906 generates a message indicating that the content is not permitted to be played back just as in step S376, so that monitor 91 displays the generated message (step S387). Thereafter, the control unit 906 goes back to step S371 without playback of the content to repeat the processing.

On the other hand, upon receipt of a user instruction to extend the user-rental period (step S386, YES), the control unit 906 performs payment processing to make the payment of the extension fee (step S411), and the billing device 80 performs corresponding billing processing (step S415).

Subsequently, the control unit 906 overwrites the view-starting time 919 stored in the information storage unit 908 with the acquired current time (step S412), and generates view-starting time signature data just as in step S392 to overwrite the view-starting time signature data 920 stored in the information storage unit 908 with the newly generated view-starting time signature data (step S413). Thereafter, the control unit 906 decrypts the content and plays back the decrypted content just as in step S384 (step S414). The control unit 906 then goes back to step S371 to repeat the processing.

Figure 30:
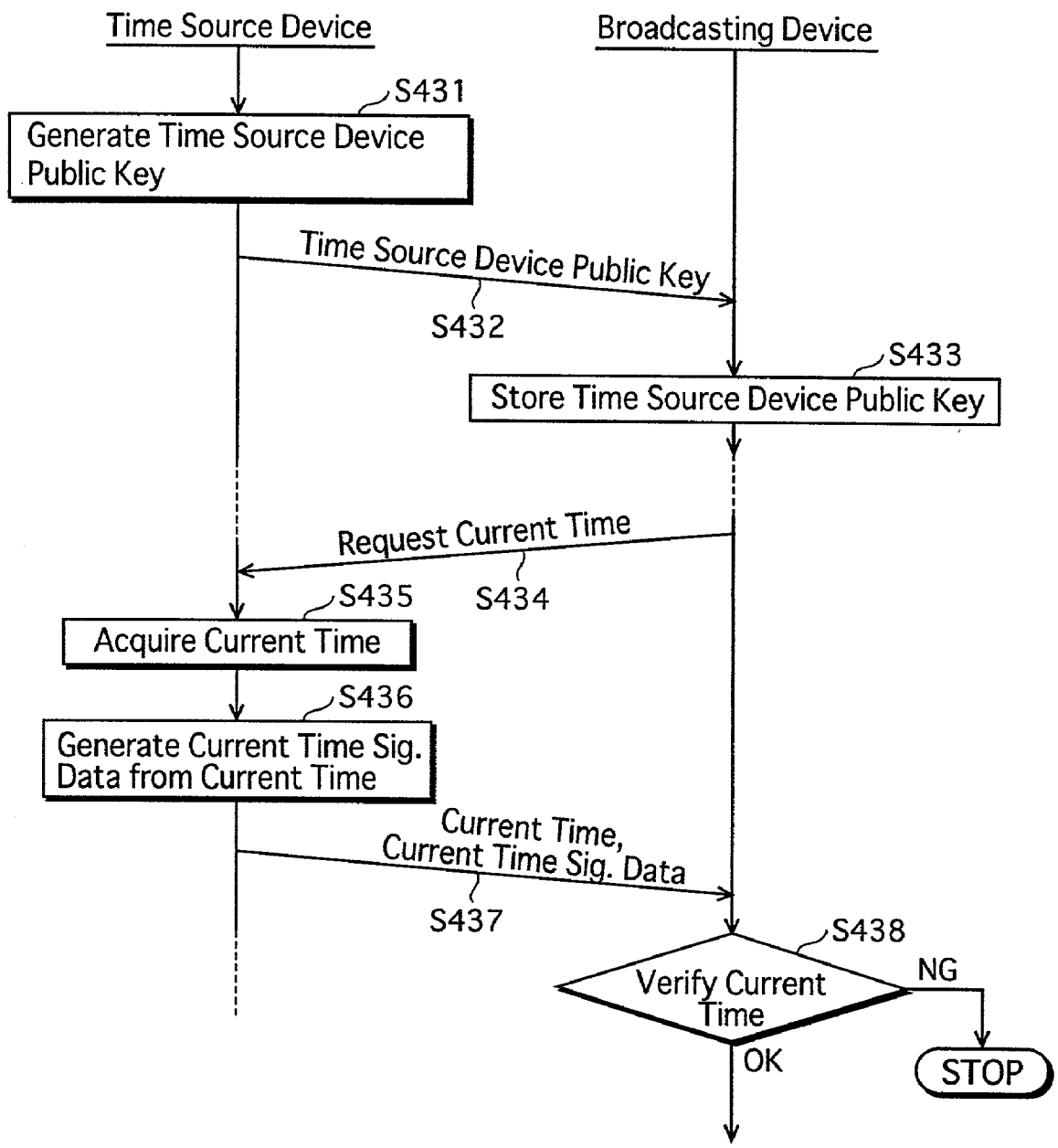
FIG. 30 is a flowchart showing the operations of the broadcasting device 75 performed in conjunction with the time source device 85 for acquiring a current-time.

(4) Operations of Broadcasting Device 75 in Conjunction with Time Source Device 85 for Acquisition of Current Time Now, a description is given of the operations that are performed by the broadcasting device 75 in conjunction with the time source device 85 for acquiring the current time with reference to the flowchart shown in FIG. 30.

Note that operations performed by the receiving/storing device 90 in conjunction with the time source device 85 for acquiring the current time are similar to the operations to be described hereinafter, and thus a description thereof is omitted.

The time source device 85 transmits the time source device secret key to the broadcasting device 75 in advance in the following manner.

The control unit 855 of the time source device 85 reads the time source device secret key 684 from the key storage unit 853, applies a public key generation algorithm to the read time source device secret key to generate a time source device public key, and writes the generated time source device public key as the time source device public key 863 into the information storage unit 851 (step S431). The control unit 855 then transmits the generated time source device public key to the broadcasting device 75 via the transmitting/receiving unit 854 and the Internet 5. In response, the control unit 754 of the broadcasting device 75 receives, via the Internet 5 and the transmitting/receiving unit 758, the time source device public key transmitted from the time source device 85 (step S432). The control unit 754 then writes the received time source device public key as the time source device public key 761 into the information storage unit 751 (step S433).

Further, the broadcasting device 75 acquires the current time from time source device 85 in the following manner.

In order for the broadcasting device 75 to acquire the current time, the control unit 754 of the broadcasting device 75 issues an acquisition request for the current time to the time source device 85 via the transmitting/receiving unit 758 and the Internet 5. In response, the control unit 855 receives the acquisition request via the Internet 5 and the transmitting/receiving unit 854 (step S434).

Upon receipt of the acquisition request, the control unit 855 acquires the current time from the time generating unit 852 (step S435), and reads the time source device secret key 854 from the key storage unit 853. The control unit 855 then applies a digital signature algorithm to the acquired current time by using the read time source device secret key to generate current time signature data which is then written as the current time signature data 862 into the information storage unit 851 (step S436). Thereafter, the control unit 855 transmits the acquired current time and the generated current time signature data to the broadcasting device 75 via the transmitting/receiving unit 854 and the Internet 5. In response, the control unit 754 receives the current time together with the current time signature data via the Internet 5 and the transmitting/receiving unit 758 (step S437).

Next, the control unit 754 reads the time source device public key 761 from the information storage unit 751, and applies a digital signature verification algorithm to the received current time and the received current time signature data by using the read time source device public key to verify whether or not the current time has been altered (step S438). Having judged that the current time is altered (step S438, NG), the control unit 754 terminates the processing. On the other hand, having verified the authenticity of the current time (step S438, OK), the control unit 754 continues the processing.

2.7 First Modification

In the above embodiments, a rental period during which content is permitted to be played back is set. For example, a rental period of three days means that an end user is permitted to play back the content for three days starting from the day the end user plays back the content for the very first time.

Alternatively, however, a period during which an end user is permitted to play back the content may be set by determining a fixed date as the expiry of the rental period. For example, a rental period expiring on May 10, 2002 means that the end user is permitted to use the content up to May 10, 2002.

Figure 31:
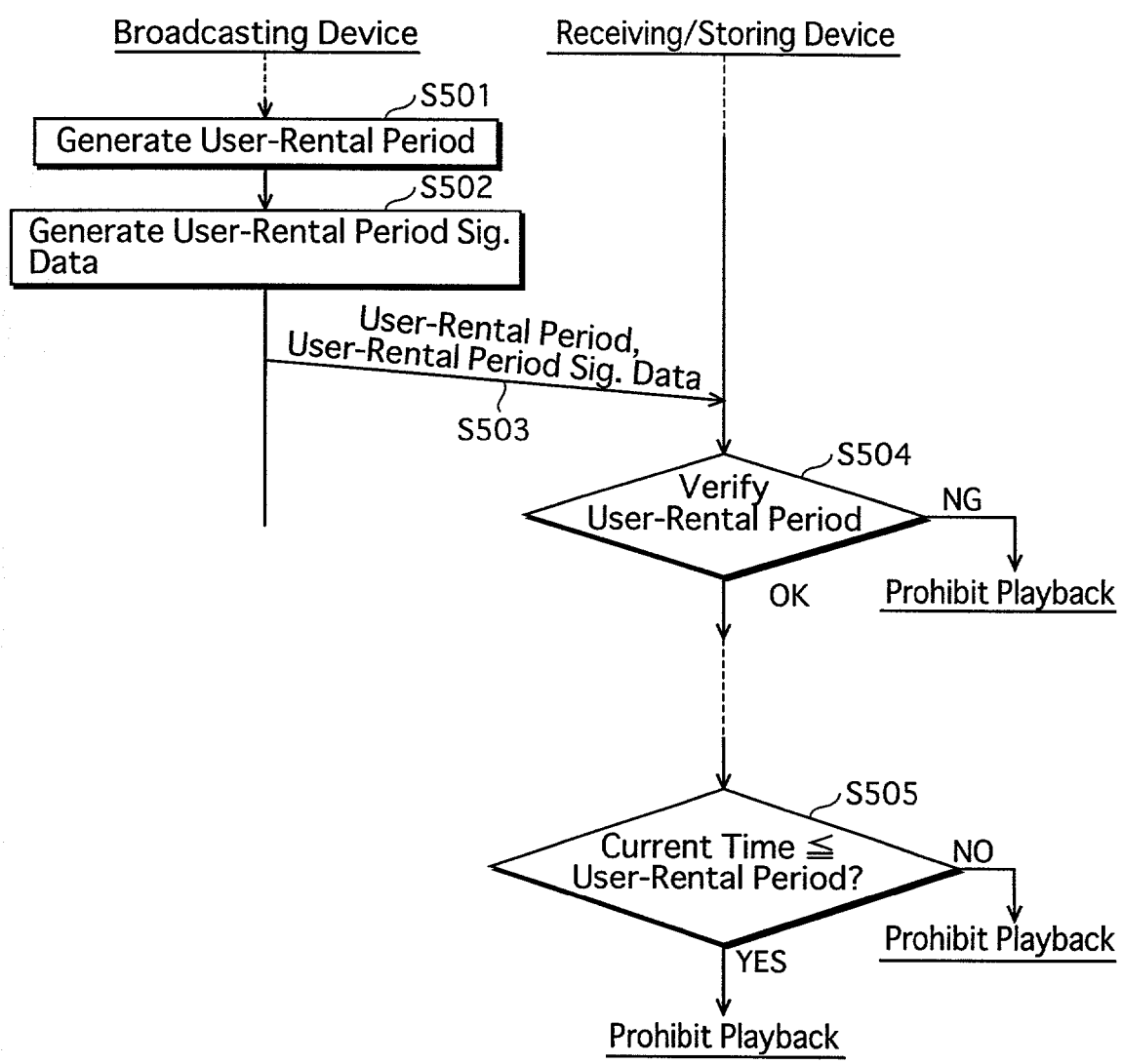
FIG. 31 is a flowchart showing the operations of the broadcasting device 75 and the receiving/storing device 90 in the case where the user-rental period is set by determining a fixed expiry date.

Now, with reference to the flowchart shown in FIG. 31, a description is given of the operations of the broadcasting device 75 and the receiving/storing device 90 in the case where the user-rental period is set by determining a fixed expiry date.

First, the control unit 754 of the broadcasting device 75 generates a user-rental expiry (step S501), and then applies a digital signature algorithm to the user-rental expiry by using the renal agent secret key to verify whether or not the user-rental expiry has been altered (step S502). Next, the control unit 754 transmits the generated user-rental expiry and signature data to the receiving/storing device 90. In response, the control unit 906 of the receiving/storing device 90 receives the rental expiry together with the signature data (step S503).

The control unit 906 then applies a digital signature verification algorithm to the user-rental expiry and signature data to verify whether or not the user-rental expiry has been altered (step S504). Having judged that the user-rental expiry is altered (step S504, NG), the control unit 906 does not permit the content to be played back.

On the other hand, having verified the authenticity of the user-rental expiry (step S504, OK), the control unit 906 compares the acquired current time with the user-rental expiry (step S505). In the event that the current time is equal or prior to the user-rental expiry (step S505 YES), the control unit 906 permits the content to be played back. In the event that the current time is later than the user-rental expiry (step S505, NO), the control unit 906 prohibits playback of the content.

2.8 Second Modification

In the above embodiments, the broadcasting device 75 broadcasts a user-rental period in the form of a broadcast wave. Alternatively, however, the receiving/storing device 90 may acquire a user-rental period from the billing device 80.

Figure 32:
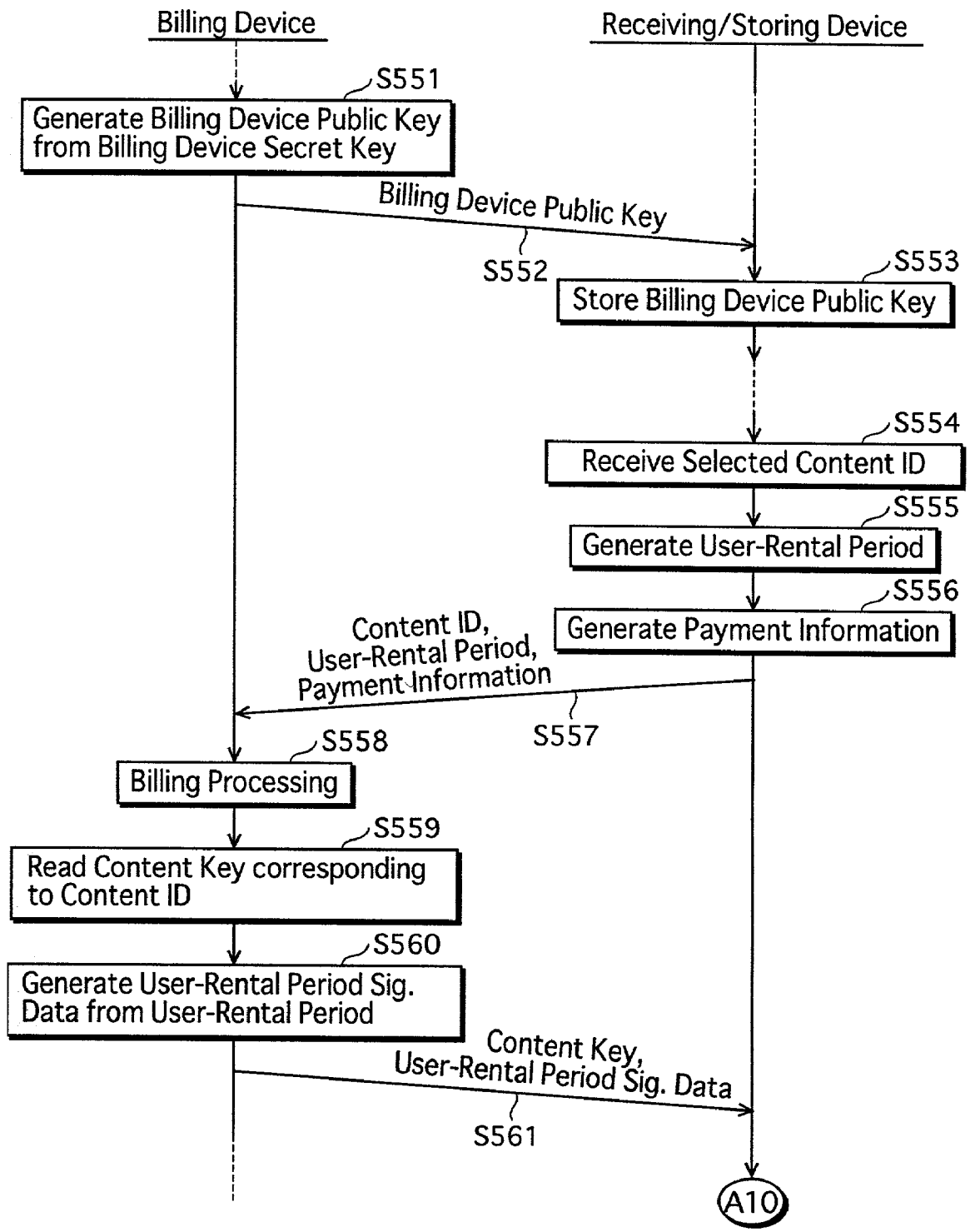
FIG. 32 is a flowchart showing the operations of the billing device 80 and the receiving/storing device 90 performed for the receiving/storing device 90 to acquire the user-rental period, and the operations are continued to FIG. 33.
Figure 33:
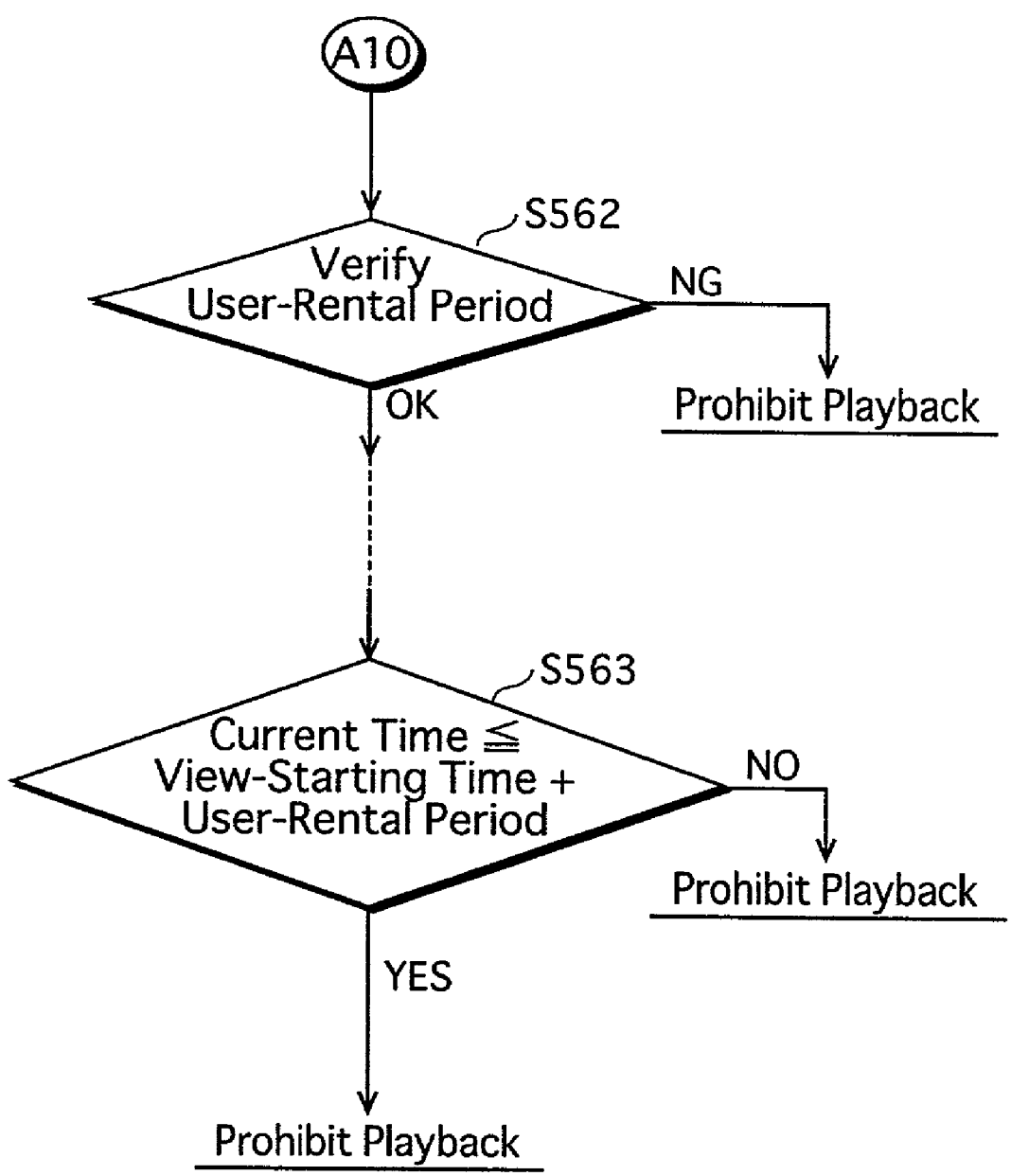
FIG. 33 is a flowchart showing the operations of the billing device 80 and the receiving/storing device 90 performed for the receiving/storing device 90 to acquire the user-rental period, where the operations in FIG. 33 are continued from FIG. 32.

Here, with reference to the flowchart shown in FIGS. 32-33, a description is given of the operations of the billing device 80 and the receiving/storing device 90 that are performed for the receiving/storing device 90 to acquire a user-rental period.

First, the billing processing unit 802 of the billing device 80 generates a billing device public key from a billing device secret key that is know only to the billing device (step S551). The billing processing unit 802 then transmits the generated billing device public key to the receiving/storing device 90 via the Internet 5. In response, the receiving/storing device 90 receives the billing device public key (step S552), and stores the received public key (step S553).

Next, the receiving/storing device 90 receives from an end user a user-selected content ID (step S554) as well as a user-requested rental period, and then generates a user-rental period in accordance with the user request (step S555). Subsequently, the receiving/storing device 90 generates payment information regarding a payment for renting the content for the generated user-rental period (step S566), and transmits the payment information together with the content ID and the user-rental period to the billing device 80 via the Internet 5. In response, the billing device 80 receives the content ID, user-rental period, and payment information from the receiving/storing device 90 via the Internet 5 (step S557).

Next, the billing device 80 performs billing processing according to the received content ID, user-rental period and payment information (step S558), and reads a content key corresponding to the content ID (step S559). The billing device 80 then applies a digital signature algorithm to the user-rental period by using the billing device secret key to generate rental period signature data (step S560), and transmits the read content key and the generated rental period signature data to the receiving/storing device 90 via Internet 5. In response, the receiving/storing device 90 receives the content key and the rental period signature data from the billing device 80 via the Internet 5 (step S561).

The receiving/storing device 90 applies a digital signature verification algorithm to the received rental period signature data and the user-rental period which has been generated by the receiving/storing device 90 itself in order to verify whether or not the user-rental period has been altered (step S562). Having judged that the user-rental period is altered (step S562, NG), the receiving/storing device 90 prohibits playback of the content (Step S562, NG).

On the other hand, having verified the authenticity of the user-rental period (step S562, OK), the receiving/storing device 90 compares the acquired current time with the expiry of the user-rental period starting from the view-starting time (step S563). In the event that the current time is equal or prior to the expiry of the user-rental period (step S563, YES), the receiving/storing device 90 permits the content to be played back.

On the other hand, in the event that the current time is later than the expiry of the user-rental period (step S563, NO), the receiving/storing device 90 prohibits playback of the content.

3. Other Embodiments

Up to this point, the present invention has been described by way of the above embodiments. Yet, it goes without saying that the present invention is not limited to the specific embodiments disclosed above. The present invention also includes the following within its scope.

(1) In the step S206 described above, the message is transmitted to the provider device 20. At this time, a rental agent identifier SID for identifying the rental agent may be transmitted together with the message to the provider device 20. In this way, the provider is allowed to be informed of the rental agent that has attempted an unauthorized use of the DVD.

To this end, at the time of providing a DVD to a rental agent, the provider device 20 writes the rental agent identifier SID identifying the rental agent in the provider-only area of the DVD. Further, in step S206, the DVD player 40 reads the rental agent identifier SID from the provider-only area of the DVD, and transmits the read rental agent identifier SID to the provider device 20 along with the message.

(2) The DVD player 40 may be connected to the time source device 50 via a mobile phone network, and acquire the current time from the time source device 50.

Alternatively, the time source device 50 may broadcast the current time via a digital broadcast network. At this time, however, the current time is not accompanied with a digital signature. Further, the DVD player 40 may be provided with a tuner for receiving a digital broadcast wave so as to be capable of receiving the broadcasted current time. Note that the mutual authentication processing and key sharing processing shown in FIG. 15 are not performed in this case. In addition, the current time is acquired without the signature processing and verification processing that are shown in FIG. 16.

(3) In the above embodiments, a description is given of a rental system including one rental agent. Nevertheless, the rental system may include a plurality of rental agents.

(4) In the above embodiments, the manufacturer device 10 owned by the manufacturer generates a user identifier IDi that identifies each user who owns a DVD player, and writes the generated user identifier IDi into the DVD player. However, the same may be done in any other manner. For example, a rental agent device owned by a rental agent may generate a user identifier IDi, and write the generated user identifier IDi into the DVD player.

Further, the manufacturer device 10 has been described to generate secret key SKi and write the generated secret key SKi into the DVD player 40. One alternative is to write the generated secret key SKi into a removable, portable IC card. Then, the manufacturer may provide the IC card to a user at the time when the user earns a membership of the rental agent. When wanting to use the DVD player 40, the user inserts the IC card into the DVD player 40, so that the DVD player 40 reads the secret key SKi from the IC card.

At the time when the IC card is supplied from the manufacturer, the rental agent may write a public key PKP and signature AUTHi onto the IC card by using the rental agent device 30, so that the DVD player 40 reads the public key PKP and signature AUTHi from the IC card.

Further, the manufacturer device 10 and rental agent device 30 may write information into the IC card rather than in the provider-only area and the rental agent-only area of the DVD. In this case, the DVD player 40 makes use of the information provided on the IC card.

(5) Note that examples of digital works include movies, music, moving pictures, still pictures, text data such as novels and theses, game software, computer programs, and database.

(6) In rental system 2, rental data has been described to be transmitted in the form of a broadcast wave. Yet, the broadcasting device 75 may transmit rental data and other information to the receiving/storing device 90 via the Internet 5, and the receiving/storing device 90 may receive and store the rental data and other information.

(7) In the above embodiments, the current time, agent-rental expiry, user-rental period, and the like have been described as information representing a date in terms of a year, month, and day. Yet, the information may further include additional information representing time such as hour, minute, and second.

(8) In rental system 2 in the above embodiment, the providing device 70 transmits the agent-rental period to the receiving/storing device 90 via the broadcasting device 75. However, the providing device 70 may transmit the agent-rental expiry to the receiving/storing device 90 via the Internet 5 rather than the broadcasting device 75.

Also, in rental system 1 in the above embodiment, the provider device 20 may transmit the agent-rental expiry to the DVD player 40 via the Internet 5.

(9) In rental system 1 in the above embodiment, the manufacturer device 10 transmits a signature AUTHi of the provider device 20 corresponding to a public key PKi for the DVD player 40 in advance, so that the DVD player 40 pre-stores the signature AUTHi. Yet, the following alternative is possible.

At the time when a user purchases the DVD player 40, or when the user plays back content for the very first time, the DVD player 40 may go through an initialization process that includes the transmission of IDi and PKi to the provider device 20 via the Internet 5. In response, the provider device 20 generates AUTHi, and transmits the generated AUTHi to the DVD player 40 via the Internet 5. The DVD player 40 receives and stores the AUTHi.

In another alternative, the AUTHi is not generated by the provider device 20 but by another device.

To be more specific, the AUTHi may be generated by a certification agent device which is owned by an agent that is independent of each of the provider, rental agent, user, manufacturer, and time source agent (such an agent is generally referred to as "certificate authority" and Certicom Corp. is one example) just in the manner as the provider device 20, and is then transmitted to the DVD player 40 via the Internet 5.

The AUTHi generated by a certificate authority, which is independent of the provider, rental agent, user, manufacturer, and time source agent, is advantageous in that such digital signature data is more reliable than an AUTHi generated at a provider's end.

(10) Further, in rental system 1 in the above embodiment, the DVD player 40 is described as having a unique secret key SKi, and performing mutual authentication with the time source device 50 by using that secret key SKi. However, the following alternative is applicable.

The DVD player 40 is in possession of one common key that is common among a predetermined type of DVD players of the same manufacture or of the same model. In addition, the time source device 50 also has the same common key. Accordingly, a mutual authentication between the DVD player 40 and the time source device 50 is performed by using the common key by means of common key cryptography. In this case, however, the security level is lower than the one provided by rental system 1 in the above embodiment.

(11) The present invention may be embodied as methods comprising the steps described above, or as a computer program implementing the above methods by a computer, or even as digital signals representing the above computer program.

Further, the present invention may be embodied as a computer-readable medium storing the computer program or the digital signals. Here, the computer readable medium is, for example, a floppy disc, a hard disc, CD-ROM, MO, DVD, DVD-ROM, DVD-RAM, BD (Blu-ray Disc), or semiconductor memory. Alternatively, the present invention may be the computer program or the digital signals that are stored on such recording medium as described above.

Further, the present invention may be embodied as the computer program or the digital signals that are transmitted via a network exemplified by a telecommunications network, wired or wireless communications line, Internet, or the like.

Still further, the present invention may be embodied as a computer system provided with a microprocessor and memory that stores the above computer program, so that the microprocessor operates in accordance with the program.

Still further, the computer program or the digital signals may be recorded on any of the above recording mediums and transported to another location. Alternatively, the computer program or the digital signals may be transmitted via any of the above networks. Thereafter, the computer program or the digital signals may be executed by another independent computer system.

(12) Further, the present invention may be embodied as combinations of the above modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback device for acquiring and playing back a digital work provided from a provider to a rental agent and rented from the rental agent to a user, the rental agent being operable to provide to the user the digital work and a rental agent identifier identifying the rental agent, said playback device comprising:
- a time acquisition unit for acquiring time information including a current time from a time source device;
- an expiry acquisition unit for acquiring user-expiry information from the rental agent and agent-expiry information from the provider, the user-expiry information including a user expiry time of a period during which the user is permitted by the rental agent to play back the digital work, and the agent-expiry information including a rental expiry time of a period during which the rental agent is permitted by the provider to rent the digital work;
- a first comparison unit for comparing the current time included in the time information acquired by said time acquisition unit with the user expiry time included in the user-expiry information acquired by said expiry acquisition unit;
- a second comparison unit for comparing the current time included in the time information acquired by said time acquisition unit with the rental expiry time included in the agent-expiry information acquired by said expiry acquisition unit in response to the current time being not later than the user expiry time;
- a prohibition unit for prohibiting playback of the digital work in response to the current time included in the time information being later than at least one of the rental expiry time included in the agent-expiry information and the user expiry time included in the user-expiry information; and
- a rental agent identifier transmission unit for transmitting the rental agent identifier to the provider in response to the current time being later than the rental expiry time.

2. The playback device of claim 1, wherein the rental agent is operable to provide a rental recording medium storing the digital work, the rental agent identifier identifying the rental agent and the user-expiry information to the user wherein:
- said playback device is operable to acquire the digital work by reading the digital work from the rental recording medium;
- said expiry acquisition unit is further for acquiring the user-expiry information by reading the user-expiry information from the rental recording medium;
- said prohibition unit is further for prohibiting playback of the digital work recorded on the rental recording medium; and
- said rental agent identifier transmission unit is further for transmitting the rental agent identifier acquired from the rental recording medium.

3. The playback device of claim 2, where the provider is operable to provide to the rental agent a provider recording medium storing the digital work, the rental agent identifier identifying the rental agent, and the agent-expiry information: the rental agent is operable to generate the rental recording medium by additionally recording the user-expiry information onto the provider recording medium and provide the generated rental recording medium storing the digital work, the rental agent identifier, the agent-expiry information, and the user-expiry information, and wherein:
- said expiry acquisition unit is further for acquiring the agent expiry information by reading the agent expiry information from the rental recording medium;
- said prohibition unit is further for prohibiting playback of the digital work stored on the rental recording medium; and
- said rental agent identifier transmission unit is further for transmitting the rental agent identifier acquired from the rental recording medium to the provider.

4. The playback device of claim 3, where the provider is operable to provide to the rental agent a provider recording medium storing the digital work, the rental agent identifier identifying the rental agent, and the agent-expiry information; the rental agent is operable to generate the rental recording medium by additionally recording the user-expiry information onto the provider recording medium and provide the generated rental recording medium storing the digital work, the rental agent identifier, the agent-expiry information, and the user-expiry information, wherein:
- said expiry acquisition unit acquires the agent expiry information by reading the agent-expiry information from the rental recording medium;
- said prohibition unit prohibits playback of the digital work stored in the rental recording medium; and
- said rental agent identifier transmission unit transmits the rental agent identifier acquired from the rental recording medium to the provider.

5. The playback device of claim 2, where the provider is operable to provide to the rental agent a provider recording medium storing the digital work, the rental agent identifier identifying the rental agent, and the agent-expiry information; the rental agent is operable to generate the rental recording medium by additionally recording the user-expiry information onto the provider recording medium and provide the generated rental recording medium storing the digital work, the rental agent identifier, the agent-expiry information, and the user-expiry information, wherein:
- said expiry acquisition means is further for acquiring the agent expiry information by reading the agent expiry information from the rental recording medium;
- said prohibition means is further for prohibiting playback of the digital work stored on the rental recording medium; and
- said rental agent identifier transmission means is further for transmitting the rental agent identifier acquired from the rental recording medium to the provider.

6. The playback device of claim 2, wherein the rental agent is operable to provide a rental recording medium storing the digital work, the rental agent identifier identifying the rental agent, and the user-expiry information to the user wherein:
- said playback device acquires the digital work by reading the digital work from the rental recording medium;
- said expiry acquisition unit acquires the user-expiry information by reading the user-expiry information from the rental recording medium;
- said prohibition unit prohibits playback of the digital work recorded in the rental recording medium; and
- said rental agent identifier transmission unit transmits the rental agent identifier acquired from the rental recording medium.

7. The playback device of claim 1, where the rental agent is operable to provide the digital work to the user along with the user-expiry information by being broadcasted in a form of a broadcast wave and said playback device is operable to acquire the digital work by receiving the broadcast wave, extracting the digital work from the received broadcast wave, and storing the extracted digital work, wherein:
- said expiry acquisition unit is further for acquiring the user-expiry information by extracting the user-expiry information from the received broadcast wave; and
- said prohibition unit is further for prohibiting playback of the stored digital work.

8. The playback device of claim 7, where the provider is operable to provide the digital work to the rental agent along with the agent-expiry information and the rental agent is operable to provide the digital work to the user by the rental agent broadcasting the digital work along with the user-expiry information and the agent-expiry information, wherein:

said expiry acquisition unit is further for acquiring the agent-expiry information by receiving the broadcast wave and extracting the agent-expiry information from the received broadcast wave; and said prohibition unit is further for prohibiting playback of the stored digital work.

9. The playback device of claim 8, where the provider is operable to provide the digital work to the rental agent along with the agent-expiry information and the rental agent is operable to provide the digital work to the user by the rental agent broadcasting the digital work along with the user-expiry information and the agent-expiry information, wherein:

said expiry acquisition unit acquires the agent-expiry information by receiving the broadcast wave and extracting the agent-expiry information form the received broadcast wave; and said prohibition unit prohibits playback of the stored digital work.

10. The playback device of claim 7, where the provider is operable to provide the digital work to the rental agent along with the agent-expiry information and the rental agent is operable to provide the digital work to the user by the rental agent broadcasting the digital work along with the user-expiry information and the agent-expiry information, wherein:

said expiry acquisition means is further for acquiring the agent-expiry information by receiving the broadcast wave and extracting the agent-expiry information from the received broadcast wave; and said prohibition means is further for prohibiting playback of the stored digital work.

11. The playback device of claim 7, where the rental agent is operable to provide the digital work to the user along with the user-expiry information by being broadcasted in a form of a broadcast wave and said playback device is operable to acquire the digital work by receiving the broadcast wave, extracting the digital work from the received broadcast wave, and storing the extracted digital work, wherein:

said expiry acquisition unit acquires the user-expiry information by extracting the user-expiry information from the received broadcast waves; and said prohibition unit prohibits playback of the stored digital work.

12. The playback device of claim 1, wherein the rental agent is operable to provide a rental recording medium storing the digital work, the rental agent identifier identifying the rental agent, and the user-expiry information to the user, wherein:

said playback device is operable to acquire the digital work by reading the digital work from the rental recording medium;

said expiry acquisition means is further for acquiring the user-expiry information by reading the user-expiry information from the rental recording medium;

said prohibition means is further for prohibiting playback of the digital work recorded on the rental recording medium; and said rental agent identifier transmission means is further for transmitting the rental agent identifier acquired from the rental recording medium.

13. The playback device of claim 1, where the rental agent is operable to provide the digital work to the user along with the user-expiry information by being broadcasted in a form of a broadcast wave and said playback device is operable to acquire the digital work by receiving the broadcast wave, extracting the digital work from the received broadcast wave, and storing the extracted digital work, wherein:

said expiry acquisition means is further for acquiring the user-expiry information by extracting the user-expiry information from the received broadcast wave; and said prohibition means is further for prohibiting playback of the stored digital work.

14. A playback method for use by a playback device that acquires and plays back a digital work provided from a provider to a rental agent and rented from the rental agent to a user, the rental agent being operable to provide to the user the digital work and rental agent identifier identifying the rental agent, said playback method comprising:

acquiring time information including a current time from a time source device;

acquiring user-expiry information from the rental agent and agent-expiry information from the provider, the user-expiry information including a user expiry time of a period during which the user is permitted by the rental agent to play back the digital work, and the agent-expiry information including a rental expiry time of a period during which the rental agent is permitted by the provider to rent the digital work;

comparing the current time included in the time information acquired in said acquiring of the time information with the user expiry time shown by the included in information acquired in said acquiring of the user-expiry information;

comparing, the current time included in the time information acquired in said acquiring of the time information with the rental expiry time included in the agent-expiry information acquired in said acquiring of the agent-expiry information in response to said comparing of the current time with the user expiry time resulting in a judgment that the current time is not later than the user expiry time;

prohibiting playback of the digital work in response to the current time included in the time information being later than at least one of the rental expiry time included in the agent-expiry information and the user expiry time included in the user-expiry information; and transmitting the rental agent identifier to the provider in response to said comparing of the current time with the rental expiry time resulting in a judgment that the current time is later than the rental expiry time.

15. A playback program stored on a computer-readable medium and for use by a computer that acquires and plays back a digital work provided from a provider to a rental agent and rented from the rental agent to a user, the rental agent being operable to provide to the user the digital work and a rental agent identifier identifying the rental agent, said program being operable to cause the computer to execute operations comprising:

acquiring time information including a current time from a time source device;

acquiring user-expiry information from the rental agent and agent-expiry information from the provider, the user-expiry information including a user expiry time of a period during which the user is permitted by the rental agent to play back the digital work, and the agent-expiry information including a rental expiry time of a period during which the rental agent is permitted by the provider to rent the digital work;

comparing the current time included in the time information acquired in said acquiring of the time information with the user expiry time included in the user-expiry information acquired in said acquiring of the user-expiry information;

comparing, the current time included in the time information acquired in said acquiring of the time information with the rental expiry time included in the agent-expiry information acquired in said acquiring of the agent-expiry information in response to the comparing of the current time with the user expiry time resulting in a judgment that the current time is not later than the user expiry time;

prohibiting playback of the digital work in response to the current time included in the time information being later than at least one of the rental expiry time included in the agent-expiry information and the user expiry time included in the user-expiry information; and transmitting the rental agent identifier to the provider in response to said comparing of the current time with the rental expiry time resulting in a judgment that the current time is later than the rental expiry time.

16. A playback device for acquiring and playing back a digital work provided from a provider to a rental agent and rented from the rental agent to a user, the rental agent being operable to provide to the user the digital work and a rental agent identifier identifying the rental agent, said playback device comprising:

a time acquisition means for acquiring time information including a current time from a time source device;

an expiry acquisition means for acquiring user-expiry information from the rental agent and agent-expiry information from the provider, the user-expiry information including a user expiry time of a period during which the user is permitted by the rental agent to play back the digital work, and the agent-expiry information including a rental expiry time of a period during which the rental agent is permitted by the provider to rent the digital work;

a first comparison means for comparing the current time included in the time information acquired by said time acquisition means with the user expiry time included in the user-expiry information acquired by said expiry acquisition means;

a second comparison means for comparing the current time included in the time information acquired by said time acquisition means with the rental expiry time included in the agent-expiry information acquired by said expiry acquisition means in response to the current time being not later than the user expiry time;

a prohibition means for prohibiting playback of the digital work in response to the current time included in the time information being later than at least one of the rental expiry time included in the agent-expiry information and the user expiry time included in the user-expiry information; and a rental agent identifier transmission means for transmitting the rental agent identifier to the provider in response to the current time being later than the rental expiry time.

17. A playback device for acquiring and playing back a digital work provided from a provider to a rental agent and rented from the rental agent to a user, the rental agent being operable to provide to the user the digital work and a rental agent identifier identifying the rental agent, said playback device comprising:

a time acquisition unit that acquires time information including a current time from a time source device;

an expiry acquisition unit that acquires user-expiry information from the rental agent and agent-expiry information from the provider, the user-expiry information including a user expiry time of a period during which the user is permitted by the rental agent to play back the digital work, and the agent-expiry information including a rental expiry time of a period during which the rental agent is permitted by the provider to rent the digital work;

a first comparison unit that compares the current time included in the time information acquired by said time acquisition unit with the user expiry time included in the user-expiry information acquired by said expiry acquisition unit;

a second comparison unit that compares the current time included in the time information acquired by said time acquisition unit with the rental expiry time included in the agent-expiry information acquired by said expiry acquisition unit in response to the current time being not later than the user expiry time;

a prohibition unit that prohibits playback of the digital work in response to the current time included in the time information being later than at least one of the rental expiry time included in the agent-expiry information and the user expiry time included in the user-expiry information; and a rental agent identifier transmission unit that transmits the rental agent identifier to the provider in response to the current time being later than the rental expiry time.

* * * * *

UNITED STATES PATENT AND TRADEMARK OFFICE
CERTIFICATE OF CORRECTION

PATENT NO. : 7,426,494 B2 Page 1 of 1
APPLICATION NO. : 10/161675
DATED : September 16, 2008
INVENTOR(S) : Motoji Ohmori et al.

It is certified that error appears in the above-identified patent and that said Letters Patent is hereby corrected as shown below:

In the Claims

In column 37, claim 2, line 38, please change "agent" to --agent,--.

Signed and Sealed this

Fifth Day of May, 2009

JOHN DOLL
*Acting Director of the United States Patent and Trademark Office*